(12) United States Patent
Storch

(10) Patent No.: US 9,469,325 B2
(45) Date of Patent: *Oct. 18, 2016

(54) BABY STROLLER AND WHEELCHAIR SAFETY FEATURES FACILITATE PUSHING

(71) Applicant: Leonard Storch, New York, NY (US)

(72) Inventor: Leonard Storch, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/734,131

(22) Filed: Jun. 9, 2015

(65) Prior Publication Data

US 2015/0274187 A1 Oct. 1, 2015

Related U.S. Application Data

(63) Continuation-in-part of application No. 14/255,558, filed on Apr. 17, 2014, now Pat. No. 9,079,594, and a continuation-in-part of application No. 14/101,847, filed on Dec. 10, 2013, now Pat. No. 9,080,660, which is a continuation-in-part of application No. 13/507,986, filed on Aug. 10, 2012, now Pat. No. 8,616,573.

(60) Provisional application No. 61/573,852, filed on Sep. 13, 2011, provisional application No. 61/575,114, filed on Aug. 13, 2011.

(51) Int. Cl.
| | |
|---|---|
| *B62B 7/04* | (2006.01) |
| *B62B 9/12* | (2006.01) |
| *A61G 5/10* | (2006.01) |
| *F16D 43/00* | (2006.01) |

(Continued)

(52) U.S. Cl.
CPC ............ *B62B 7/042* (2013.01); *A61G 5/02* (2013.01); *A61G 5/10* (2013.01); *A61G 5/1024* (2013.01); *B62B 9/00* (2013.01); *B62B 9/12* (2013.01); *B62M 1/14* (2013.01); *F16D 11/00* (2013.01); *F16D 43/00* (2013.01); *F16H 48/22* (2013.01); *A61G 5/1008* (2013.01); *A61G 5/1027* (2013.01); *A61G 2005/1051* (2013.01); *A61G 2005/1054* (2013.01); *A61G 2200/20* (2013.01)

(58) Field of Classification Search
CPC ......... B62K 21/10; B62B 7/04; B62B 7/042; B62B 3/00; B62B 3/001; B62B 5/0066; A47D 13/025; F16D 43/00; F16D 43/02
See application file for complete search history.

(56) References Cited

U.S. PATENT DOCUMENTS

| | | |
|---|---|---|
| 97,837 A | 12/1869 | Volk |
| 398,005 A | 2/1889 | Smith |

(Continued)

OTHER PUBLICATIONS

Brubaker et al.; "Effects of side slope on wheelchair performance"; Apr. 1986; Veteran Administration Journal of Rehabilitation Research; vol. 23 No. 2 pp. 55-57.

(Continued)

*Primary Examiner* — Bryan Evans

(57) ABSTRACT

Because sidewalks are sloped for rain, one arm may tire before the other when pushing a stroller or wheelchair because it constantly requires more force from one hand to offset gravity in order to go straight. A slip clutch to couple/uncouple the rear wheels acts like AUTOPILOT STEERING, and that makes pushing more efficient, easier/less strain, on any surface. The slip clutch automatically couples/uncouples the wheels depending on the force difference applied by the hands pushing. When the force difference is moderate, the combined force will 100% efficiently propel straight! Without a slip clutch, even a moderate difference in force will cause some zigzagging which is less efficient and takes more energy than going straight. To turn, the force difference is intentionally greater to automatically uncouple the two wheels to allow turning. Turning requires more energy—that's the tradeoff. However, conveyances are pushed straight most of the time.

5 Claims, 30 Drawing Sheets

(51) Int. Cl.
    *F16D 11/00*     (2006.01)
    *B62B 9/00*     (2006.01)
    *B62M 1/14*     (2006.01)
    *F16H 48/22*     (2006.01)
    *A61G 5/02*     (2006.01)

(56) References Cited

U.S. PATENT DOCUMENTS

| | | |
|---|---|---|
| 692,036 A | 1/1902 | Sawyer |
| 1,100,713 A | 6/1914 | Colson |
| 1,252,430 A | 1/1918 | Gruenberg |
| 1,337,510 A | 4/1920 | Frankman |
| 1,440,341 A | 12/1922 | Crispen |
| 2,226,759 A | 12/1940 | Fitzner |
| 2,289,331 A | 7/1942 | Alt |
| 2,431,112 A | 11/1947 | Everest et al. |
| 2,471,233 A | 5/1949 | Monson |
| 2,616,725 A | 11/1952 | East |
| 3,540,776 A | 11/1970 | Wilson |
| 3,556,260 A | 1/1971 | Meyer et al. |
| 3,795,408 A | 3/1974 | Nemessanyi |
| 3,899,189 A | 8/1975 | Watkins |
| 4,044,850 A | 8/1977 | Winsor |
| 4,101,143 A | 7/1978 | Sieber |
| 4,183,418 A | 1/1980 | Dudas |
| 4,350,227 A | 9/1982 | Knoche |
| 4,460,190 A | 7/1984 | Spiess |
| 4,506,900 A | 3/1985 | Korosue |
| 4,560,033 A | 12/1985 | DeWoody et al. |
| 4,570,756 A | 2/1986 | Minnebraker et al. |
| 4,589,525 A | 5/1986 | Phipps et al. |
| 4,713,976 A | 12/1987 | Wilkes |
| 4,790,548 A | 12/1988 | Decelles et al. |
| 4,987,978 A | 1/1991 | Jungersen |
| 5,028,064 A | 7/1991 | Johnson |
| 5,036,959 A | 8/1991 | Sarro |
| 5,197,750 A | 3/1993 | DiGeorge |
| 5,306,035 A | 4/1994 | Counts |
| 5,472,066 A | 12/1995 | Schillo et al. |
| 5,791,672 A | 8/1998 | Masclet |
| 5,862,874 A | 1/1999 | Brienza |
| 5,941,547 A | 8/1999 | Drake |
| 5,944,338 A | 8/1999 | Simpson |
| 6,077,025 A | 6/2000 | Budd et al. |
| 6,102,166 A | 8/2000 | Blodee |
| 6,279,934 B1 | 8/2001 | Womack |
| 6,305,897 B1 | 10/2001 | Budd et al. |
| 6,431,572 B1 | 8/2002 | Harden et al. |
| 6,439,281 B1 | 8/2002 | Hogg |
| 6,607,250 B2 | 8/2003 | Papac |
| 6,634,665 B2 | 10/2003 | Hargroder |
| 7,316,298 B2 | 1/2008 | Yeager |
| 7,464,797 B2 | 12/2008 | Kidd et al. |
| 7,959,176 B2 | 6/2011 | Bidwell et al. |
| 8,490,242 B2 | 7/2013 | Cooper et al. |
| 2007/0012526 A1 | 1/2007 | Holub et al. |
| 2009/0039612 A1 | 2/2009 | Bidwell et al. |
| 2010/0174432 A1 | 7/2010 | Meyer et al. |
| 2010/0276905 A1 | 11/2010 | Brown |
| 2013/0062857 A1 | 3/2013 | Winter et al. |

OTHER PUBLICATIONS

McLaurin et al.; "Lever drive system for wheelchair" Apr. 1986; Veteran Administration Journal of Rehabilitation Research; vol. 23 No. 2 pp. 52-54 . . . .

Duncan; "A novel spring-dutch stabilizer to aid wheelchair users in traversing environmental barriers"; 1990; United States Government Small business innovation research . . . .

Green B "Share chair: The side push wheelchair"; Oct. 19, 2006; Power point presentation; http://designed.mit.edu/gallery/data/2006/mockup/slides/greenB.ppt . . . .

Kirby et al.; "Influence of caster diameter on the static and dynamic forward stability of occupied wheelchairs"; Jan. 1992; Arch Phys Med Rehabil; Department of Medicine.

Winter et al.; "Mechanical principles of wheelchair design" undated; Massachusetts Institute of Technology, MIT manual free to anyone to photocopy and distribute . . . .

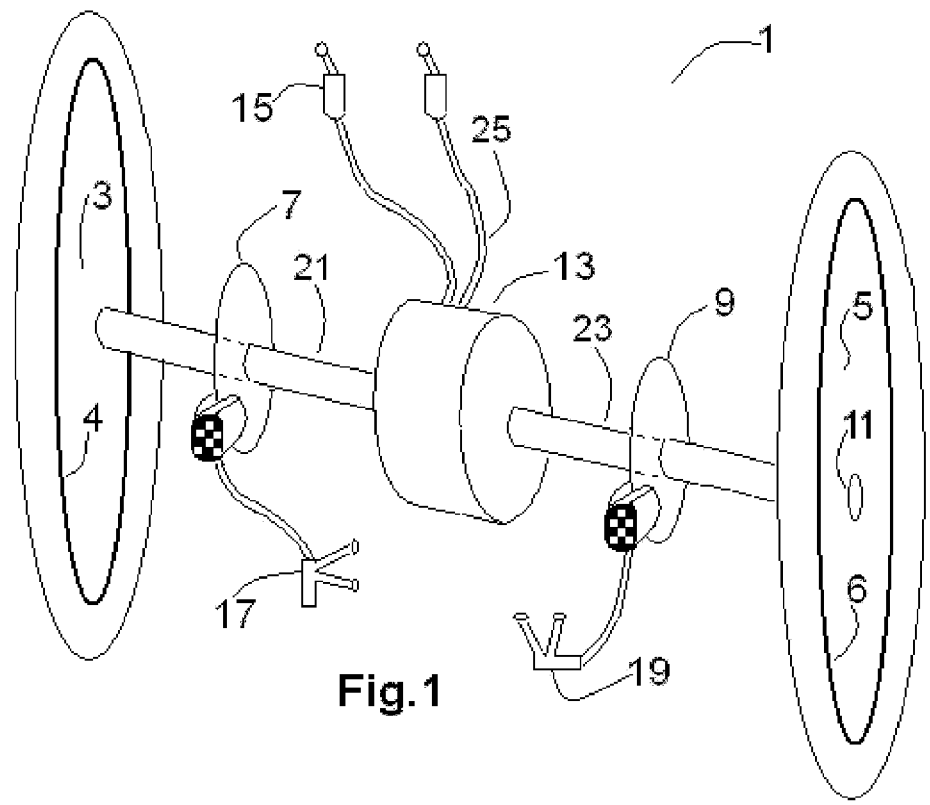
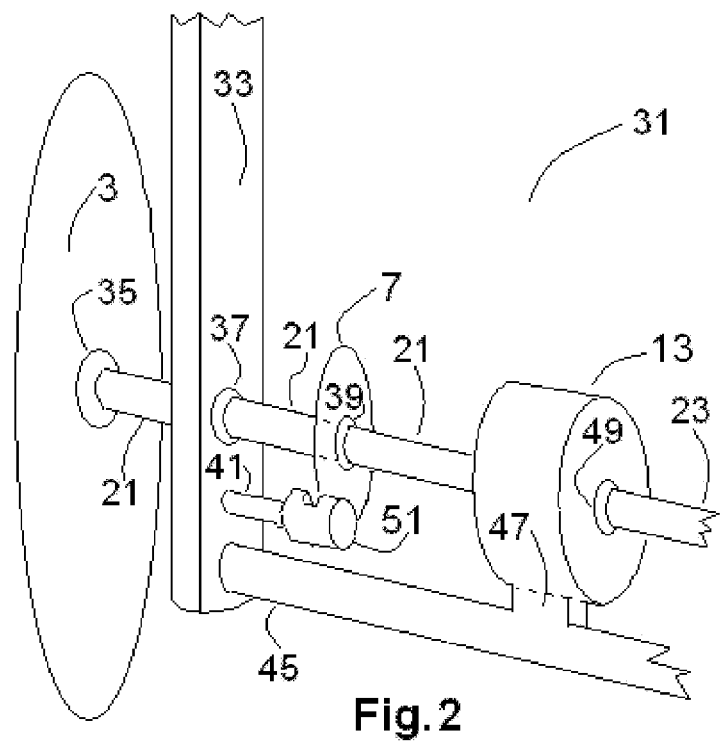

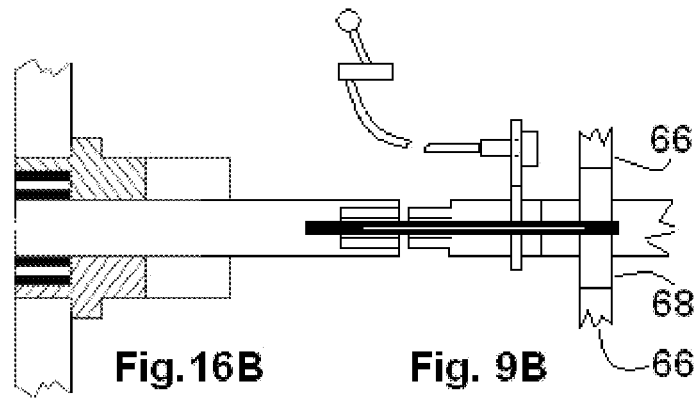
Fig. 16B    Fig. 9B
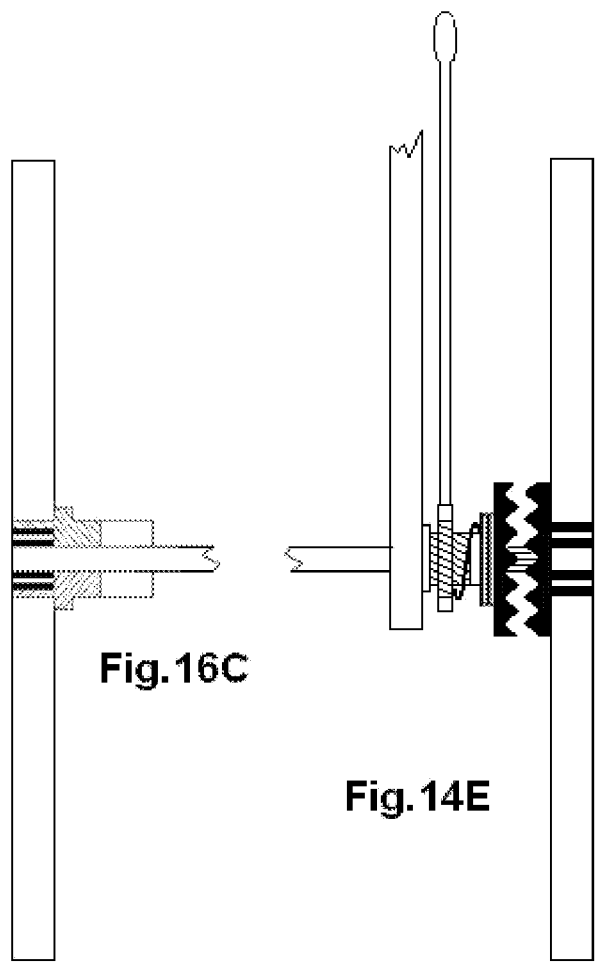
Fig. 16C
Fig. 14E

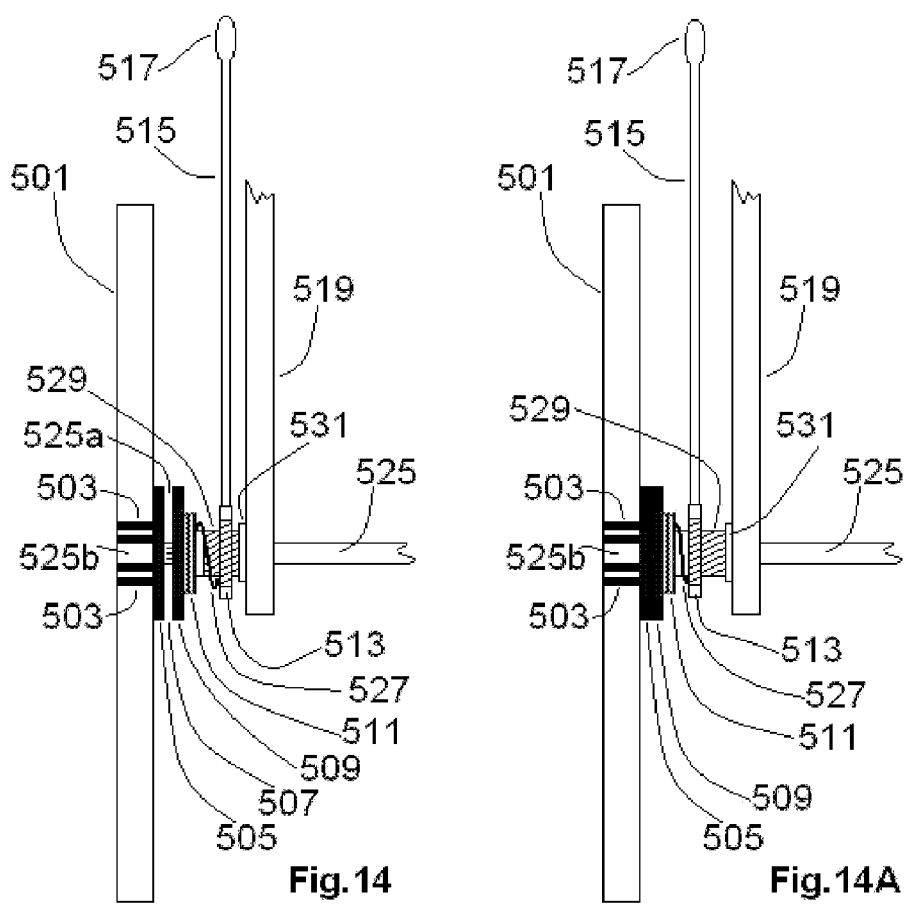

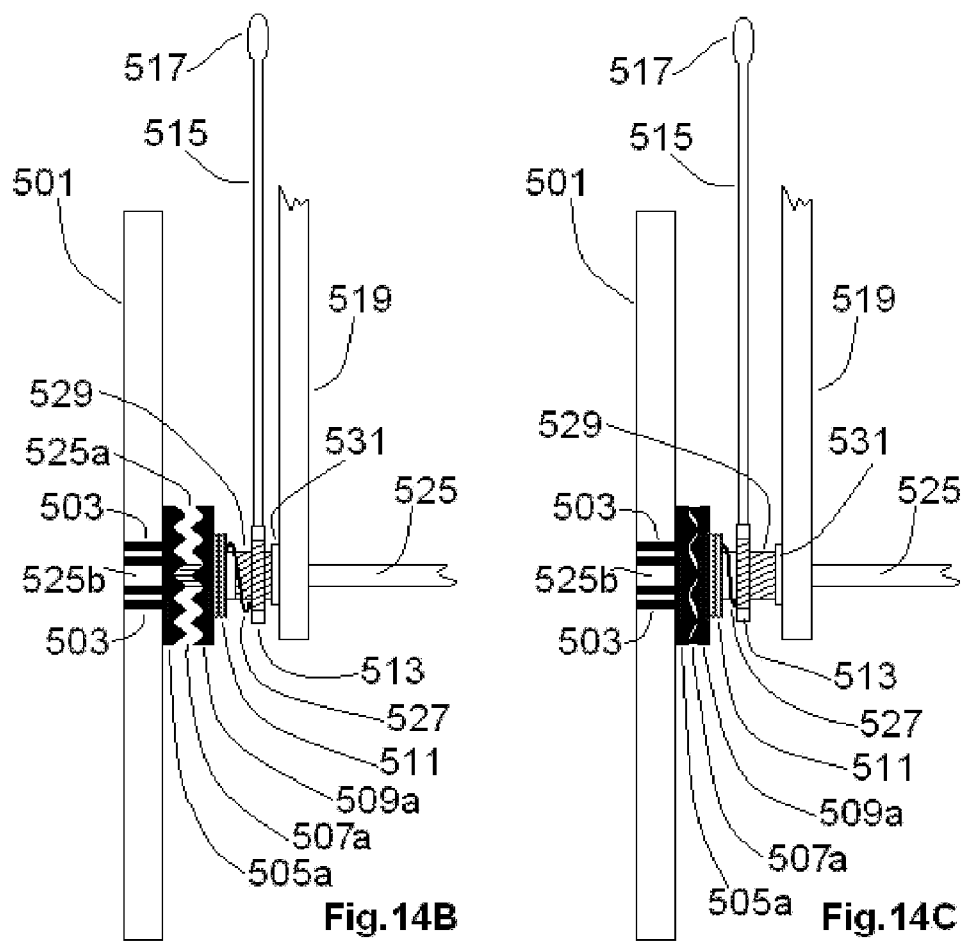
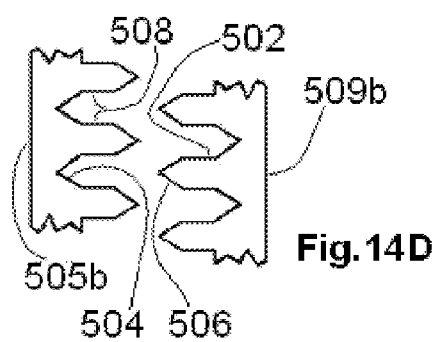

BABY STROLLER AND WHEELCHAIR SAFETY FEATURES FACILITATE PUSHING

CROSS-REFERENCES TO RELATED U.S. APPLICATIONS

This application is a Continuation-In-Part of Continuation-In-Part No. 14/255,558 filed Apr. 17, 2014 which is a Continuation-In-Part of application Ser. No. 13/507,986 filed Aug. 10, 2012 now U.S. Pat. No. 8,616,573 issued Dec. 31, 2013, and Continuation-In-Part application No. 14/255,558 is also a Continuation-In-Part of application No. 14/101,847 filed Dec. 10, 2013 which is a Continuation of application Ser. No. 13/507,986 filed Aug. 10, 2012 now U.S. Pat. No. 8,616,573, and this application claims priority to Provisional application No. 61/575,114 filed Aug. 13, 2011, and to Provisional application No. 61/573,852 filed Sep. 13, 2011, the disclosures of all of which are incorporated herein by reference.

The fields of use comprise manually operated conveyances such as wheelchairs and baby carriages & strollers. Embodiments of the invention are described using a wheelchair by example.

A link to a University of California, San Francisco web site has a 2002 report with the following statistics:
"'Wheelchair Use in the United States'
Authors: H. Stephen Kaye, Taewoon Kang, and Mitchell P. LaPlante
Abstract 23
May 2002
'Wheelchair Use in the United States'
An estimated 1.6 million Americans residing outside of institutions use wheelchairs, according to 199495 data from the National Health Interview Survey on Disability (NHIS-D).[1] Most (1.5 million) use manual devices, with only 155,000 people using electric wheelchairs.[2] Wheelchair users are among the most visible members of the disability community, experiencing among the highest levels of activity limitation and functional limitation and among the lowest levels of employment." (footnotes omitted)

When self-propelled, manual wheelchairs have had the dangerous tendency to veer toward curbs since their introduction to sidewalks. Whether traveling on a flat surface or going up or down a hill, if the surface is slanted, operation of a wheelchair (or just, "chair"), by the passenger or the person pushing the chair, is clumsy and cumbersome, and is potentially dangerous. Moreover, propelling a wheelchair on slanted surfaces requires more effort than it does on surfaces that are not slanted—the difficulty rises as the degree of slant increases.

Some embodiments provide a facilitating means that may make the chair easier to operate on a slanted surface by causing the two large wheels to rotate at the same speed so that the wheelchair rolls in a straight direction despite the tendency to follow the swiveling-offset front steering wheels and veer off towards a curb or the low side of a sloped surface.

In some embodiments, each large wheel of the wheelchair is fixed on one end to its own axle, and in some embodiments a facilitating means allows the operator of the wheelchair to set and unset (i.e., join and unjoin, lock and unlock, couple and uncouple) an axle joining means. In the set position, the other end of the two axles will stay joined (locked or coupled together) and will rotate at the same speed thus causing the chair to roll in a straight direction on a sloped surface until the operator changes from the set position to the unset position. In the unset position the axles are free to rotate independently of each other, which is required for turning.

Joined axles: Consider an example of a modified wheelchair with one single axle to which both large wheels are fixed mounted so that the wheels are joined together via the axle and must therefore turn in unison. In this example, a passenger is sitting in the modified chair and s/he cannot get up or try to "bounce" the chair with abrupt movements, and the non-slippery sidewalk the passenger is prepared to travel on is an average city sidewalk that may or may not be an upgrade or a downgrade (up hill or down hill) and may or may not be sloped to the left or to the right, but the sidewalk is otherwise regular. Applicant believes this example demonstrates concretely that the directions the passenger can move are straight forward or backward; turning is, of course, not an option because the large wheels are joined as described—this finding, a pragmatic conclusion, makes sound common sense, and it is also supported by science.

Unjoined axles: If a self-propelled passenger in a regular wheelchair uses both arms to push/rotate (turn, pump, stroke) the large wheels' hand rails to start to go forward on a surface that slopes (e.g., slopes to the left) as soon as s/he lets go of the hand rails to give a second push, the chair darts to the left (veers off course) because of gravity. The front swiveling wheels will steer the wheelchair (which is an object-in-motion rolling freely on four well-lubricated wheels) off course down the slope. The faster/harder the passenger's first push is, the faster the chair will dart off course when s/he lets go of the rails to prepare for the next stroke. After that, depending on the degree of the slope and whether or not the sidewalk is flat or hilly, the passenger can only use his left arm (to offset, or counteract, the tendency to veer to the left) to propel the chair forward, and s/he must use her/his right hand to slow down or retard the right wheel to prevent veering off course between strokes.

Manhattan, for example, is not flat; elevation varies between sea level to a maximum of 265.5 feet (Bennet Park in Washington Heights). Most sidewalks in Manhattan are slightly hilly. And most sidewalks are slightly slanted for water run-off. These observations are from the applicant herein, a life-long (68 years) NYC dweller who lived 3 years in the Upper Eastside and, for the past 44 years, has been living in Manhattan's Upper Westside.

Bear in mind that a self-propelled wheelchair passenger must travel both directions to go somewhere in her/his neighborhood and get back home. A typical example in the Upper Westside of Manhattan: the sidewalk on $72^{nd}$ Street going from Columbus to Amsterdam Avenues is ⅕ mile long and runs downhill slightly, and it is slanted a bit to the left.

In this typical $72^{nd}$ Street sidewalk example, when the forward motion of the wheelchair approaches a reasonable speed, the passenger's left arm becomes unable to keep up and the self-propelling passenger must come to an abrupt stop or risk an accident by darting off the curb and tipping over. In order to travel this route, even a self-propelling passenger with pretty strong arms, e.g., applicant herein, must travel at a turtle's pace and stop to rest his left arm every 10 yards or so. Applicant estimates that travel time, with his standard Drive Cruiser III model wheelchair is well over 15 minutes including a few minutes to rest when the left arm tires. Applicant estimates travel time from Columbus to Amsterdam Avenues with joined axles would be well under 3 minutes.

This estimated differential in travel times, greater than 5 to 1!, does not tell the whole story; after a grueling trip with unjoined axles, applicant's left arm is sore (literally) and his right hand is nearly burned from friction (unless a glove is worn). But with joined axles, based on extrapolations from similar down-hill pathways in city parks that do not slope, it is estimated that the passenger would arrive at Amsterdam Avenue feeling comfortable after what was mostly a free ride—gravity did most of the work!

Applicant believes that, because of sloping sidewalks, many wheelchair-handicapped civilian and veteran passengers cannot go out alone—they must have an Aide pusher person to push them or get an electric wheelchair. However, an electric wheelchair is not possible for (many including) applicant because there are four steps from his lobby to the sidewalk. Applicant is not wheelchair bound—he can walk and manage those steps well enough to roll his 30 pound wheel chair up and down a few stairs. Moreover, a lot of walking and some self-propelling daily are strongly recommended by his doctors to improve/manage his breathing-challenged handicap.

When pumping with one arm to move forward on a sloped surface, a passenger must slow down or retard the other wheel to keep the wheelchair on course. If a person is pushing the chair, uneven force must be applied to the two pushing handles. Generally, it is more difficult to keep a wheelchair on a straight course going downhill on a sloped surface than it is going uphill on a sloped surface.

Some embodiments may afford control and may be used to stop a run-away wheelchair. On steep hills, wheelchairs are dangerous—there may be no safe way to stop a runaway wheelchair. The brakes on typical wheelchairs are designed to be applied only when the chair is already stopped.

Any significant unevenness in braking between the two wheels on a fast-moving chair will likely cause the chair to pivot (turn abruptly) and tip over, slamming the occupant to the ground, because an object in motion tends to stay in motion.

Some embodiments may make the chair safer by allowing a runaway wheelchair to be steered and safely slowed down and brought to a stop by the passenger.

Some embodiments may facilitate the operation of a wheelchair going down a hill. It is rather difficult for the passenger or the pusher to hold back a wheelchair going down a hill because of the effect of gravity on the occupied wheelchair. For safety, a pusher may ask the passenger to assist in controlling the descent down a hill by inhibiting (retarding) the wheel rims to facilitate controlling the chair's forward movement.

Some embodiments may provide improved means to facilitate controlled operation of a wheelchair downhill by the wheelchair operator.

Some embodiments make the operation of manually operated wheelchairs, such as "Drive Medical Design and Manufacturing" brand wheelchairs, easier to operate and safer to ride in.

Some embodiments make the operation of a manually operated wheelchair easier on slanted surfaces and safer on inclines by allowing the passenger control of the chair via brakes, and, because of convenient and effective placement of the added apparatus weight of some embodiments, a lower center of gravity is achieved, and the chair becomes more resistant to tipping over. This presents the option of using heavier construction materials, such as iron or steel, instead of lighter materials, such as anodized aluminum, or plastics or composites.

Some embodiments may comprise a wheelchair including facilitating means configured to be set and unset, the facilitating means, when set, adapted to cause the two large wheels to rotate at the same speed facilitating propelling the wheelchair on a slanted surface, and when unset, allowing the two large wheels to rotate at different speeds.

Some embodiments may comprise a wheelchair including facilitating means and an operator controlled settable and unsettable axle joining device which, when set, is configured to allow the operator to join the axles together causing both wheels to rotate at the same speed facilitating propelling the wheelchair on a slanted surface, and when unset, allowing the operator to unjoin the two large wheels allowing them to rotate at different speeds.

In some embodiments, the operator has controls on the wheelchair that allow her/him to shift between set and unset (set to traverse with slanted surfaces and unset for turning). In other embodiments that incorporate slipping means, the wheelchair can travel straight on sloped surfaces with joined axles and still make turns without the operator shifting between set and unset. In these other embodiments, the axles are allowed to rotate at different speeds via slippage to allow turning. And, in some embodiments, the operator can choose to allow such slippage or choose to shift to the set position to join the wheels or shift to the unset position to allow the wheels to rotate independently of each other.

Also, in some embodiments, the chair may have a hand operated brake, such as a disc or shoe brake, for each large wheels' axle, the brakes being adapted to allow the passenger to slow down and stop a wheelchair on a hill.

Manually operated wheelchairs are difficult to propel on a surface that is sloped (i.e., slanted) because, as the chair is propelled, it tends to veer off toward the low side of the slope. The difficulty increases corresponding to the degree the surface slants. This difficulty with slanted surfaces manifests whether or not the surface is also hilly (inclined uphill or downhill). If a wheelchair is moving straight forward on a sloped surface, it will veer off down the slope due to gravity unless it is prevented from doing so.

And, because there may be no way to safely stop a runaway wheelchair, manually operated wheelchairs can be dangerous on hills if the operator loses control.

Some embodiments, when installed on a wheelchair, may include structure that lowers the center of gravity making the chair safer because it becomes less susceptible to tipping over, and or makes the chair's structure more rigid and solid, and that may make for a more efficient and more comfortable ride. Here is an excerpt from Wikipedia's web site:

"Everyday manual wheelchairs come in two major designs—folding or rigid. The rigid chairs, which are increasingly preferred by active users, have permanently welded joints and many fewer moving parts. This reduces the energy required to push the chair by eliminating many points where the chair would flex as it moves. Welding the joints also reduces the overall weight of the chair."

Baby carriages and strollers are not self-propelled, and they also have sidewalk veering off problems similar to wheelchairs. Both baby carriages & strollers and wheelchairs are uncomfortable to push on pavements sloped for runoff. And there's a more serious concern: A child safety concern created by the veering off problem.

When a person pushing a baby carriage or stroller stops for whatever reason, s/he should always apply the brake. If s/he doesn't apply the brake when they stop on a sidewalk pavement, there is the risk the baby carriages & stroller may veer off towards the curb owing to gravity, the wind, the baby's movements or vibrations from a heavy vehicular traffic. This is an all too common mistake, not applying the brake. Like an airbag in a car, (which operates entirely automatically, as described below) isn't ever needed to prevent an accident, perfect!, and if it works once, it may well be worth a King's Ransom.

Although embodiments described below address manual wheelchairs, they may also be beneficially adapted to baby carriages & strollers in order to facilitate pushing baby carriages & strollers on sloped sidewalks and to prevent veering off accidents if the brake is not applied when stopped.

Some embodiments comprise mechanical apparatus for a manually operated wheelchair to lessen the difficulty traversing sloped surfaces and to provide mechanical apparatus for the passenger to control the wheelchair and lessen the danger associated with propelling a wheelchair on hills.

Some embodiments may comprise a wheelchair including facilitating means, when set, adapted to cause the two large wheels to rotate at the same speed facilitating propelling the wheelchair on a slanted surface, and when unset, allowing the two large wheels to rotate at different speeds.

Some embodiments use an adjustable slip clutch which works as follows: Force on the clutch plates insures that both wheels must turn as one when the torque differential between the two wheelchair wheels is moderate. When the torque differential exceeds the torque setting (which may be adjusted for occupant's weight, strength and other factors), the clutch allows the wheels to rotate at different speeds for turning. When force on the clutch plates is released, the clutch may be idle and the chair performs normally, for use in hospitals & rehab facilities. The force may be generated by, e.g., a spring or other means.

An embodiment of the invention including a wheelchair comprising a frame, two drive wheels rotatably connected to the frame, and a joining means which couples and uncouples the two drive wheels. The joining means, when coupled, causing the two drive wheels to rotate in unison preventing the wheelchair from veering off so that it travels straight when traversing a sloped surface, and when uncoupled allowing the two drive wheels to rotate at different speeds to allow turning; an embodiment wherein the joining means may comprise structure that engages and disengages responsive to a manually operable control; an embodiment wherein the joining means may comprise a gear arrangement associated with each of the drive wheels which is engageable and disengageable responsive to the control to couple and uncouple the two drive wheels; an embodiment wherein the joining means comprises a torque responsive device that automatically uncouples coupled drive wheels in response to a given increase in torque between the two drive wheels and couples uncoupled drive wheels in response to a given decrease in torque between the two drive wheels; an embodiment wherein the torque responsive device comprises a slip clutch.

Another embodiment of the invention comprises a wheelchair with a frame, two drive wheels rotatably connected to the frame, an axle and an anti-veering off improvement comprising a slip-clutch or the like adapted to the axle to couple and uncouple the two drive wheels; the slip-clutch, when coupled, causing the two drive wheels to rotate in unison preventing the wheelchair from veering off so that it travels straight when traversing a sloped surface, and when uncoupled allowing the two drive wheels to rotate at different speeds to allow turning.

Another embodiment of the invention comprises a wheelchair with frame, two drive wheels rotatably connected to the frame, an axle and an anti-veering off improvement comprising a gear configuration or the like adapted to the axle and a manually operable control adapted to couple and uncouple the two drive wheels; the gear configuration, when coupled, causing the two drive wheels to rotate in unison preventing the wheelchair from veering off so that it travels straight when traversing a sloped surface, and when uncoupled allowing the two drive wheels to rotate at different speeds to allow turning.

BRIEF DESCRIPTION OF THE DRAWINGS

FIG. 1 depicts an embodiment of a mechanical braking system for a manually operated wheelchair 1 comprised of:
left large rear wheel 3,
a left wheel hand rail 4,
a left axle 21,
a right large rear wheel 5,
a right wheel hand rail 6,
a right axle 23,
the right axle end 11
of right axle 23
which may be fixed to right wheel 5,
a left disc brake assembly 7 with disc brake caliper housing
a right disc brake assembly 9 with disc brake caliper housing,
(the caliper housings on disc brake assemblies 7 and 9 are shown with checkered patterns in FIG. 1 to depict some embodiments that may including rear lights and or brake lights as a night time safety feature, although a higher mounting location for rear safety lights may be preferred—the checkering on brake assemblies 7 and 9 has no other function),
a manual left brake assembly control 17 linked to its disc brake caliper housing a manual right brake assembly control 19 linked to its disc brake caliper housing),
an axle joiner housing 13
with an axle joiner control 15 operated by the passenger
and another axle joiner control 25 operated by the passenger's pusher.

Figure 3:
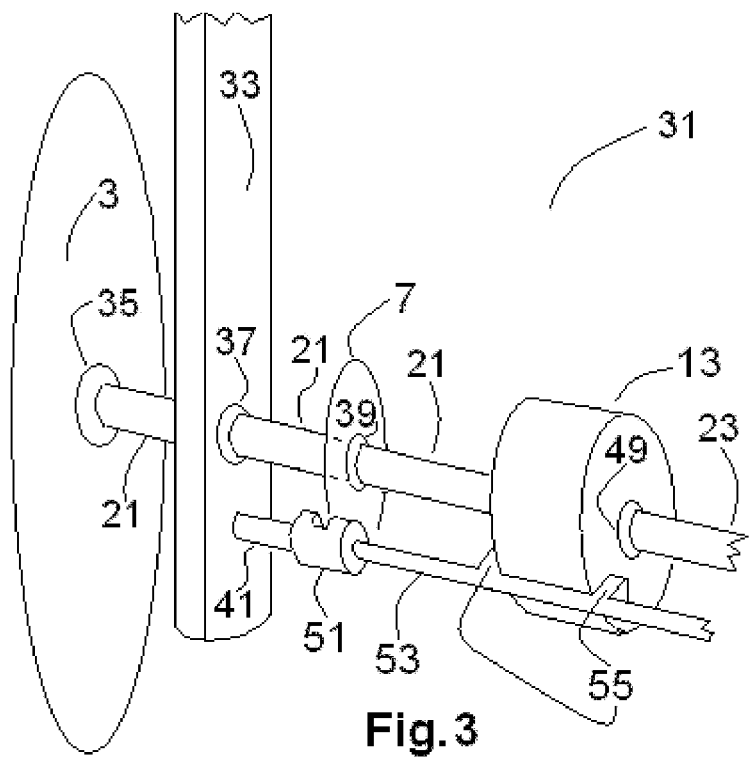

Alternatively, a single axle joiner control can be located so as to be accessible by the passenger or the pusher.

Axles rotating at different rotational speeds, and perhaps rotating in different directions, can be joined and unjoined on-the-fly or while one or both axles are stopped.

Either one or both axle joiner controls 15 and 25 may be used.

FIG. 2 depicts a portion of FIG. 1 with the same elements numbered the same, and with additional numbered elements of a wheelchair braking system 31 comprised of these additions:
wheelchair frame upright 33,
axle-wheel fastener 35,
axle-frame bearing 37,
disc brake-axle fastener 39,
frame-caliper joiner 41,
disc brake caliper housing 51,
structural strut 45,
strut-axle joiner housing 13 joiner 47, and
axle joiner's bearing 49.

FIG. 3 depicts a portion of FIG. 1 and FIG. 2 with the same elements numbered the same, and with additional numbered elements of a wheelchair braking system 31 comprised of these additions:
structural caliper strut 53,
caliper strut-axle joiner housing 13 brackets 55.
Structural strut 45 and joiner 47 are not shown in FIG. 3.

Figure 4:
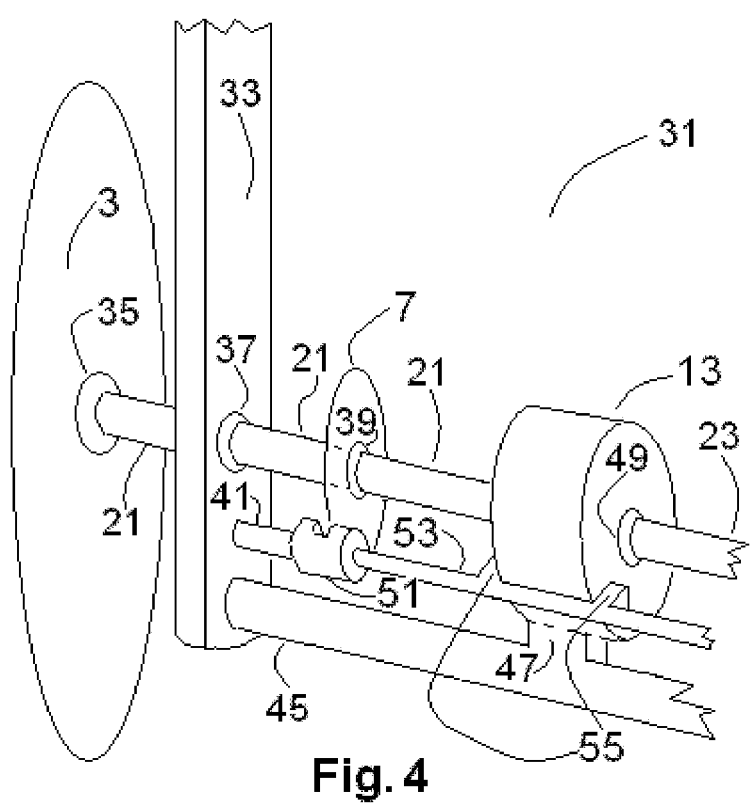

FIG. 4 depicts a portion of FIG. 1 and all the elements of FIGS. 2 and 3, with all elements numbered the same.

Figure 5:
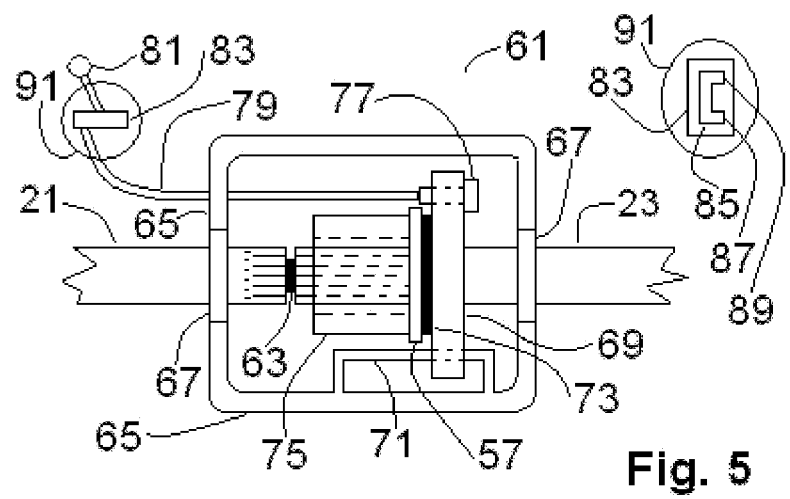

FIG. 5 depicts a splined axle joining assembly 61 comprised of the left axle 21 and right axle 23 shown in FIGS. 1 to 4, the left axle 21 in FIG. 5 depicted with male splines (gear teeth) on one end as shown and the right axle 23 depicted with male splines on one end as partially shown, and free-standing pin 63 accommodated in close-fitting pin openings in the ends of axles 21 and 23 (not shown); or, pin 63 may be fixed in one axle and free to rotate in the other axle. Pin 63 aids accurate axial alignment of axles 21 and 23—axles 21 and 23 lie on the same axis (an imaginary line about which axles 21 and 23 rotate).

splined axle joining assembly housing 65, seal bearings 67, axle joiner push-plate 69, push-plate guide 71 (more than one push-plate guide may be utilized), return spring bearing 57, slip-washer 73 which may allow non rotating push plate 69 to push splined axle joiner 75, with internal spline gear teeth, to join axles 21 and 23 so they rotate as if one solid axle, axle joiner control cable fastener 77, axle joiner control cable 79, axle joiner control assembly 91, and axle joiner control 81.

a view from above of axle joiner control assembly in a cutout 91.

joiner control housing 83 elongated channel 85 detent position 89 of channel 85 illustrates the "unset" position (when the axles 21 and 23 are not joined).

detent position 87 of channel 85 is the "set" position (when axles 21 and 23 are joined).

FIG. 5 illustrates the "unset" position (unjoined position) of splined axle joiner 75.

Figure 5A:
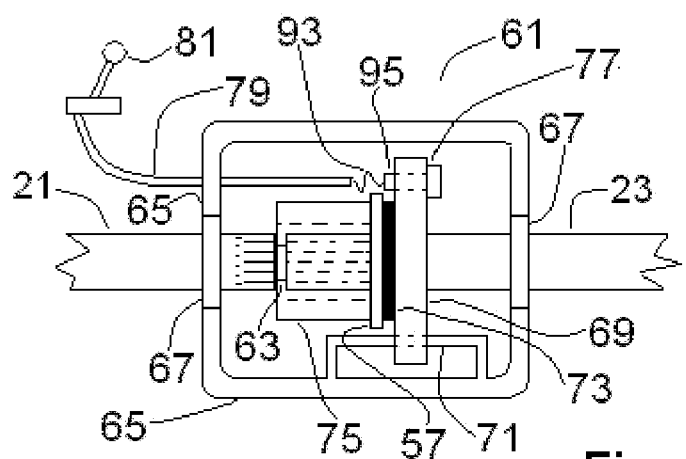

FIG. 5A illustrates the "setting" process (joining process) of splined axle joiner 75.

Figure 5B:
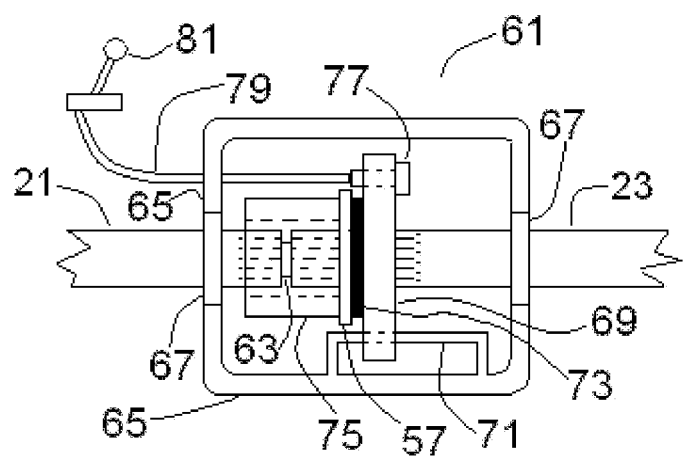

FIG. 5B illustrates the "set" position (joining position) of splined axle joiner 75.

Figure 5C:
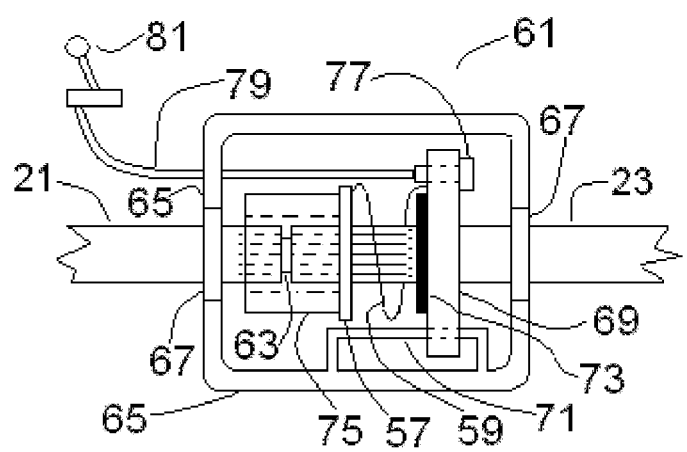

FIG. 5C illustrates the "unsetting" process (unjoining process) of splined axle joiner 75;

FIGS. 5 to 5C illustrate splined axle joiner 75 going from unset to setting to set to unsetting (i.e., FIG. 5 unjoined, FIG. 5A joining, FIG. 5B joined, FIG. 5C unjoining and FIG. 5 again, unjoined).

Figure 5D:
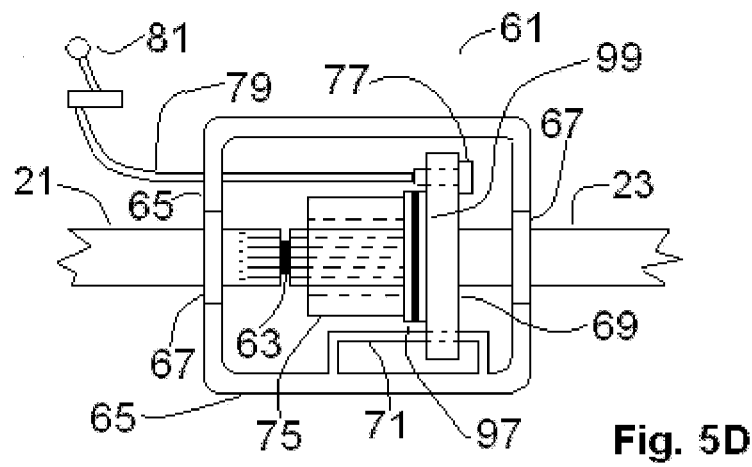
Figure 5E:
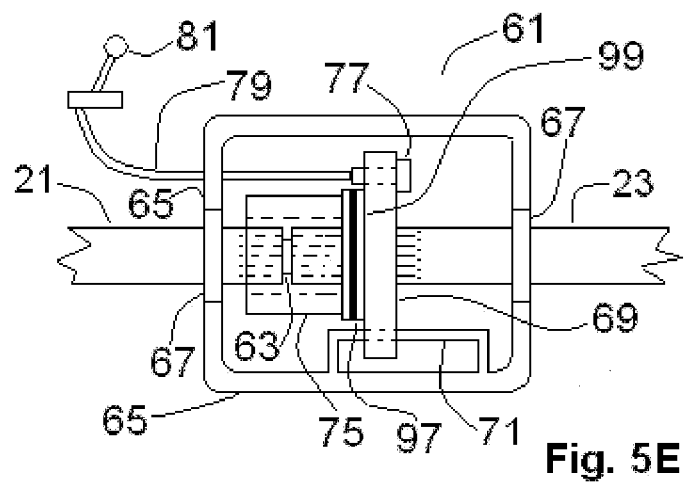

FIGS. 5D and 5E use the same numbering as FIGS. 5 to 5C for common illustrated elements. FIGS. 5D and 5E depict a splined axle joining assembly 61 but return spring bearing 57 and slip-washer 73 have been replaced with return thrust bearing 97 (shown as "white, black, white").

Figure 6:
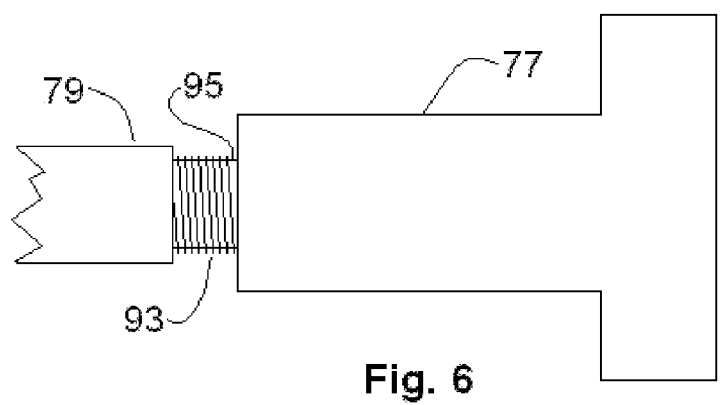
Figure 6A:
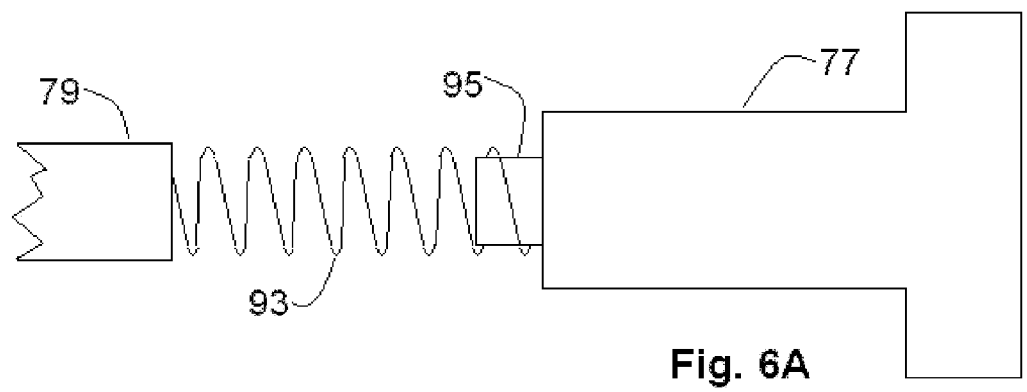

FIGS. 6 and 6A show an enlarged depiction of axle joiner control cable fastener 77, engage spring 93 and engage spring post 95. Actual joiner control cable 79 is attached to engage spring 93 as shown.

Figure 7:
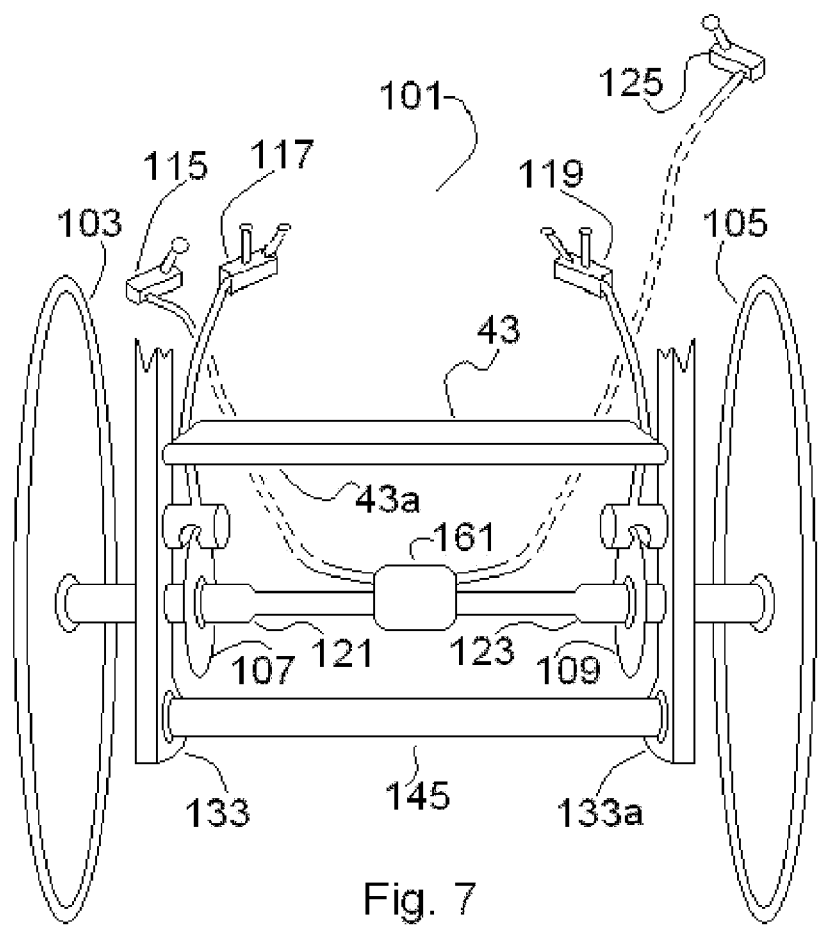
Figure 7A:
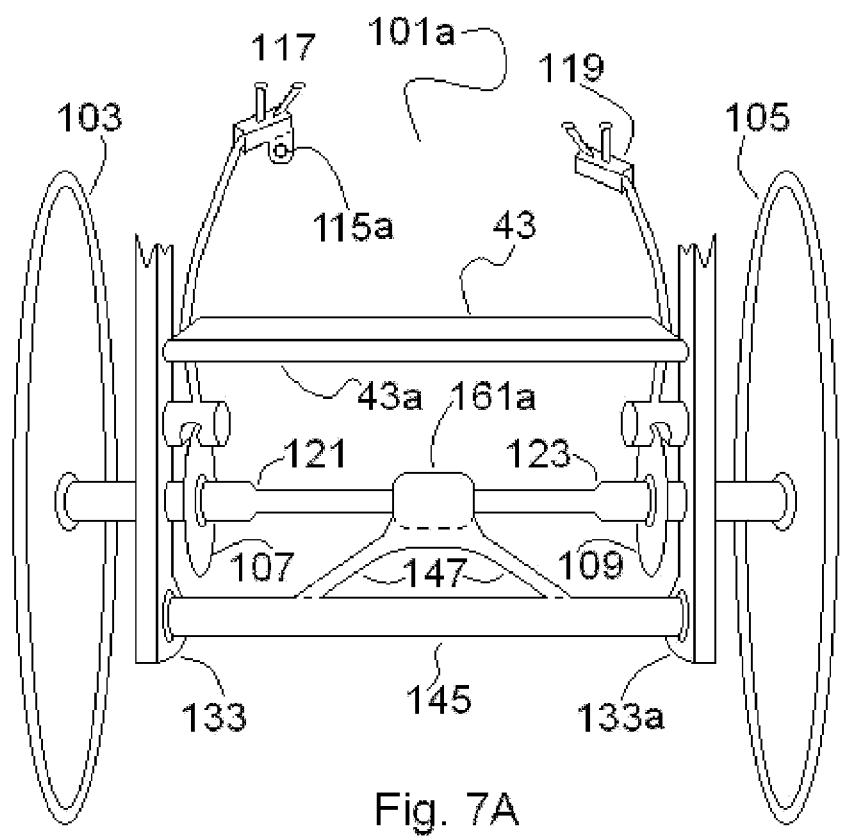

FIGS. 7 & 7A depict the rear view of Safer, Easier-to-Operate Wheelchairs with braking and wheel joining systems 101 & 101a.

Figure 7B:
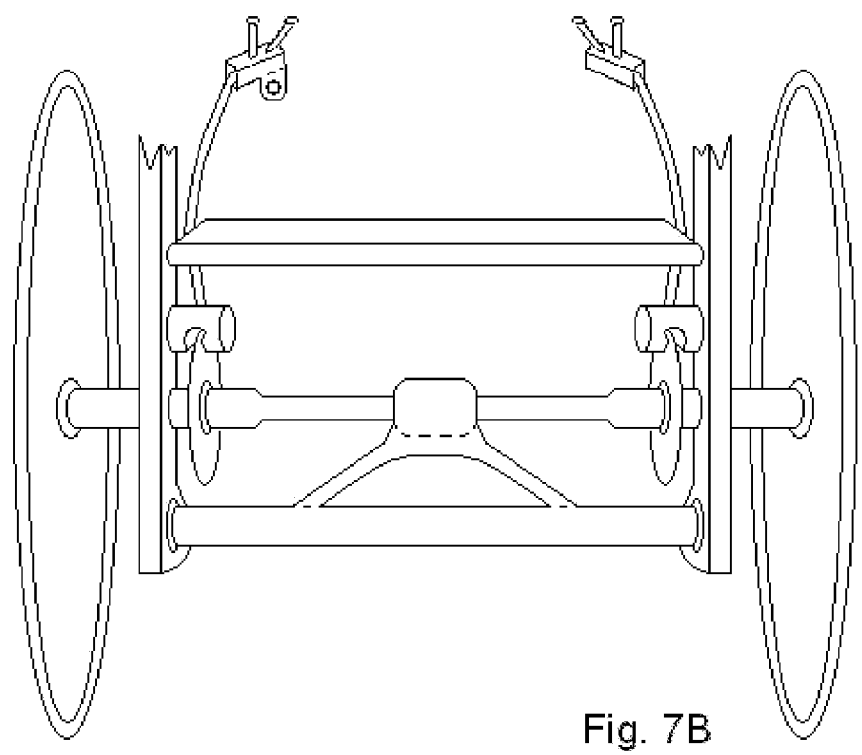

FIG. 7B is an unnumbered depiction of FIG. 7A.

Figure 8:
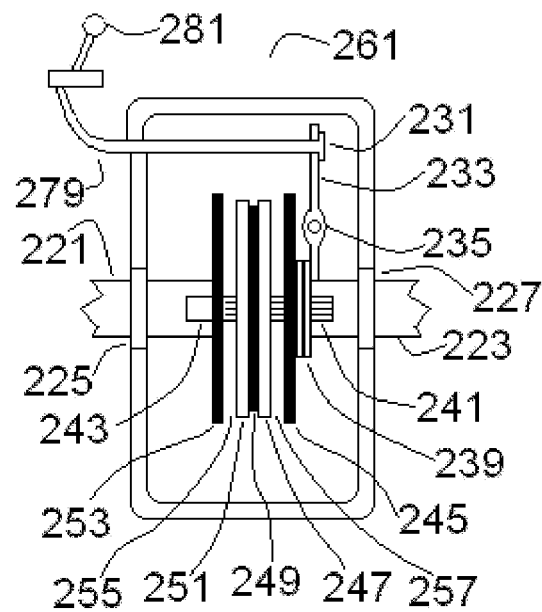
Figure 8A:
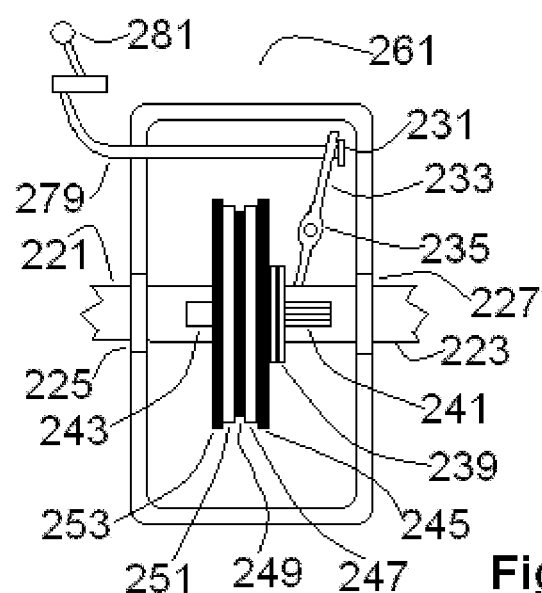
Figure 8B:
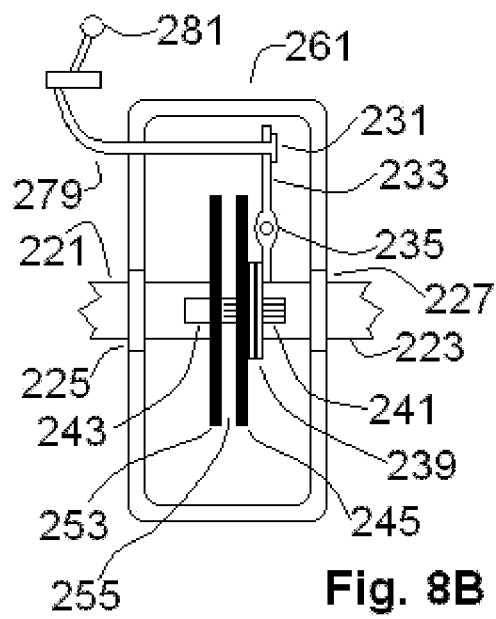
Figure 8C:
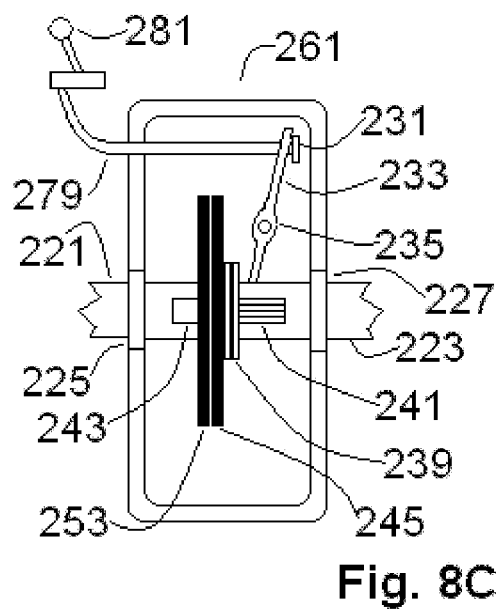
Figure 8D:
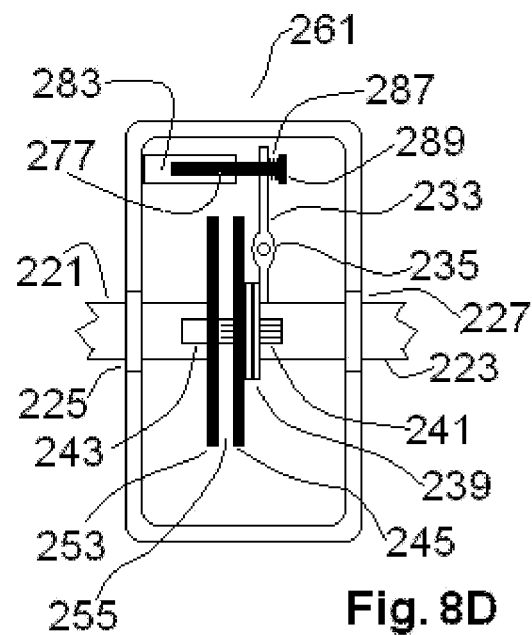
Figure 8E:
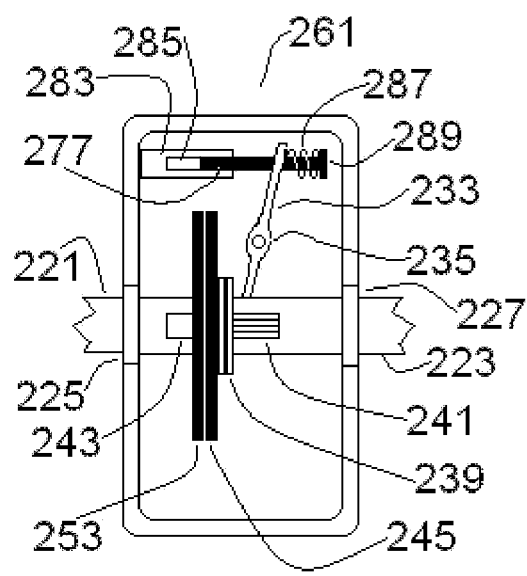
Figure 8F:
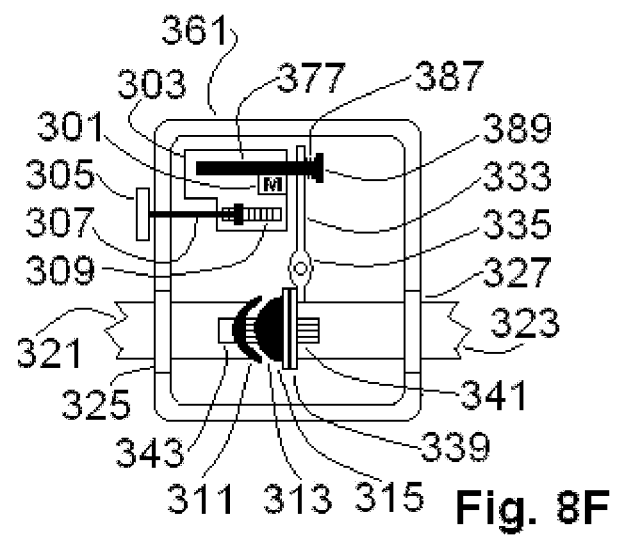
Figure 8G:
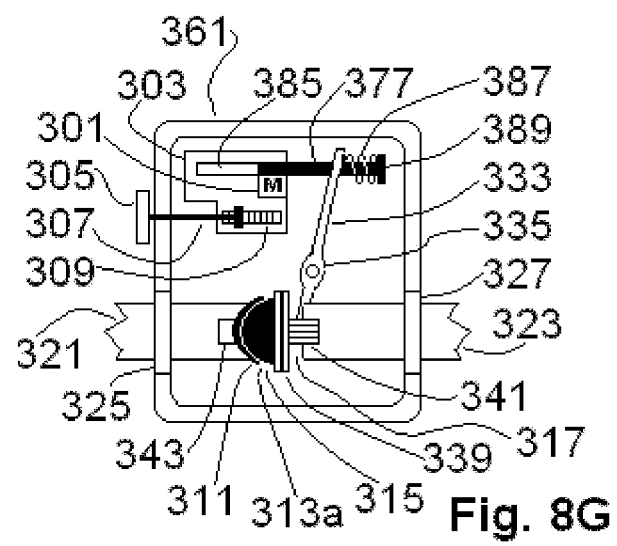

FIGS. 8 to 8G, for example, illustrate clutches comprising friction clutches, friction slip clutches and slip clutches used in various embodiments. These clutch names appear to be used interchangeably in their field and are used interchangeably herein to describe the present invention.

FIGS. 8 and 8A illustrate an embodiment of a friction clutch axle joining assembly to join and unjoined (set and unset) axles 221 in 223 comprised of:

clutch axle joining assembly housing 261, axle joiner control assembly 281 clutch lever 233 fastener 231 axles 221 and 223 which are accommodated by axle bearings 225 and 227 in housing 261), lever pivot (fulcrum) 235, splined rod portion 241 shown in three parts in FIG. 8 and in one part FIG. 8A, un-splined rod portion 243 (rod 241 and rod 243 are one piece or joined to act as one piece with a splined portion 241 and an un-splined portion 243, axle 221 has an opening to accommodate the un-splined portion of rod 243 so that rod 243 rotates freely within the opening on the end of axle 221.

Left pressure plate 253 which is attached to axle 221 as shown, clutch lining 251, clutch disc 249, clutch lining 247 and right pressure plate 245 which is spline-engaged with splined rod 241/243 as shown, clutch thrust bearing 239 (shown white, black, white as in FIGS. 5E and 5D), and spaces 255 and 257 which are shown in FIG. 8 but not shown in FIG. 8A.

FIGS. 8B and 8C illustrate an embodiment of a friction clutch axle joining assembly to join and unjoined (set and unset) axles 221 and 223. This embodiment does not have clutch lining 247, clutch disc 249 or clutch lining 251. In FIG. 8C, a thin white line is shown between the two engaged pressure plates 253 and 245, for illustration purposes.

In FIGS. 8 to 8C, left pressure plate 253 is fixed to the right end of axle 221 as shown; thus, left pressure plate 253 rotates as one with 221.

In this, as in other embodiments, a solenoid with a source of electric power could be configured to operate the engagement of the axles to join and unjoin them (set and unset).

FIGS. 8D and 8E depict an embodiment using a solenoid, plunger and spring to go from unset to set and vice versa. This embodiment employs:

a solenoid 283 to move plunger to 277 to go from unset to set and vice versa, and engage/holding spring 287 (compressed in FIG. 8D).

Solenoid space 285 is created when plunger 277 moves to the right as shown in FIG. 8E.

In the embodiments depicted in FIGS. 8D to 8E, and in other embodiments, an electric motor (not shown) with a source of electric power could be used instead of a solenoid to go from unset to set and vice versa.

FIGS. 8F and 8G illustrate an embodiment using a slip-clutch configured to join the axles up to a point with a motorized mechanism; if the torque differential between the two pressure plates exceeds a predetermined limit, there will be slippage allowing the two axles to rotate at different rotational speeds.

This embodiment is illustrated using curved clutch components. Clutch components, whether slip clutch or otherwise, can take various shapes and configurations including flat, curved, saw-toothed, scalloped, etc.

A slip-clutch axle joining assembly is comprised of:

clutch axle joining assembly housing 361, axle joiner control (not shown; this embodiment anticipates using electric wired control of the axle joining means, but a cable linkage or radio frequency, RF, means could also be used), adjustable motorized clutch lever assembly 303, lever plunger 377, lever plunger head 389, space 385 is created in the accommodation for lever plunger 377 in motorized clutch lever assembly 303 when axles 321 and 323 are joined, plunger motor 301,
clutch tension spring 387,
manual clutch adjustment control 305,
manual clutch adjustment linkage 307 with pinion means at right end,
manual clutch adjustment rack 309 to cooperate with linkage 307 pinion,
clutch lever pivot (fulcrum) 335,
clutch lever 333 (linked [not shown] to cause the thrust bearing to join the axles),
axles 321 and 323 accommodated by
axle bearings 325 and 327, respectively, in housing 361,
splined rod portion 341 shown in two parts in FIG. 8F and in one part FIG. 8G,
un-splined rod portion 343 (rod 341/343 are one piece or joined to act as one piece with a splined portion 341 and an un-splined portion 343.
Axle 321 has an opening to accommodate the un-splined portion of rod 343 so that rod 343 rotates freely within the opening on the end of axle 321.
Left pressure concave-surface 311 which is attached to axle 321 as shown (rod 341/343 runs through opening in concave surface 311, and
right pressure convex-surface 315 which is spline-engaged with splined rod 341/343 as shown,
clutch thrust bearing 339 (shown white, black, white as in FIGS. 5E and 5D), and space 313 which is shown in FIG. 8F (the location of space 313*a* is illustrated in FIG. 8G with a thin white curve which may not be visible depending on reproduction quality of FIG. 8G).

FIG. 8G also shows space 317 created when in the set position.

Figure 9:
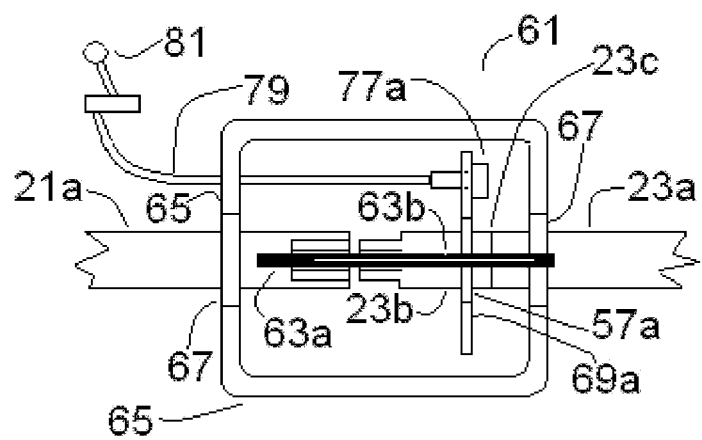
Figure 9A:
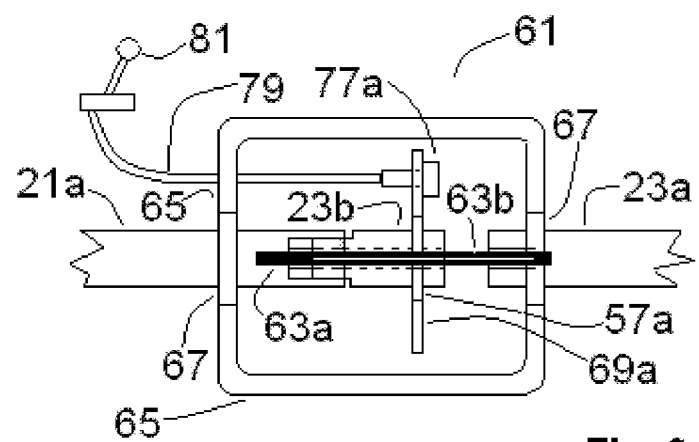

FIGS. 9 and 9A depict axle joiner assembly 61 which illustrates another embodiment to join and unjoined (set and unset) axles 21*a* to 23*b*; axle portion 23*b* is a sliding portion of axle 23*a*. The male splined left end of axle 23*b* may engage and disengage the female splined right end of axle 21*a* to join and unjoin (set and unset) axles 21*a* and 23*b*/23*a*.

Figure 10:
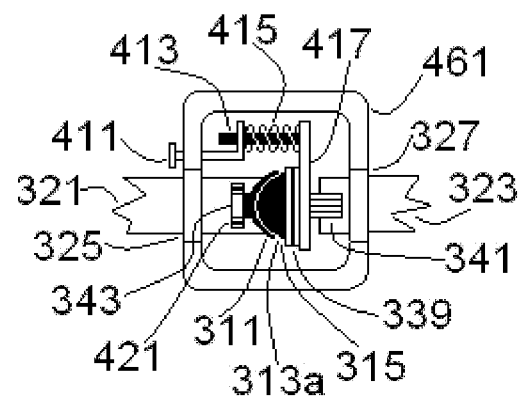

FIG. 10 illustrates an embodiment also using a slip-clutch configuration. This embodiment is illustrated using curved clutch components.

In this embodiment, a slip-clutch axle joining assembly is comprised of:
clutch axle joining assembly housing 461,
manual clutch adjustment control 411,
spring post 413,
clutch tension spring 415,
pusher plate 417,
axles 321 and 323 accommodated by
axle bearings 325 and 327 in housing 461,
splined rod portion 341 and un-splined rod portion 343 (rod 341/343 are one piece or joined to act as one piece with a splined portion 341 and an un-splined portion 343.
Bearing (ball or roller) 421, shown above and below (in white, black, white) un-splined rod portion 343. Bearing 421 is in an opening on the end of axle 321.
Left pressure concave-surface 311, which is attached to axle 321 as shown (rod 341/343 runs through opening in concave surface 311), and
right pressure convex-surface 315 which is spline-engaged with splined rod 341/343 as shown,
clutch thrust bearing 339 (shown white, black, white), and engagement location 313*a* (i.e., where the two pressure surfaces, 311 and 315, meet to be joined to rotate as one) in FIG. 10 has a thin white curve (which may not be visible depending on reproduction quality of FIG. 10).

Figure 11:
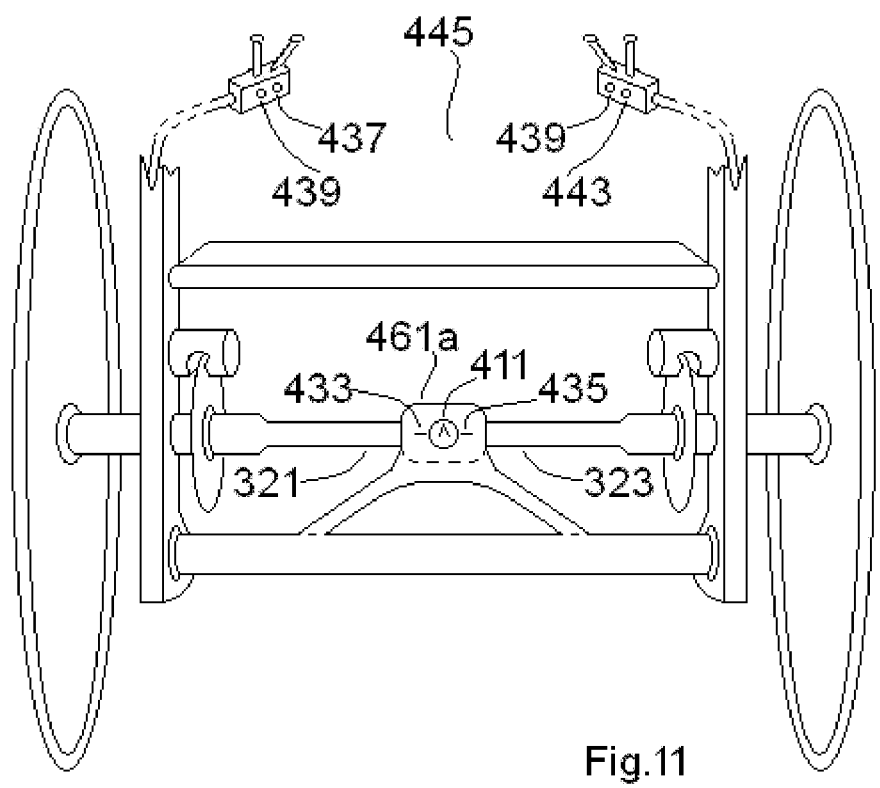

FIG. 11 illustrates another embodiment also using a slip-clutch configuration. The depictions illustrated in FIGS. 1 to 11 are not to any scale from one to the next and from one element to another illustrated within a given Figure.

Figure 12:
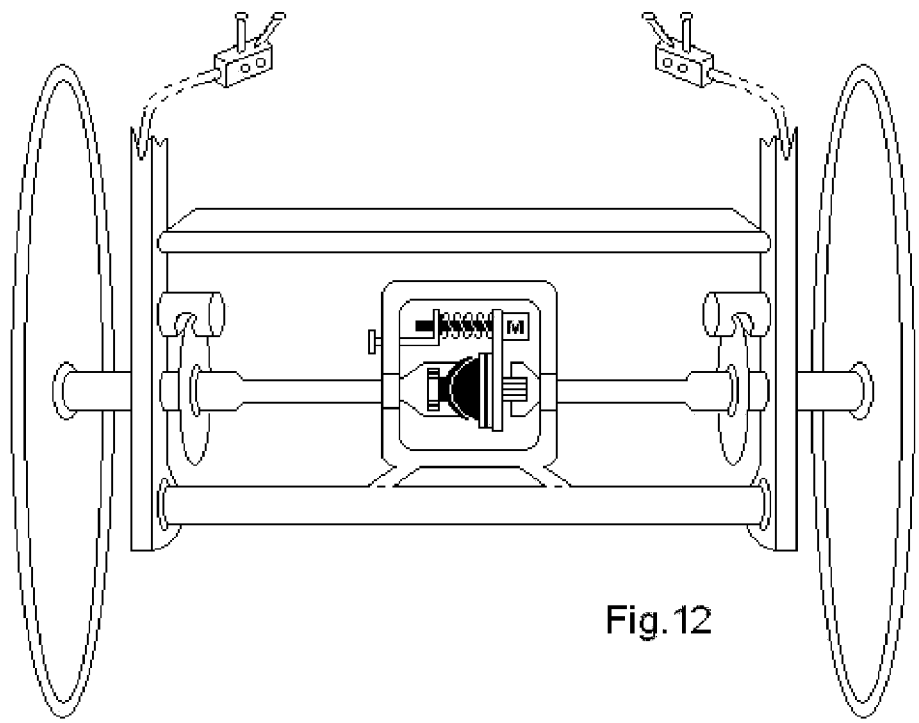
Figure 13:
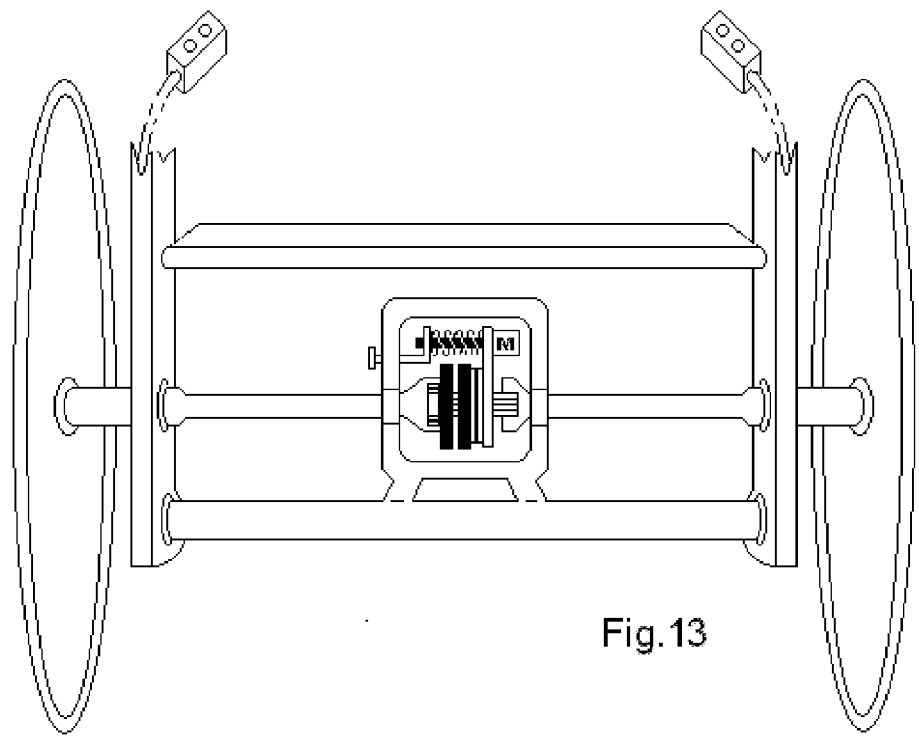

FIGS. 12 and 13 are unnumbered depictions of the rear of a wheelchair with modified illustrated embodiments installed as shown.

FIGS. 14 and 14A illustrate another embodiment to facilitate travel on sloped surfaces. This embodiment is characterized by use of a single axle having a wheel at each end, one of which wheels is fixed mounted to the axle and the other wheel is mounted (for example, on a ball bearing or roller bearing) so that it turns freely on the single axle. A slip-clutch configuration may be used to join a free-to-turn wheel to a single axle so that the free-to-turn wheel may turn in unison with the wheel that is fixed mounted to the axle or not if the slip-threshold level is exceeded.

Numbered parts depicted to describe the embodiment illustrated in FIGS. 14 and 14A are comprised of:
large wheel 501,
bearing 503,
inner race axle portion 525*b*,
splined axle portion 525*a*,
single axle 525,
wheel clutch plate 505,
space 507,
wheel-axle pressure joining plate 509,
thrust bearing 511,
pressure spring 527,
spring tensioner 513,
control collar 529,
fastener 531,
frame 519,
linkage 515 and
handle 517.

FIGS. 14B, 14C and 14D illustrate another embodiment to facilitate travel on sloped surfaces. This embodiment is characterized by use of a single axle having a wheel at each end, one of which wheels is fixed mounted to the axle and the other wheel is mounted (for example, on a ball bearing or roller bearing) so that it turns freely on the single axle. Crown gears, for example, may be configured to join and unjoin a free-to-turn wheel to a single axle so that the free-to-turn wheel may turn in unison with the wheel that is fixed mounted to the axle when the crown gears are engaged.

Numbered parts depicted to describe the embodiment illustrated in FIGS. 14B and 14C are comprised of:
large wheel 501,
bearing 503,
inner race axle portion 525*b*,
splined axle portion 525*a*,
single axle 525,
wheel crown gear 505*a*,
space 507*a*,
wheel-axle joining crown gear 509*a*,
thrust bearing 511,
pressure spring 527,
spring tensioner 513,
control collar 529,
fastener 531,
frame 519,
linkage 515 and
handle 517.

Figure 15:
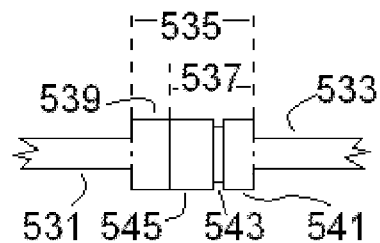

FIG. 15 depicts a commercially available slip clutch 535 mounted axle 531 to axle 533.

Figure 15A:
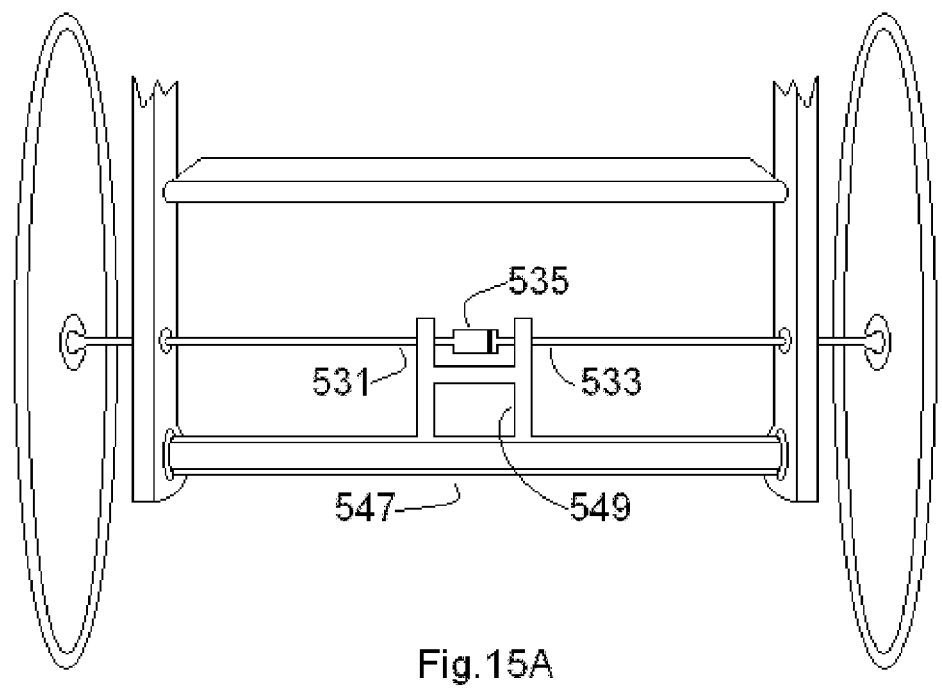

FIG. 15A illustrates a rear view of the wheelchair embodiment with a slip clutch 535 mounted axle to axle and structural support beam 547 connecting the left frame to the right frame and structural support strut 549 for axles 531 and 533. Brakes described above (not shown here) may also be installed as shown above.

Figure 16:
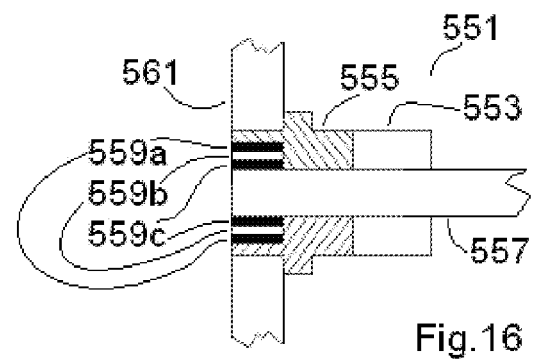

FIG. 16 depicts a commercially available slip clutch 551 mounted axle 557 to the hub area of the large wheel 561 as shown.

Figure 16A:
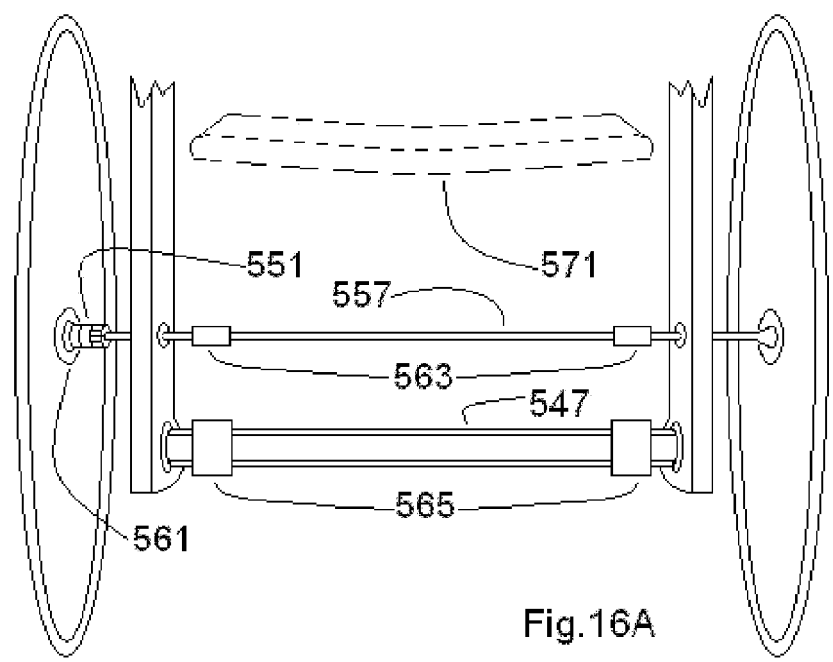

FIG. 16A illustrates a rear view of the wheelchair embodiment with a slip clutch 551 adapted to be mounted on the axle to the hub area of the large wheel 561 as shown. Exemplary means of temporarily removing axle 563 and support beam 547 so chair can be collapsed when not occupied are shown.

FIGS. 16B and 9B together illustrate another wheelchair embodiment which combines the embodiments illustrated and described in association with FIGS. 16, 9 and 9A.

FIGS. 16C and 14E together illustrate another wheelchair embodiment which combines the embodiments illustrated and described in association with FIGS. 16, 14B and 14C.

Figure 17:
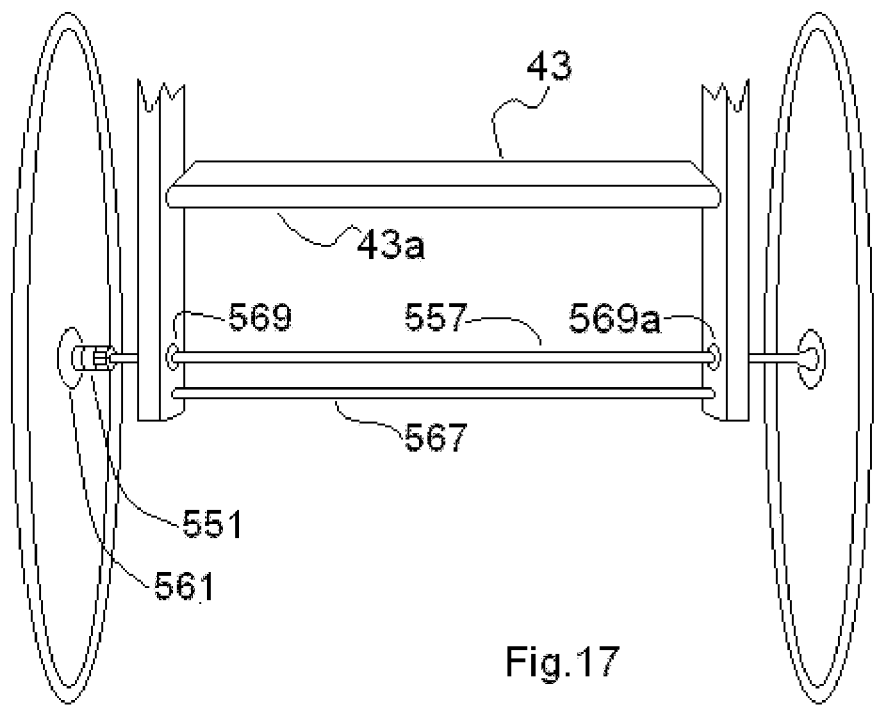
Figure 17A:
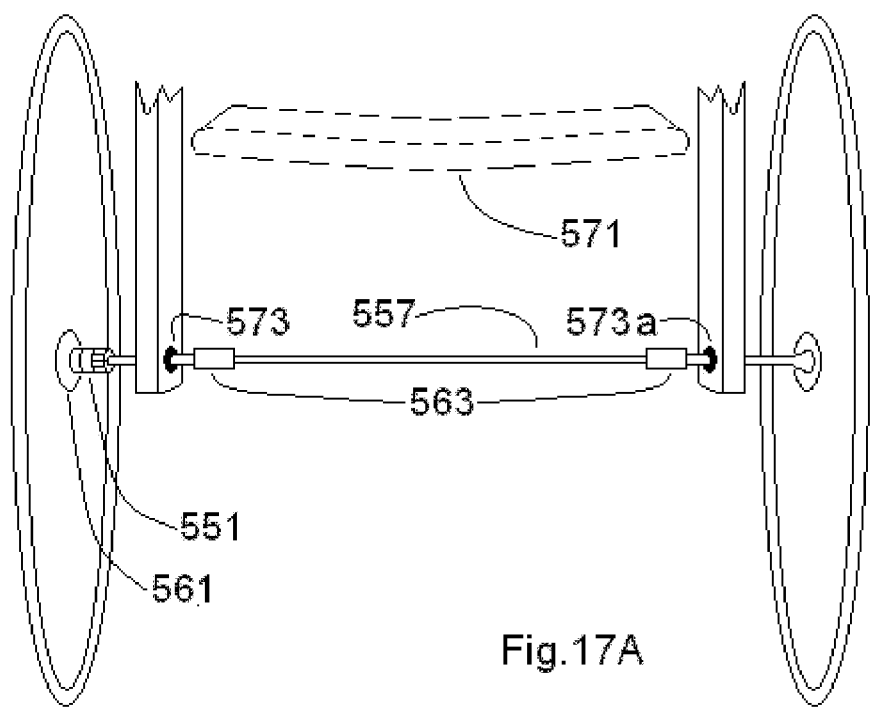

FIGS. 17 and 17A illustrate a rigid wheelchair and a collapsible wheelchair respectively. FIG. 17 depicts a rear view of the rigid wheelchair embodiment similar to the body embodiment illustrated in FIG. 16A but without removable members. FIG. 17A depicts a rear view of the collapsible wheelchair embodiment utilizing Wingquist's self-aligning ball bearings.

Figure 18:
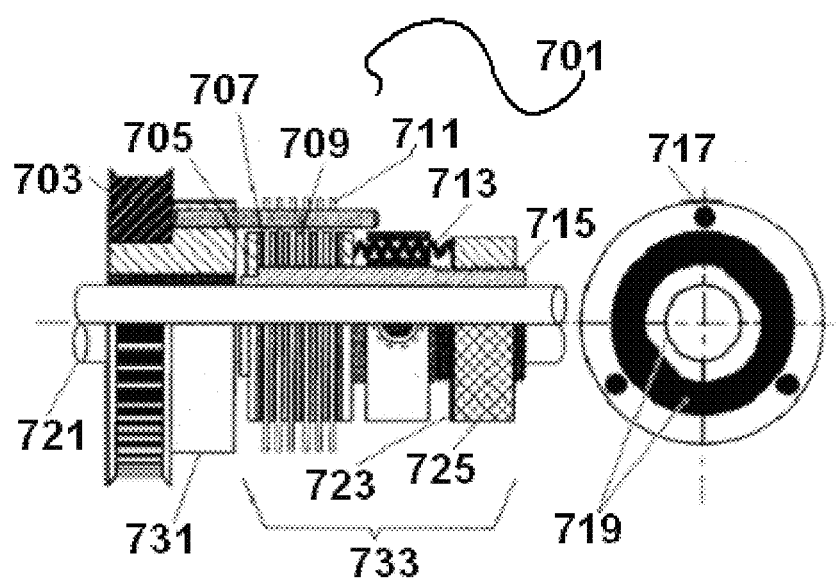

FIG. 18 describes the Function and Construction of commercially available multi-plate slip clutches. FIG. 18 was copied from the Internet (applicant lost the link).

Figure 19:
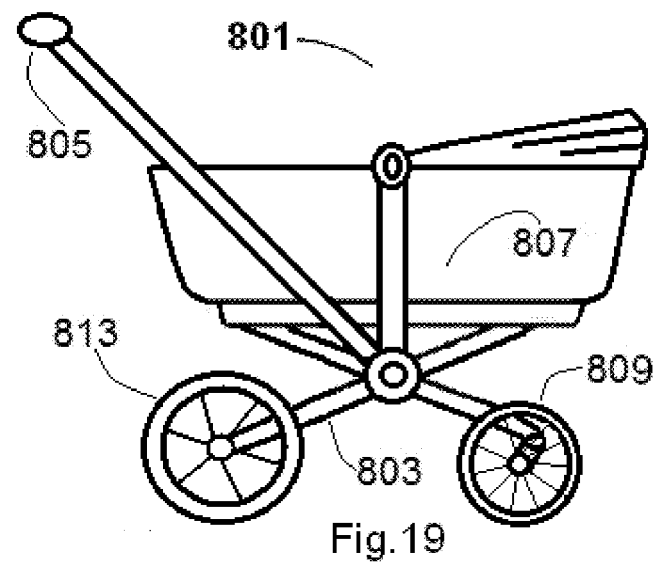

FIG. 19 illustrates a side view of a four wheeled baby carriage, referred to as a stroller.

Figure 19A:
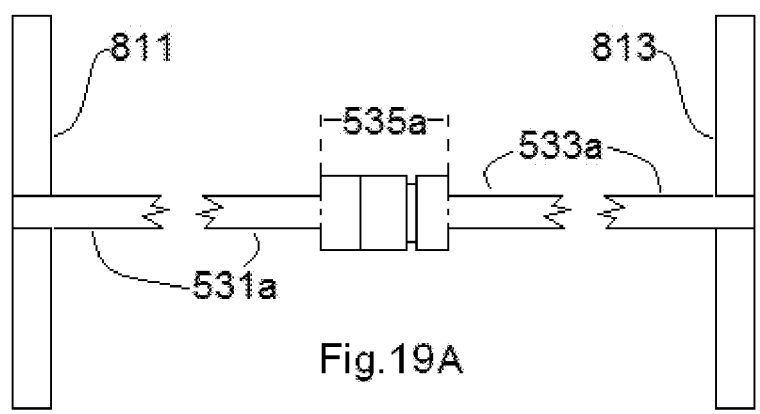

FIG. 19A depicts a rear view illustrated schematically of the rear wheels of the stroller illustrated in FIG. 19.

Figure 20:
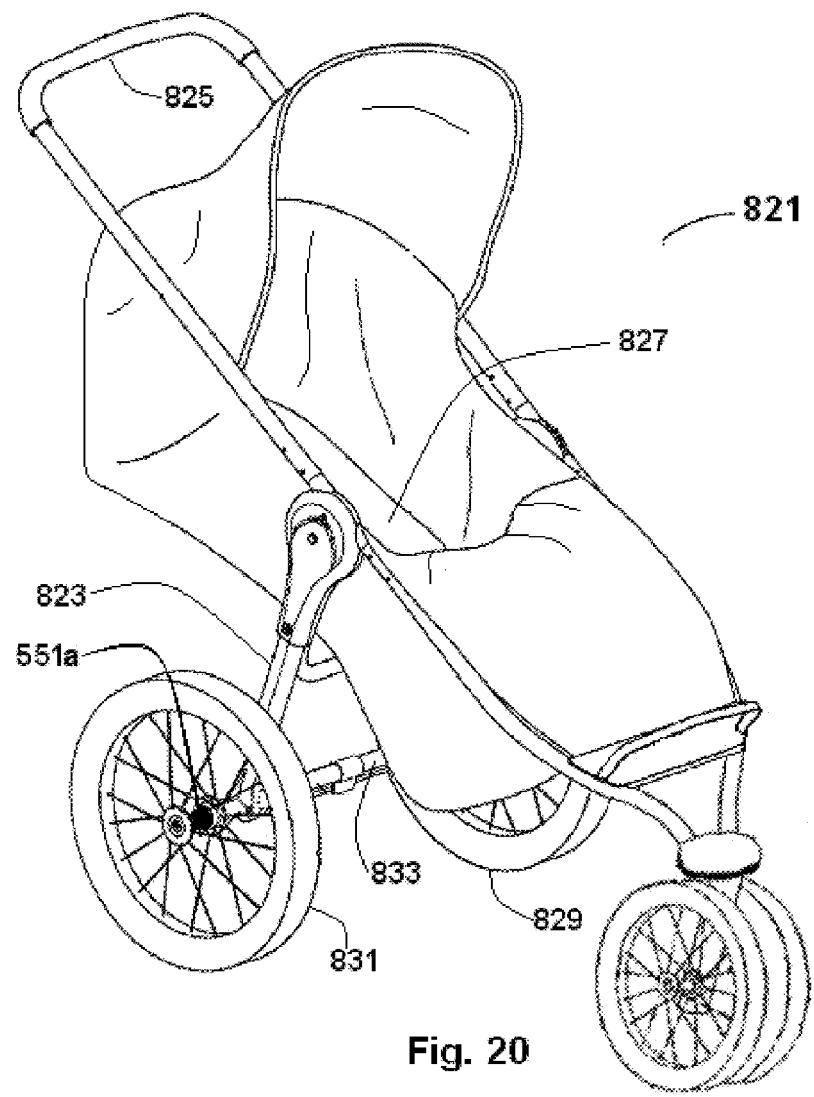

FIG. 20 illustrates a perspective view of a stroller.

Figure 20A:
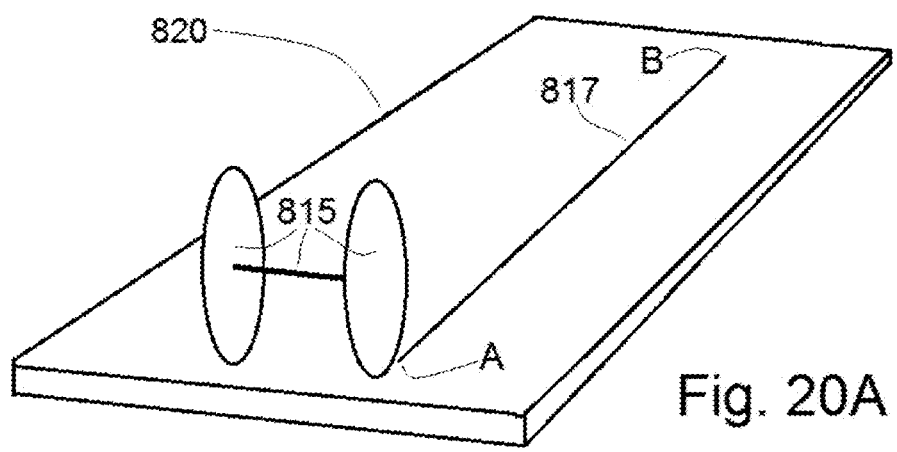
Figure 20B:
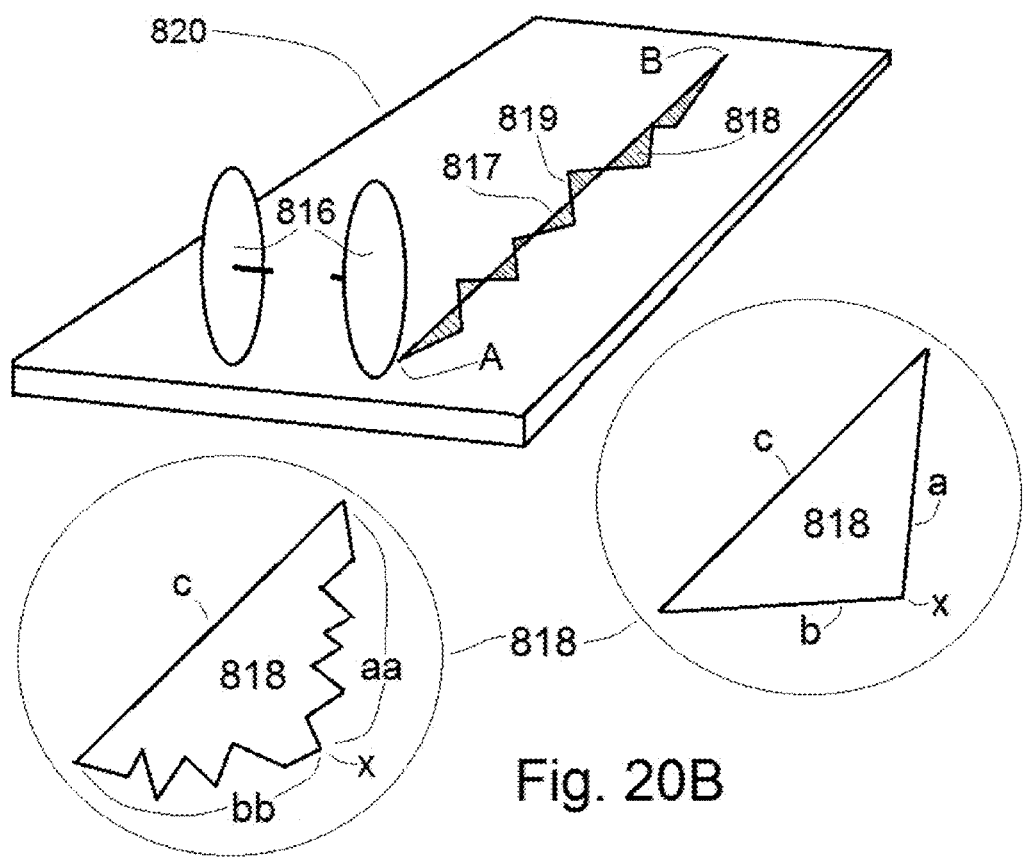

FIGS. 20A and 20B illustrate the two rear wheels of a stroller or wheelchair conveyance on a flat level sidewalk.

Figure 21:
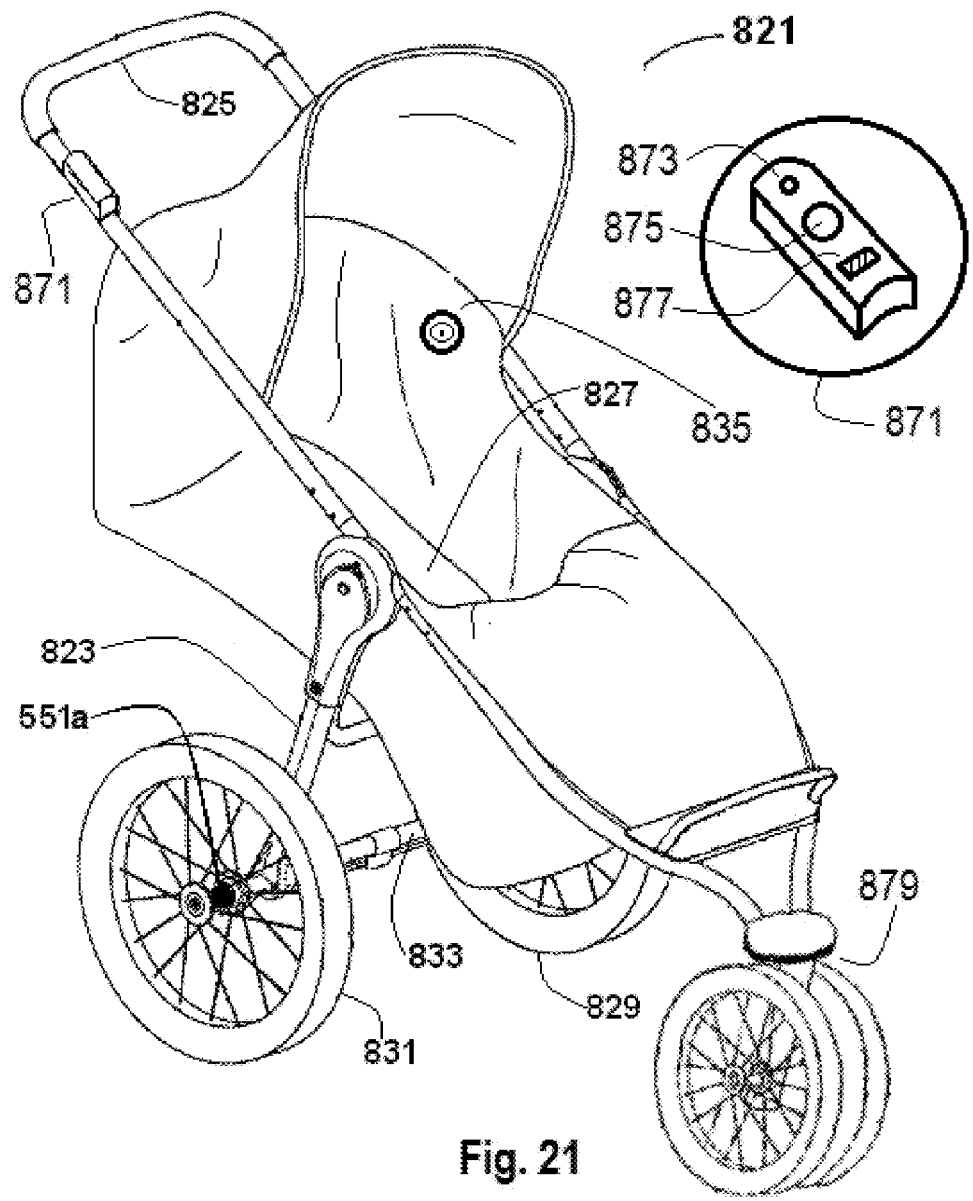

FIG. 21 illustrates the perspective view of stroller 821 from FIG. 20 with added accessories.

Figure 22:
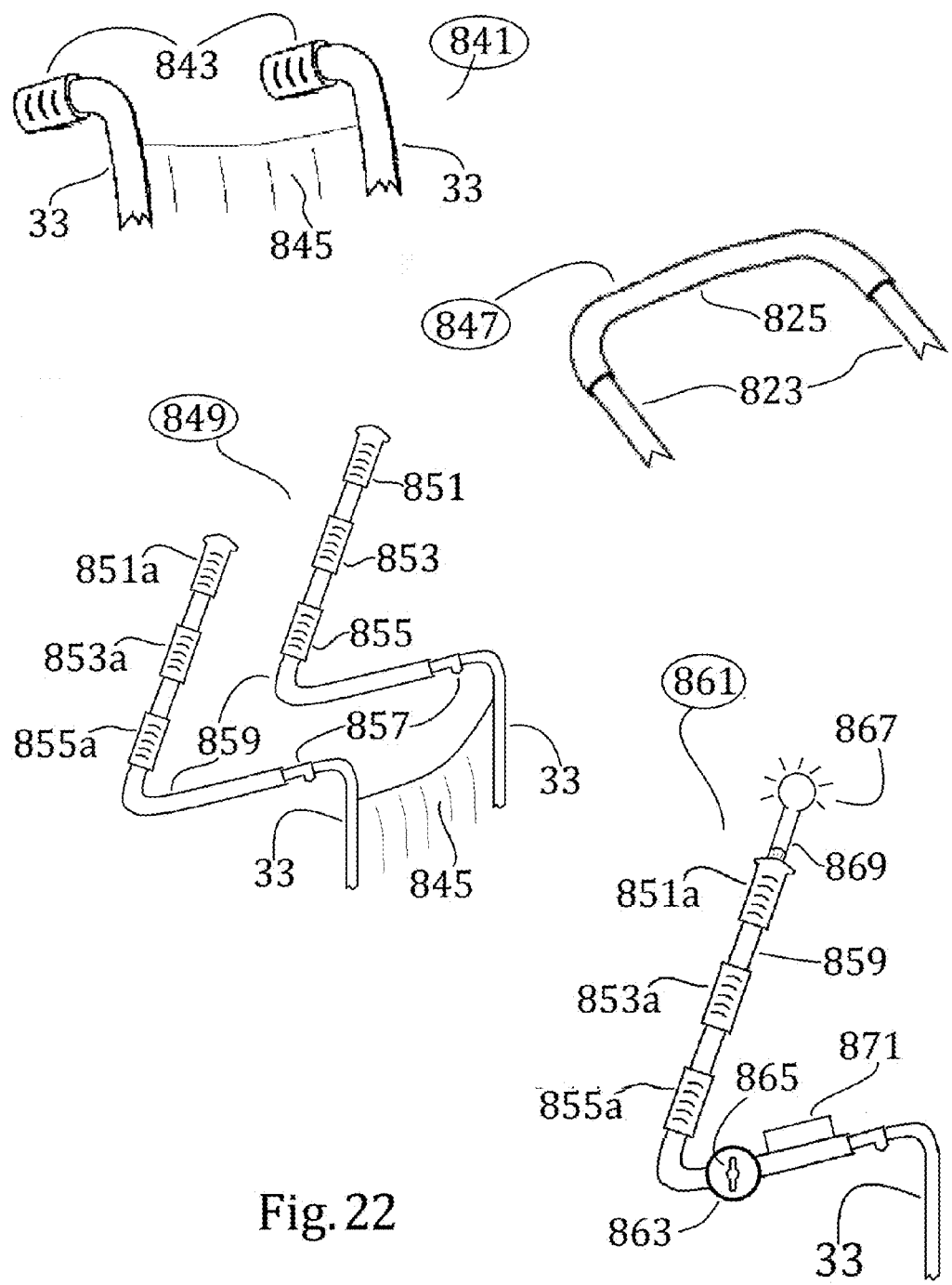

FIG. 22 is comprised of various views of conventional and improved handles for pushing stroller and wheelchair conveyances.

Figure 23:
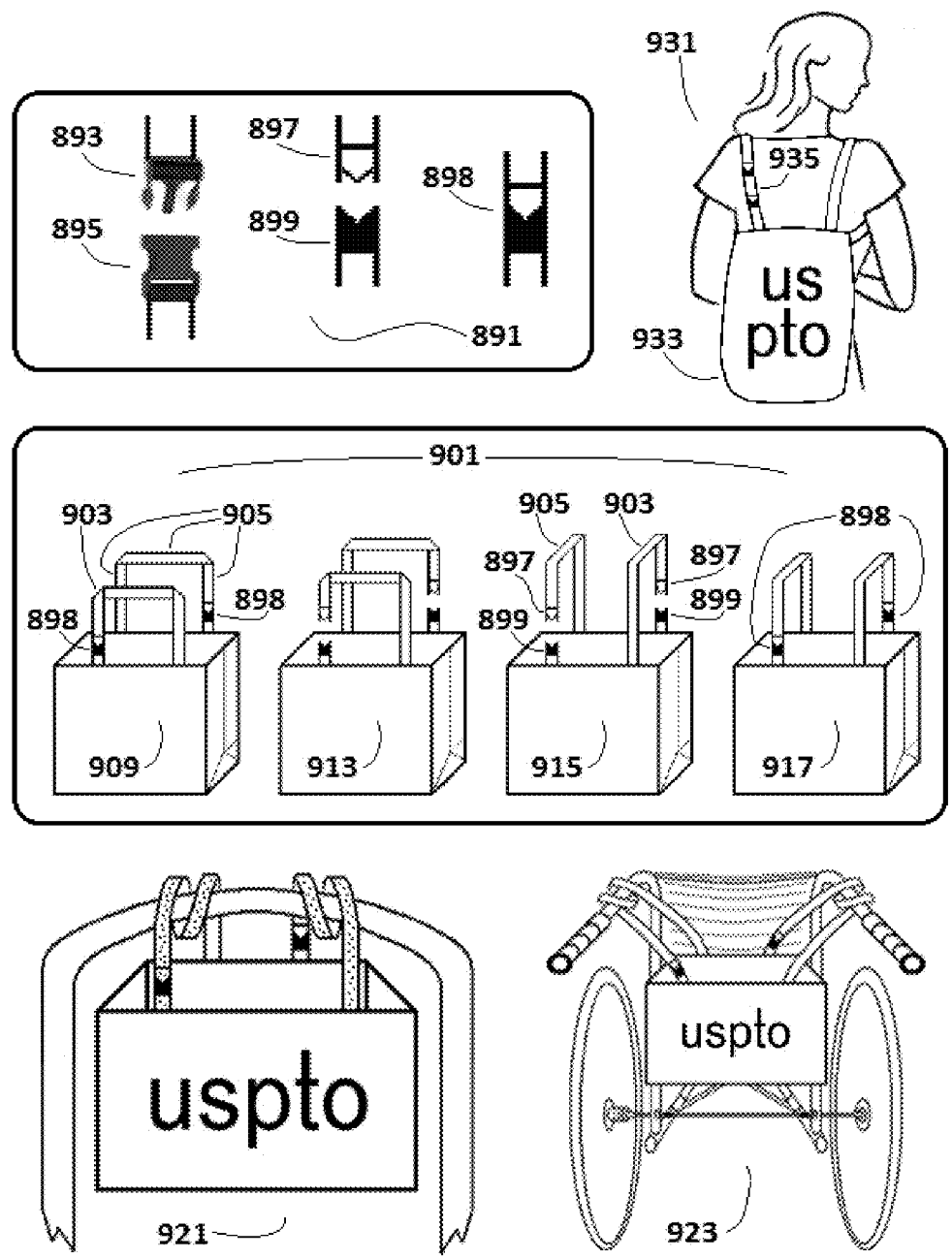

FIG. 23 illustrates a multi-purpose tote bag called the "Everything & Everywhere Bag™" comprising implementation as an accessory for a stroller and wheelchair.

Figure 24:
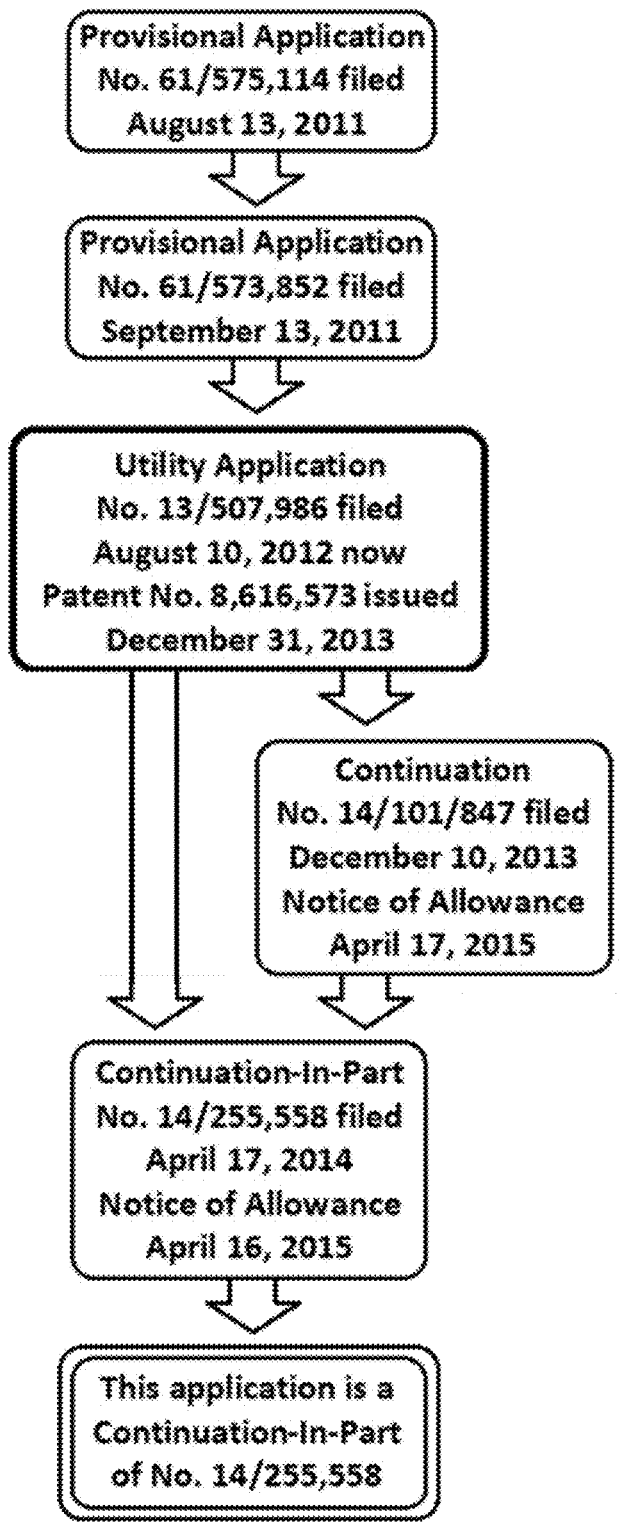

FIG. 24, a table family-tree, depicts the family of six related patent applications, which, at the time of filing the present utility application, said family was comprised of two provisionals, two patents and two pending sibling applications.

DETAILED DESCRIPTION

FIG. 1 depicts a limited rear view of a Safer, Easier-to-Operate Wheelchair with a braking system and axle joiner. In some embodiments, each of the wheelchair's large wheels has only one hand rail 4, 6 for the passenger to self propel the wheelchair. The passenger can only propel the left wheel with his left arm, and the right wheel only with his right arm. Each large wheel is fixed to one end of its own axle; the two large wheels' axles' other ends (located below the wheelchair seat) are adapted to be joined together by axle joining/unjoining means while the chair is in motion or stopped, and the axle joining/unjoining means may allow each axle to rotate independently of the other during normal wheelchair operation.

The passenger or the person pushing the wheelchair can go from unset to set to join the axles (i.e., lock the axles together so they rotate as one) at any time. The axles may stay joined, allowing continuous straight travel on a sloping surface, until the passenger or the person pushing the wheelchair goes from set to unset to unjoin the axles, which s/he may do at any time, so the axles may rotate at different speeds.

The physical dimensions (non-limiting) of a mechanical system contemplated by embodiments for applicant's Drive Cruiser III wheelchair with 24 inch wheels are, for the overall width, about 26 inches from the outside end of one large wheel to the other. Drive's two large wheels now ride on axles, each axle about 5.5 inches long. The space between the inside ends of the 5.5 inch axle housings is about 15 inches. The weight of the additional apparatus contemplated by some embodiments would depend on the size and weight of the materials used.

As depicted in FIG. 1, a right large wheel 5 is fixed to right axle 23 as depicted by right axle end 11 of right axle 23, and a left large wheel 3 is similarly fixed to left axle 21.

The disc brake assembly 9's caliper for right large wheel 5 is controlled via linkage by right brake assembly control 19.

The disc brake assembly 7's caliper for left large wheel 3 is controlled via linkage by left brake assembly control 17.

Manual left brake assembly control (17) and manual right brake assembly control (19) are mounted on respective sides of the wheelchair for the passenger to operate conveniently (mounting not shown).

Axle joiner housing 13 links the two axles 21 and 23 in the vicinity of the middle of the wheelchair. Axle joiner control 15 may be operated by the passenger, and another axle joiner control 25, may be operated by the passenger pusher. The two axle joiner controls, 25 and 15, if used, are each conveniently mounted respectively for the passenger and the pusher (mounting not shown). Or, a single axle joiner control can be mounted so as to be reasonably accessible by the passenger and the pusher (mounting not shown).

Axle joiner housing 13 provides a means to join or lock both axles together on a sloping surface to facilitate propelling the chair. Axle joiner housing 13 may allow the axles to be unlocked for turns and operation on surfaces that are not sloped, via axle joiner control 15 or 25 shown in FIG. 1.

Control means for brake assembly controls 17 and 19, and axle joiner controls 15 and 25, may be via cable, linkage, hydraulic, pneumatic, servo, electrical, solenoid or other suitable means.

FIG. 2 depicts a portion of FIG. 1 with additional numbered elements of a wheelchair braking system (31).

Wheelchair frame upright 33 accommodates axle 21. Axles 21 and 23 are each one piece—the three visible portions of axle 21 are each numbered. Axle 21 is fixed to wheel 3 with axle wheel fastener 35.

The accommodation in frame upright 33 for axle 21 may be an axle-frame bearing 37. Bearings such as roller or ball bearings and the like may be suitable to allow axle 21 to rotate freely in frame upright 33's axle accommodation. Such bearings may also be suitable for axle joiner's bearing 49 to accommodate axle 23 in the axle joiner's housing (similar for axle 21).

The disc brake-axle fastener 39 fixes together the disc portion of brake assembly 7 to axle 21. The disc brake caliper housing 51 of brake assembly 7 is joined to the frame via frame-caliper joiner 41. However, caliper housing 51 may be joined directly to frame upright 33, without caliper joiner 41.

Structural strut 45 joins left frame upright 33 to the right frame upright (not shown) adding rigidity to the wheelchair frame. Axle joiner housing 13 is joined to strut 45 via joiner 47.

Strut 45 may be located above the axles, in which case axle joiner housing 13 may be joined to strut 45 with a joiner above axle joiner housing 13. Caliper housing 51 with or without joiner 41 may be located above the axles.

Alternatively axles 21 and 23 can be accommodated inside of axle tube housings (not shown). The axle tubes would be configured to allow respective axles 21 and 23 to rotate freely. The axle tube may extend to or through frame 33. In any case, wheels 3 and 5 would be fixed to their respective axles 21 and 23. The use of axle tube housings may decrease the value of employing a structural strut such as strut 45.

Instead of structural strut 45, a structural strut (not shown in FIG. 2) may join the two caliper's together directly, and axle joiner housing 13 may also be joined to the same structural strut (not shown in FIG. 2).

FIG. 3 depicts a portion of FIG. 1 with additional numbered elements of a wheelchair braking system (31).

Caliper structural strut 53 joins the two caliper's housings, disc brake caliper housing 51 and the other caliper housing (not shown) together, and axle joiner housing 13 may be joined to caliper structural strut 53 strut-axle joiner brackets 55.

FIG. 4 depicts a portion of FIG. 1 with all numbered elements from FIGS. 2 and 3 of a wheelchair braking system (31).

FIG. 5 depicts splined axle joining assembly 61 including a portion of the left axle 21 and right axle 23 shown in FIGS. 1 to 4; the left axle 21 in FIG. 5 has male splines on the inside end as shown and the right axle 23 depicted has male splines on the inside end as partially shown.

A free-standing (free-floating) pin 63, partially visible in FIG. 5, may be utilized and accommodated in close-fitting lubricated pin 63 openings in the ends of axles 21 and 23 (openings not shown) (or, pin 63 may be fixed in one axle and free to rotate in the other axle); pin 63 allows the axles to rotate independently of each other; pin 63 aids axial alignment of axles 21's axis with axle 23's axis.

A splined axle joining assembly housing 65 may be utilized to house axle joiner assembly 61. Housing 65 may be sealed to hold a suitable lubricant to keep the inside components lubricated. Given the relatively slow movement of a wheelchair and the relatively light weight of an occupied wheelchair, a supply of lubricant in splined axle joining assembly housing 65 may not be needed. Components that need lubrication may have means to be sufficiently lubricated without an additional supply of lubricant contained in housing 65.

Seal bearings 67 are depicted in FIG. 5. Seal bearings 67 allow axles 21 and 23 to rotate freely and to contain the supply of a lubricant in the axle joining assembly housing 65.

Axle joiner push-plate 69 does not rotate. Push-plate 69 can move left and right (as depicted in FIGS. 5 to 5C) on push-plate guide 71 (more than one push-plate guide 71 may be utilized).

Splined axle joiner 75 always rotates with axle 23 because joiner 75 is always "splined" (its female splines are always engaged with male splines of axle 23) to axle 23. Splines on joiner 75 are always mated with some of the splines on axle 23 so joiner 75 and axle 23 turn as one.

Slip-washer 73 (shown in black) may be free-wheeling, i.e., free to rotate if influenced by splined axle joiner 75, or free to not rotate if influenced by non-rotating push plate 69. The center of slip washer 73 fits around axle 23 so that slip washer 73 need not rotate with axle 23. More than one slip washer 73 may be used. If two slip washers 73 were used when axles 21 and 23 are joined (set), the slip washer 73 adjacent to axle joiner 75 may be rotating while the slip washer 73 adjacent to push plate 69 may not be rotating. This and similar configurations allow non rotating push plate 69 to push rotating splined axle joiner 75 to join axles 21 and 23 so they rotate as if they were a one-piece axle.

Push plate 69 is controlled by axle joiner control cable 79. Axle joiner control cable 79 is linked to push plate 69 by fastener 77 as illustrated. Control cable 79 utilizes a suitable fitting (such as a lubricant sealing bushing) in axle joining assembly housing 65.

Control cable 79 is operated by axle joiner control 81. Some embodiments contemplate separate axle joiner controls 81 for the passenger and the wheelchair pusher, or one control accessible by either the passenger or the pusher.

FIG. 5 depicts the splined axle joiner 75 in the unlocked (not joined, unset) position.

FIG. 5A depicts the splined axle joiner 75 in the process of joining axles 21 and 23; i.e., splined axle joiner 75 is shown joining (or coupling, or locking, or engaging) axles 21 and 23 together so they rotate as if one solid axle. Pin 63 is shown in outline in FIG. 5A because it is covered by axle joiner 75.

Axle joiner 75 will join axle 23 to axle 21 when axle 21's splines are sufficiently lined up with the splines in joiner 75 so that joiner 75 may slide to the left, thus engaging the splines of axle 21. When axles 21 and 23 become joined, the wheelchair will go straight without pulling to one side no matter the slant of the surface. If the splines on axle 21 are not lined up with the splines in joiner 75, joiner 75 may not be able to slide onto axle 21 to join to axle 23. The joining of axles 21 and 23 may occur when the splines on axle 21 are lined up (in alignment) with the internal splines in joiner 75.

If the wheelchair is going straight, so the wheels are rotating at the same speed, and the splines of axle 21 and joiner 75 are not lined up, as depicted in FIG. 5A, joining may not occur until there is a (slight) differential in the rotational speed of axles 21 and 23. Such a differential is likely to occur in a short movement of the chair—how short a movement depends on the number of splines. The greater the number of splines on the ends of axles 21 and 23 and axle joiner 75, the lesser movement of the chair would be required, and vice versa. The movement required to line up axle 21 and axle joint or 75 is in inverse proportion to the number of splines used; in the aggregate, more splines means quicker joining.

The engagement ends of the splines (as illustrated, the right end of the splines on axle 21 and the left end of joiner 75) may be beveled or tapered with round, conical, pointed etc. ends (not shown) to facilitate the joining of axle 21 and joiner 75 (similar beveling or tapering may be used to facilitate joining of splined axles 21*a* and 23*b*/23*a* in FIGS. 9 and 9A).

As shown in a bird's eye view of control assembly 91, joiner control housing 83 may have an elongated channel 85 with a detent position at each end as illustrated in FIG. 5 (shaped like a squared capital letter "C" as shown). Axle joiner control 81 may be shifted to detent position 89 of channel 85 to the "unset" position. The unset position corresponds to the axles being unlocked—the unset position is when the axles 21 and 23 are not joined. In the unset position, splined axle joiner 75 is positioned to the right as illustrated in FIG. 5.

As illustrated in the cut-away view of control assembly 91, axle joiner control 81 may be shifted to detent position 87 of channel 85 to the "set" position. The set position is when the axles 21 and 23 are joined. In the set position, splined axle joiner 75 is positioned to the left engaged with the splines on axle 21 so the axles 21 and 23 rotate as if one solid axle as illustrated in FIG. 5B. However, FIG. 5A depicts the process of setting—axle joiner 75 appears momentarily prevented from joining axle 21 because the splines of axle joiner 75 and axle 21 are not sufficiently lined up for engagement.

Spline engagement will be aided by engagement spring 93, shown in FIG. 5A, as the chair is moved (spring 93 is discussed in association with FIGS. 6 and 6A).

FIG. 5B illustrates the set position wherein axles 21 and 23 rotate as one. In this position, no matter how the chair is propelled, it will go straight even if the surface is slanted or sloped.

FIG. 5C, shows return spring 59 in the stretched state. Return spring 59 is in its compressed state in FIGS. 5, 5A and 5B, and therefore is not viewable in those Figs. In FIG. 5C, return spring 59 is depicted connected on its right to push plate 69, and on the left end to return spring 59 which is depicted connected to the outer race of return bearing 57 (e.g., roller bearing or ball bearing [a ball bearing {not shown} is comprised of an outer race, and inner race, separators and balls] or the like). The outer race of return bearing 57 does not rotate. The inner race of return bearing 57 is fixed tightly on splined axle joiner 75. The inner race of return bearing 57 rotates in unison with splined axle joiner 75.

When axle joiner control 81 is shifted from set to unset (going from FIG. 5B to FIG. 5), axle joiner 75 may not uncouple (unjoin) axles 21 and 25 immediately if there is a differential in the rotation speed of axles 21 and 25 (tension, even if a supply of lubricant is used, between the splines on axle 21 and the splines on axle joiner 75 may not allow axle joiner 75 to return to the unset position immediately). However, momentarily after axle joiner control 81 is shifted from set to unset, the movement of the wheelchair will allow return spring 59 to return to its compressed state, bringing axle joiner 75 to the unset position shown in FIG. 5.

We are not dealing with high speed in the wheelchair field of art. [Wheelchair racing does not allow the use of any form of equipment with gears.] Axle 23, for example, rotates one revolution when the chair moves the distance of the circumference of a large wheel, commonly, a 24 inch diameter wheel which is over 6 feet in circumference.)

Further arrangements utilizing various types of springs, pulleys, levers, pivots and the like may be adapted to operate with fastener 77, cable 79, joiner control 81, push plate 69 and push plate guide(s) 71, or adapted in other ways to join the two large wheels' axles on a manually-operated wheelchair, and would fall within the scope of disclosed embodiments.

FIGS. 5D and 5E use a thrust bearing: In this embodiment, a ball or roller "thrust bearing" or the like (e.g., two flat-faced similarly-raced race-rings separated by the balls of a ball bearing or by rollers) (not shown) may be used instead of slip-washer 73 and return bearing 57.

"A thrust bearing is a particular type of rotary bearing. Like other bearings they permit rotation between parts, but they are designed to support a high axial load while doing this." Quote from Wikipedia's web site.

Thrust bearings used in automobiles typically deal with hundreds of horsepower. In our wheelchair application, we only have to deal with one human-power, so, generally speaking, light-load components will suffice.

Also, the weight of an occupied wheelchair is supported by the wheels and their axles in the ball or roller bearing supported by the wheelchair frame; the axle joining means of some of the embodiments need not be constructed with heavy-duty components.

Referring to FIG. 5D, return thrust bearing 97 is illustrated "white, black, white"; the black represents the balls (or rollers) of the bearing and the left and right bearing race rings are shown in white. The left side race ring rotates as one with axle joiner 75/axle 23, and the right side race ring of return thrust bearing 97 does not rotate because it is fixed to the left end of a return spring (similar to return spring 59 in FIG. 5C), and the right end of the return spring is fixed to pusher plate 69. In FIGS. 5D and 5E the return spring is not illustrated because it is compressed and not visible. However, in FIGS. 5D and 5E, return spring pointer 99 is pointing to the location of the return spring. The similarly numbered elements in FIGS. 5C and 5E function as described above for FIGS. 5 to 5C.

FIGS. 6 and 6A depict one such embodiment. For example, the end of axle joiner control cable 79 is shown attached to the left end of engage spring 93 in FIGS. 6 and 6A. The right end of engage spring 93 is attached to axle joiner control cable fastener 77. Engage spring 93 is shown on engage spring post 95 in FIGS. 6 and 6A.

In the embodiment shown in FIGS. 6 and 6A, axel joiner control cable 79 may be inside a sheath (not shown) which runs from axle joiner control assembly 91 and is attached to axle joiner control cable fastener 77.

In FIGS. 5D and 5E, when axle joiner control 81 is shifted from unset to set, axle joiner 75 may not couple (join) with axle 21 immediately if their respective splines are not sufficiently in alignment. In this case, engage spring 93 may stretch urging axle joiner 75 to join (couple) with axle 21 (see FIG. 5A). Momentarily after axle joiner control 81 is shifted from unset to set, movement of the wheelchair will allow engage spring 93 to return to its compressed state bringing axle joiner 75 to the set position shown in FIGS. 5B and 5E.

When the operator shifts from unset (FIG. 5) to set (FIG. 5A), return spring 59 (shown in FIG. 5B) is compressed and engage spring 93 (shown in FIGS. 6 and 6A) may stretch.

When the operator shifts from set (FIG. 5A) to unset (FIG. 5), return spring 59 (shown in FIG. 5B) may stretch and engage spring 93 (shown in FIGS. 6 and 6A) is compressed.

When axles 21 and 23 are joined (in the set position) (assuming that the large drive wheels do not slide on the surface), the wheelchair will go straight whether it is propelled by the passenger or the pusher, whether it is propelled with one or two arms, whether it is propelled by gravity or the wind. That is the way a wheelchair with a straight (single) axle on which the large wheels are fixed works.

FIGS. 7 and 7A illustrate the rear of a wheelchair such as the Drive Cruise III model with some embodiments installed.

In FIG. 7, splined axle joining assembly 161 is depicted housing the splined ends of axles 121 and 123. Axles 121 and 123 may be tapered (e.g., as shown where the pointers for numbers 121 and 123 are pointing in FIGS. 7 and 7a). (Axles 121 and 123 are not shown tapered in previous Figs.) Passenger axle joiner control 115 and pusher axle joiner control 125 are illustrated linked to axle joining assembly 161. For example, the linkage could be the type associated with bicycles or otherwise. Left and right hand brake assembly controls, 117 and 119 respectively, are illustrated linked to their respective brake assemblies 107 and 109. Structural support strut 145 is shown connected to left wheelchair frame upright 133 and right frame upright 133a.

Passenger seat 43 is shown with a (rigid) structural support strut 43a. Additional structural support struts (not shown) linked to the frame may be utilized.

In FIG. 7A, splined axle joiner assembly 161a is connected to structural support strut 145 by brace 147. The splined axle joiner assembly 161a is depicted controlled by the passenger set/unset control 115a via radio wave (rf not shown), or it and may be via an electrical (e.g., wire) connection (not shown; wiring may be run inside the wheelchair's frame). An axle joiner push plate (not shown) in the splined axle joiner assembly 161a may be operated by a magnetic latching solenoid. For example, some such solenoids can be operated with 3vdc from two batteries.

FIG. 7B is an unnumbered depiction of FIG. 7A for review.

FIGS. 8 and 8A illustrate an embodiment of a friction clutch axle joining assembly to join (without slippage) and unjoin (set and unset) axles 221 and 223. Clutch axle joining assembly housing 261, is controlled by axle joiner control assembly 281. The control mechanism is fastened to clutch lever 233 with fastener 231 and is configured to allow axle joiner control 281 to join and unjoin axles 221 and 223 by pivoting on lever pivot 235 from the clutch-unengaged position shown in FIG. 8 (unjoined, unset) to the clutch engaged position shown in FIG. 8A (joined, set).

The splined portion of rod 241 is illustrated in three parts in FIG. 8 and in one part FIG. 8A. The un-splined portion of rod 243 is illustrated without splines (rod 243 and rod 241 are one piece, or joined together to act as one piece, with a splined portion 241 and a un-splined portion 243).

Axle 221 has an opening to accommodate the un-splined portion of rod 243 so that rod 243 rotates freely within the end of axle 221. In the set position, axles 221 and 223 and rod 243/241 will all rotate about the same axis at the same rotational speed when the wheelchair is moving—and the wheelchair will go straight (forward or backward) on slanted sidewalk surfaces no matter how it is being propelled.

In the unset position (FIG. 8), axles 221 and 223 and rod 243/241 will rotate about the same axis when the wheelchair is moving but axle 221 and axle 223 are not joined in the unset position and are therefore free to rotate at different rotational speeds.

Clutch thrust bearing 239 is illustrated "white, black, white"; the black represents the balls (or rollers) of the bearing and the left and right bearing race rings are shown in white. The left side race ring of thrust bearing 239 rotates as one with right pressure plate 245. The right side race ring of thrust bearing 239 does not rotate—it is linked to clutch lever 233 (for example, with a connecting piece such as a two-pronged fork shaped connector, not shown) so that it can be moved to the left (to set position) and to the right (to unset position) by clutch lever 233.

The left side race ring of thrust bearing 239, pressure plate 245, clutch lining 247, clutch disc 249 and clutch lining 251 are all splined together on the splined rod portion 241 of rod 243/241)—they rotate as one when the chair is moving.

When clutch control 281 is shifted from the unset position illustrated in FIG. 8 to the set position illustrated in FIG. 8A, right pressure plate 245 moves to the left to engage pressure plate 253 as it is pushed by thrust bearing 239 which is pushed by clutch lever 233 pivoting on fulcrum lever pivot 235. When pressure plate 253 is engaged by clutch lining 251, axles 221 and 223 become joined in the set position so that axles 221 and 223 will rotate at the same rotational speed—in the set position, the chair will move in a straight direction no matter how it is propelled (as long as one or both of the wheelchair's wheels do not slip on the surface).

Space 255 between left pressure plate 253 and clutch lining 251 and space 257 between clutch lining 247 and right pressure plate 245 are only shown in FIG. 8—spaces 255 and 257 are occupied with clutch components when clutch control 281 is shifted to the set position and joins the axles 221 and 223.

FIGS. 8B and 8C illustrate an embodiment of a friction clutch axle joining assembly to join (without slippage) and unjoin (set and unset) axles 221 and 223. FIGS. 8B and 8C operate like FIGS. 8 and 8A but use fewer parts than FIGS. 8 and 8A. This embodiment does not have clutch lining 247, clutch disc 249 or clutch lining 251. Pressure plate 245 engages pressure plate 253 when control 281 is shifted from unset (FIG. 8B) to set (FIG. 8C) eliminating space 255 from between the two pressure plates so that they become joined.

An engage (set) spring and or disengage (return) spring could be configured to facilitate changing from unset to set and or vice versa and or holding the set or unset position in FIGS. 8 to 8C. For example, referring to FIGS. 8A and 8C, a spring (not shown) may be used to hold right pressure plate 245 against left pressure plate 253 (a spring example is shown and described in association with FIG. 8E).

In this, as in other embodiments, a solenoid or motor with a source of electric power could be configured to operate the engagement of the axles to join and unjoin them (set and unset).

FIGS. 8D and 8E depict an embodiment using a solenoid 283 and plunger 277. FIG. 8D shows the unset position and FIG. 8E shows the set position. An electric source, such as batteries, and wiring and circuitry or RF control (not shown) may be employed to control solenoid 283 so that it could move from unset FIG. 8D, to set FIG. 8E, and vice versa.

Engage/holding spring 287 is shown configured around plunger 277 and compressed in FIG. 8D between the top of lever 233 and plunger head 289. The left side of spring 287 is attached to lever 233 and the right side of spring 287 is attached to plunger head 289. When the plunger 277 moves to the right to the set position to join axles 221 and 223, Engage/holding spring 287 is stretched to urge lever 233 to push thrust bearing 239 against right pressure plate 245 so that it stays engaged with left pressure plate 253; hence, 287 is called an engage/holding spring. Other spring means may be employed such as a leaf spring associated with thrust bearing 239 and right pressure plate 245 so that right pressure plate 245 stays engaged with left pressure plate 253 when solenoid 283 is in set position. When plunger 277 moves to the right as shown in FIG. 8E, the space 285 in solenoid 283 is created.

Some embodiments include a slip-clutch that allows slippage. In some embodiments, e.g., FIGS. 8F and 8G, a slip clutch is settable and unsettable to join and unjoin the axles. Some embodiments may have axles that are always joined for straight travel while still allowing slippage for turning.

FIGS. 8F and 8G illustrate an embodiment using a slip-clutch configured to join the axles up to a point, i.e., with slippage at some point: If the torque differential between the two pressure plates exceeds a predetermined limit, there will be slippage allowing the two axles to rotate at different rotational speeds. For example, with a slip clutch axle joiner, the passenger may give a tug (or a momentary grip) on a large wheel's handrail to momentarily inhibit (retard) its rotation so as to cause the wheelchair to turn in the direction of the inhibited wheel. Or the passenger's pusher can give a yank, or a momentary hold, on one pushing handle to cause the chair to turn in that direction. In either case, the turning is accomplished by allowing the slip clutch axle joiner to slip allowing the other wheel to rotate more than the inhibited wheel.

Some of the elements illustrated in FIGS. 8F and 8G and elsewhere operate similar to similar components described in association with some other embodiments and may not be repetitively described for the sake of brevity.

A slip-clutch axle joining assembly is comprised of slip clutch axle joining assembly housing 361 which houses an adjustable motorized clutch lever assembly 303, lever plunger 377, lever plunger head 389 (space 385 is created in the accommodation for lever plunger 377 in motorized clutch lever assembly 303 when axles 321 and 323 are joined), plunger motor 301, clutch tension spring 387, manual clutch adjustment control 305, manual clutch adjustment linkage 307 with gear means illustrated at the right end of linkage 307, manual clutch adjustment rack 309 to cooperate with linkage 307 pinion, clutch lever pivot (fulcrum) 335, clutch lever 333 which is linked (not shown) to cause the thrust bearing to join the axles by pushing right pressure convex-surface 315 into left pressure concave-surface 311 to join axles 321 and 323 so they rotate as one.

Lever plunger 377 moves left and right as shown in an accommodation therefor in clutch lever assembly 303. Assembly 303 is itself movably mounted on clutch axle joining assembly housing 361 so that the slip threshold of the slip-clutch can be adjusted by the wheelchair operator as described below.

Clutch tension spring 387 is attached on its left to the upper part of lever 333 and on right spring 387 is attached to the left side of lever plunger head 389.

Joining and unjoining the axles is controlled by axle joiner control (not shown); this embodiment as illustrated anticipates using electric wired control of the axle joining means, but a cable linkage or radio frequency, RF, means could also be used.

Axles 321 and 323 are supported by axle bearings 325 and 327, respectively, in slip-clutch axle joining housing 361. A splined rod portion 341 is shown in two parts in FIG. 8F and in one part FIG. 8G. The un-splined rod portion 343 and splined rod portion 341 (rod 341/343) are one piece or joined to act (rotate) as one piece. Rod 341/343 and axle 323 may be one piece or spline joined to rotate as one piece. Axle 321 has an opening to accommodate the un-splined portion of rod 343 so that rod 343 rotates freely within the opening on the end of axle 321.

A left pressure concave-surface 311, which is attached to axle 321 (as shown; rod 341/343 runs through opening in concave surface 311), is configured to be engaged by right pressure convex-surface 315 (which is spline-engaged with splined rod portion 241 as shown) when clutch thrust bearing 339 (shown white, black, white) goes from the unset position (FIG. 8F) under the control of the wheelchair operator to the set position (FIG. 8G) to join axles 321 and 323.

The left race of clutch thrust bearing 339 is fixed to the right side of right pressure convex-surface 315 so that surface 315 rotates as one with axle 323 because surface 315 is spline attached to the splined portion of rod 341 as shown. The right race of bearing 339 does not rotate—it is linked to clutch lever 333 (linkage, for example, shaped like a two-pronged fork, not shown). Right pressure convex-surface 315 is pushed by thrust bearing 339 to engage left pressure concave-surface 311 when the operator goes from unset to set to join the axles. FIG. 8G shows space 317 created when in the set position (when the axles are joined).

The material composition of pressure surface elements 315 and 311 are selected to provide sufficient friction to join axles to overcome a wheelchair's tendency to veer down a slanted surface when the wheelchair is propelled forward, and also to allow slippage when the torque differential between the axles increases to an adjustable preselected threshold so that a sufficient tug on the appropriate wheel by the passenger or a sufficient yank on the handle by the passenger's pusher person will allow a sufficient torque differential between the axles to cause a (slight) change in direction of the wheelchair's forward movement.

Materials such as plastics, metals, organic based materials (e.g., leather, rubber, wood, clay, ceramic, glass, porcelain, stone, etc.), various composites and synthetics, etc., could be considered. An appropriate liquid, such as a gritty-lubricant, may also be employed to simultaneously achieve the desired level of friction as well as slippage. Durability, anticipated weather conditions, cost, availability, etc. have a bearing on what material is chosen. Different materials may be utilized for the left and right pressure elements 311 and 315 of the slip clutch.

When axles 321 and 323 are joined in set position, space 313 shown in FIG. 8F is taking up by right pressure convex-surface 315. The location of where space 313 was is pointed to in FIG. 8G by pointer 313a which points to a thin white curve between left pressure concave-surface 311 and right pressure convex-surface 315 (the white curved line may not be visible depending on reproduction quality of FIG. 8G).

An axle joiner control (not shown) is controlled by the wheelchair operator to cause the plunger motor 301 to move from unset to set and vice a versa. In the set position, plunger 377 moves sufficiently to the right as shown in FIG. 8G to stretch clutch tension spring 387 so that it provides a desired amount of tension to right pressure convex-surface 315 which is engaged with left pressure concave-surface 311. The amount of tension determines the threshold at which slippage in the slip-clutch will occur. Plunger motor 301 may be adapted to control the distance plunger 377 moves when going to the set position, so that the amount of tension on the slip-clutch pressure surfaces 311 and 315 varies—less tension allows slippage more readily than more tension.

The wheelchair operator may adjust the range of tension with manual clutch adjustment control 305 which is configured to move motorized clutch lever assembly 303 left or right via, e.g., a type of rack gear (manual clutch adjustment rack 309) and pinion (manual clutch adjustment linkage 307). When motorized clutch lever assembly 303 is manually positioned more to the left by manual clutch adjustment control 305, there will be more tension on clutch tension spring 387 which will increase the threshold at which the slip-clutch joining assembly, housed in housing 361, will slip.

A slip-clutch configuration to join the axles and keep them joined until the torque differential between the axles reaches a certain level offers other potential as well. For example, a given mid-range tension position, set in accordance with the passenger's weight and other factors, may allow automatic operation that keeps the axles joined enough to insure straight travel on a slope, while allowing the wheelchair to turn via slippage of the slip-clutch means utilized in the axle joining assembly. In this mid-range tension position embodiment, the wheelchair can travel straight with joined axles without the tendency to veer off down sloped surfaces, and also to make turns with axles that rotate at different speeds, without operator control to shift the axle joining means between set and unset.

FIGS. 9 and 9A illustrate an embodiment of a splined axle joining assembly 61 to join and unjoined (set and unset) axles to 21a and 23a. The operation illustrated in FIGS. 9 and 9A is similar to the operation illustrated in FIGS. 5 to 5C.

Axle end part 23b is a sliding portion of axle 23a. The male splined left end of axle 23b may engage and disengage the female splined right end of axle 21a to join and unjoin (set and unset) axles 21a and 23b/23a.

FIGS. 9 and 9A depict axle joiner assembly 61 and and axle bearing 67 to illustrate an embodiment to join and unjoined (set and unset) axle 21a to axle portion 23b; axle portion 23b is a sliding portion of axle 23a—axle portion 23b slides left and right as shown on the splines of common axis rod 63a/63b and is controlled by axle joiner control 81 which is linked within axle joining assembly 61 by fastener 77a to pusher plate 69a. Common axis rod 63a/63b is partially splined; the spline is illustrated by the thin white line as shown in rod portion 63a/63b. The un-splined portion of axis rod 63a sits in an opening in axle 21a and is free to rotate at a different speed than axle 21a (when in the unset position).

Pusher plate 69a is fixed to the outer race ring of ball bearing (or roller bearing) 57a—the outer race ring of bearing 57a does not rotate. The inner race ring of bearing 57a is fixed to axle portion 23b and therefore the inner race ring of bearing 57a rotates in unison with axle portion 23b.

The male splined left end of axle 23b engages the female splined right end of axle 21a to join axles 21a and 23b/23a when axle joiner control 81 is shifted to the set position and disengages (un-joins) axles 21a and 23b/23a when axle joiner control 81 is shifted to the unset position.

Still referring to FIGS. 9 and 9A, an engage spring (not shown), similar to the configuration shown in FIGS. 6 and 6A (with engage spring 93), may also be employed in the embodiment depicted by FIGS. 9 and 9A.

A return spring in FIGS. 9 and 9A (not shown) could be employed. For example, a return spring may be located on (around) common axis rod 63a/63b and fastened on the left side to axle portion 23b and on the right side to axle 23a and, as a return spring, it would function similarly to spring 59 shown in FIG. 5C.

In this, as in other embodiments, a solenoid, motor, etc., with a source of electric power could be configured to operate the engagement of the axles to join and unjoin them (set and unset). Engage springs, return springs and other springs and the like (which are not shown) may be implemented in these and some other embodiments.

FIG. 10: In this embodiment, as in some other embodiments, a bearing (ball or roller) may be mounted in an enlarged accommodation opening for the un-splined portion of a rod, e.g., rod 343/341 in FIG. 10. In FIG. 10, the outer race of bearing 421 (shown white, black, white) snugly-fits the accommodation opening in axle 321 so that the outer race rotates in unison with the axle in which it resides (axle 321).

The inner race of bearing 421 fits snugly around the un-splined portion of rod 343 so that the inner race rotates in unison with the rod. Because the inner race of bearing 421 is thusly fixed to the un-splined portion of rod 343, that portion of the rod may be splined or may not be splined (this may have a bearing on manufacturing cost).

The operation of some of the components in FIG. 10 is similar to the operation described in association with FIGS. 8F and 8G and need not be described again.

In this embodiment, the wheelchair has a slip clutch axle joining device but no on-the-fly controls to switch between set and unset. In this mode of operation, depending on various factors, including the weight of the passenger, a wheelchair may turn easily enough with a given adjustment of the slip threshold while at the same time the axles may be sufficiently joined at that slip adjustment level to cope with sloped sidewalks. In this embodiment, the wheelchair may be built in the set position and cannot be switched to an unset position on-the-fly (when it is in motion); the wheelchair operator need not have on-the-fly control to switch between set and unset.

Some embodiments that may not require any on-the-fly operator control of the axle joining device may allow adjustment of the axle joining slip threshold while the wheelchair is stationary (to accommodate, for example, passengers of different weight).

This type of embodiment may be suitable for some wheelchair users. The slip threshold could be adjusted with manual control 411 associated with the axle joining unit 461 when the wheelchair is stationary. Or control provision could be made to adjust the slip threshold on-the-fly by the operator of the wheelchair (not shown in FIG. 10).

Manual control 411 adjusts the threshold level at which the clutches will slip. Slipping allows the axles to rotate at different speeds for turning. By adjusting control 411, tension holding spring 415 will have more or less tension depending on manual the setting of control 411 and its linkage which is attached to the left end of holding spring 415. The right end of holding spring 415 is attached to pusher plate 417. Pusher plate 417 maintains steady pressure between clutch pressure surfaces 311 and 315—the pressure is manually adjusted by control 411 and maintained by holding spring 415. The vertical portion of the linkage of manual control 411 has an opening (not shown) through which guide post 413 passes. The right side of guide post 413 is fastened to pusher plate 417. Guide post 413 and control 411's linkage may facilitate the movement of pusher plate 417.

If hand brakes are installed on a wheelchair in addition to an axle joining device, turning may be accomplished by operating one hand brake as required to achieve the desired change of direction.

FIG. 11 illustrates the rear view of a wheelchair with another slip-clutch embodiment installed. The operation of some of the components (parts, elements, etc.) in FIG. 11 is similar to the operation described in association with other Figures.

In FIG. 11, the wheelchair has slip clutch axle joining assembly 461a with multiple controls as shown to adjust the slip torque-differential level between axles 321 and 323. For example, slip clutch axle joining assembly 461a is motorized (depicted by an "M" in a small square shown in the housing assembly 461a in FIG. 12) so the wheelchair operator can also adjust the slip-setting threshold level on-the-fly.

The large wheels on a wheelchair are propelled by the passenger stroking the handrails or the passenger's pusher pushing the handles of the wheelchair. The wheels in turn impart torque to their respective axles. A torque-differential is the torque difference between the axles that may occur as a wheelchair is propelled, for example, when there is a disparity in the stroking force on the two handrails by the passenger or the disparity in the pushing force on the two handles by the person pushing the chair. When the disparity reaches a given (adjustable) setting, which may be called the slip-setting, a slip clutch axle joining assembly will allow slippage between the two clutch elements being held together (to join the axles)—when the torque-differential reaches the slip-setting, the axles may rotate at different speeds.

The slip-setting is set by the wheelchair operator setting adjustment knob 411 counterclockwise or clockwise when the wheelchair is stationary. At level 433, the axles rotate independently of each other, and at level 435 the axles rotate as one.

On-the-fly slip-setting controls are depicted with the hand brake controls; left brake control has pushbutton 439 and right brake control has pushbutton 443 to decrease the slip-setting threshold (for turning), and pushbutton 437 on the left and pushbutton 439 on the right to increase the slip-setting threshold (for slanted surfaces) (various kinds of switches could be used, such as a rocker switch).

The hand brake controls and their respective associated slip-setting controls as shown in FIG. 11 may be mechanically linked to operate the brakes and adjust (change, vary) the slip-setting threshold. Other means are possible to operate the brakes or adjust the slip-setting, such as electric wiring to, or radio frequency if communication with, a solenoid or motor or the like. Or pneumatic, hydraulic or other means may be utilized. Such means may be run along side or inside the wheelchair frame as depicted by the dashed linkage shown between the controls and the wheelchair frame.

In FIG. 11, the hand brakes may be used for turning. For example, when making a right-hand turn a passenger would stroke the left wheel's hand rail with the left hand and apply the handbrake with the right hand with appropriate pressure.

FIGS. 12 and 13 are unnumbered depictions of the rear of a wheelchair with modified illustrated embodiments installed as shown. For example, FIG. 12 has a modified embodiment described for FIG. 10, and FIG. 13 has a modified embodiment described for FIGS. 8B to 8E (also, FIG. 13 has no hand brakes).

Depending on the terrain on which a given wheelchair will be used, hand brakes may not be needed, and a wheelchair without hand brakes, of course, would be less complicated and less expensive to manufacture. If the terrain on which a given wheelchair will be used does not have slanting surfaces, an axle joining device may not be needed. For example, if a wheelchair were to be prescribed for a patient who would only use the chair on flat terrain that does not slope, an axle joining device and hand brakes may not be wanted for practical and cost considerations.

FIGS. 14 and 14A illustrate an embodiment using a slip-clutch configuration to join large wheel 501 to one end of a single axle which is shown in three portions, inner race axle portion 525*b*, splined axle portion 525*a* (only partially visible in FIG. 14) and the third portion, single axle 525.

On the other end of the single axle (not shown) the other large wheel (not shown) is fixed mounted so that this other large wheel must turn in unison with the single axle 525 (and, of course, its other portions, inner race axle portion 525*b* and splined axle portion 525*a*).

Single axle 525*b*,525*a*,525 goes through a frame bearing (not shown) in frame 519 (and is thus able to rotate freely), through fastener 531, through control collar 529, through thrust bearing 511, through wheel-axle pressure joining plate 509, space 507 and wheel clutch plate 505, and inner race axle portion 525*b* into, and is attached to, the inner race ring of bearing 503. Single axle 525*b*,525*a*,525 is not attached to and does not engage fastener 531, control collar 529 or wheel clutch plate 505.

Wheel 501 is fixed to the outer race ring of bearing 503 which is shown black, white, black above and below inner race axle portion 525*b*. Inner race axle portion 525*b* is fixed to the inner race ring of bearing 503. Thus, wheel 501 may rotate freely in the unjoined position (FIG. 14) as described below.

Wheel clutch plate 505 is attached to wheel 501. Wheel clutch plate 505 may be engaged by wheel-axle pressure joining plate 509 when thrust bearing 511 is urged to engage wheel clutch plate 505 by pressure spring 527.

Pressure spring 527 is connected on the left to the right race ring of thrust bearing 511 which is shown black, white, black. The left race ring of thrust bearing 511 is fixed to wheel-axle pressure joining plate 509. Wheel-axle pressure joining plate 509 is spline attached to splined axle portion 525*a* and thus rotates in unison with single axle 525*b*,525*a*, 525.

The right side of pressure spring 527 is connected to spring tensioner 513 which has inside screw-type threading on an opening that accommodates and engages matching threading on the outside of control collar 529. Control collar 529 is attached to the wheelchair frame 519 by fastener 531.

Control collar 529 is attached to linkage 515 which has a handle 517. The wheelchair operator controls the amount of pressure on wheel-axle pressure joining plate 509 by adjusting the position of spring tensioner 513. By moving the handle 517 forward and back, spring tensioner 513 moves left and right on control collar 529 via the matching threading. (Other mechanical means, electric motorized means etc., could be adapted for control.)

FIG. 14 depicts a position of spring tensioner 513 to the right; in this position, the slip-clutch elements, wheel clutch plate 505 and wheel-axle pressure joining plate 509, are unjoined and wheel 501 is free to rotate independent of single axle 525*b*,525*a*,525. In-between space 507 is visible in FIG. 14 (unjoined) but not in FIG. 14A (joined).

FIG. 14A depicts the position of spring tensioner 513 to be to the left; in this illustrated position, the slip-clutch elements, wheel clutch plate 505 and wheel-axle pressure joining plate 509, are joined and wheel 501 rotates in unison with single axle 525*b*,525*a*,525 and the other fixed mounted wheel (not shown).

By positioning spring tensioner 513 (with handle 517, linkage 515 and spring tensioner 513 riding on threading control collar 529) between the unjoined and joined positions depicted in FIGS. 14 and 14A respectively, pressure spring 527 applies more or less pressure (via pressure spring 527 and thrust bearing 511) to wheel-axle pressure joining plate 509. Pressure spring 527 is illustrated more compressed in FIG. 14A and less compressed in FIG. 14.

When wheel-axle pressure joining plate 509 is (partially) positioned toward the left, the clutch-slip threshold level is increased so that the wheels are less free to rotate at different speeds. This ensures or fosters straight travel so that, for example, travel on sloped surfaces is facilitated.

When wheel-axle pressure joining plate 509 is (partially) positioned toward the right, the clutch-slip threshold level is decreased so that the wheels are more free to rotate at different speeds facilitating turning.

FIGS. 14B and 14C illustrate an embodiment in a schematic view using two crown gears configured to join large wheel 501 to one end of a single axle which is shown in three portions, inner race axle portion 525*b*, splined axle portion 525*a* (only partially visible in FIG. 14B) and the third portion, single axle 525.

On the other end of the single axle (not shown) the other large wheel (not shown) is fixed mounted so that this other large wheel must turn in unison with the single axle 525 (and, of course, its other portions, inner race axle portion 525*b* and splined axle portion 525*a*).

Single axle 525*b*,525*a*,525 goes through a frame bearing (not shown) in frame 519 (and is thus able to rotate freely), through fastener 531, through control collar 529, through thrust bearing 511, through wheel-axle joining crown gear 509*a*, space 507*a* and wheel crown gear 505*a*, and inner race axle portion 525*b* into, and is attached to, the inner race ring of bearing 503. Single axle 525*b*,525*a*,525 is not attached to and does not engage fastener 531, control collar 529 or wheel crown gear 505*a*.

Wheel 501 is fixed to the outer race ring of bearing 503 which is shown black, white, black above and below inner race axle portion 525*b*. Inner race axle portion 525*b* is fixed to the inner race ring of bearing 503. Thus, wheel 501 may rotate freely in the unjoined position (FIG. 14B) as described below.

Wheel crown gear 505*a* is attached to wheel 501. Wheel crown gear 505*a* may be engaged by wheel-axle joining crown gear 509*a* when thrust bearing 511 is urged to engage wheel crown gear 505*a* by pressure spring 527. (In some embodiments, for example, when crown gears with pointed teeth are used, axle joining crown gear 509*a* and thrust bearing 511 may be connected to each other without a pressure spring in-between.)

Pressure spring 527 is connected on the left to the right race ring of thrust bearing 511 which is shown black, white, black (the right race ring does not rotate).

The left race ring of thrust bearing 511 is fixed to wheel-axle joining crown gear 509*a*. Wheel-axle joining crown gear 509*a* is spline attached to splined axle portion 525*a* and thus rotates in unison with single axle 525*b*,525*a*, 525.

The right side of pressure spring 527 is connected to spring tensioner 513 which may have inside screw-type threading on an opening that accommodates and engages matching threading on the outside of control collar 529. Control collar 529 is attached to the wheelchair frame 519 by fastener 531.

Control collar 529 is attached to linkage 515 which has a handle 517. The wheelchair operator controls the wheel-axle joining crown gear 509*a* by adjusting the position of spring tensioner 513. By moving the handle 517 forward and back, spring tensioner 513 moves left and right on control collar 529 via the matching threading. Other mechanical means, such as a common bicycle brake cable and a joiner control housing 83 as utilized with the embodiment shown in FIG. 5, electric motorized means, radio remote control, pneumatic or hydraulic means, etc., could be adapted for control.)

FIG. 14B depicts a position of spring tensioner 513 to the right; in this position, the crown gear elements, wheel crown gear 505*a* and wheel-axle joining crown gear 509*a*, are not engaged; they are unjoined, and wheel 501 is free to rotate independent of single axle 525*b*,525*a*,525. Space 507*a* in-between the crown gears is visible in FIG. 14B (unjoined) but not in FIG. 14C (joined).

FIG. 14C depicts the position of spring tensioner 513 to be to the left; in this illustrated position, the crown gear teeth of wheel crown gear 505*a* and wheel-axle joining crown gear 509*a* are engaged (joined) and wheel 501 rotates in unison with single axle 525*b*,525*a*,525 and the other fixed mounted wheel (not shown). The white diagonal lines in FIG. 14C where the space 507*a* was in FIG. 14B depict the engaged teeth of crown gears 509*a* and 505*a*.

As described above (for splines), if the wheelchair is going straight, so the wheels are rotating at the same speed, and the crown gear teeth are not lined up for possible engagement (the points of the teeth of one gear are pointed directly at the points of the other gear, not illustrated), engagement may not occur until there is a (slight) differential in the rotational speed of the wheels. Such a differential is likely to occur in a short movement of the chair—how short a movement depends on the number of gear teeth (and other factors). The greater the number of teeth, the lesser movement of the chair would be required for the crown gears to engage, and vice versa. The movement required to line up the gear teeth for engagement is in inverse proportion to the number of teeth on the crown gears; in the aggregate, more teeth means quicker engagement.

The tops of the crown gear teeth may be beveled or tapered with round, conical, pointed (pointed is shown) etc. ends in order to facilitate the engagement of wheel-axle joining crown gear 509*a* and wheel crown gear 505*a*.

Referring to the schematic view in FIG. 14B, for example, the teeth shown on the crown gears 505*a* and 509*a* appear triangular. Triangular teeth as shown may tend to slide apart from each other.

FIG. 14D depicts an enlarged three-tooth portion of a schematic view of one embodiment of crown gears 505*b* and 509*b* with straight-sides 508 for its teeth 502 which have pointed tips 506 that fit pointed recess 504 when the crown gears are engaged (not shown); straight sides 508 do not tend to slide apart.

By positioning spring tensioner 513 (with handle 517, linkage 515 and spring tensioner 513 riding on threading control collar 529) between the unjoined and joined positions depicted in FIGS. 14B and 14C respectively, pressure spring 527 applies pressure (via pressure spring 527 and thrust bearing 511) to wheel-axle joining crown gear 509*a* so that the teeth of the crown gears 505*a* and 509*a* will engage when alignment between the crown gears' respective teeth allows engagement. (Pressure spring 527 is illustrated more compressed in FIG. 14C and less compressed in FIG. 14B.)

Male and female splined components (e.g., see FIGS. 9 and 9A) could be adapted to engage and disengage in similar fashion as described for wheel crown gear 505*a* and wheel-axle joining crown gear 509*a* in FIGS. 14B and 14C.

The use of a thrust bearing 511 in FIGS. 14, 14A, 14B and 14C allows the wheelchair operator to control the joining and unjoining of the two drive wheels via the crown gears. The thrust bearing 511 in FIGS. 14, 14A, 14B and 14C isolates the control linkage on the wheelchair frame from the rotations of the wheelchair wheels and components associated therewith.

The wheel clutch plate 505 and wheel-axle pressure joining plate 509 in FIGS. 14 and 14A could be fabricated out of a variety of materials including plastics and may have coverings or coatings to achieve desired surface textures.

The crown gears 505*a* and 509*a* in FIGS. 14B and 14C could be fabricated out of a variety of materials including plastics.

Not all of the embellishments disclosed in this embodiment or other embodiments need to be utilized in any one embodiment. Embellishments in this embodiment may be configured to embellish other disclosed embodiments and vice versa.

Embellishments (for example, use of various adjustable slippage methods in clutch joining means, an electric motor, linkage, wired or RF control, multiple levers, etc.) which may be shown in one embodiment may be used to embellish one or more embodiments.

In different embodiments, control of switching between set and unset can be accomplished with mechanical, electric, hydraulic, pneumatic, magnetic, etc. means. Each wheelchair could be sold with a battery pack (e.g., with two or more rechargeable AA batteries) installed and a spare battery pack to be replaced as necessary or routinely, say, every month or so, for example. If the battery were to run out while in the set position, getting home could be troublesome, so prevision could be made for the apparatus to go from set to unset when the batteries reach a certain state before they become inadequate for continued operation. Alternatively, a manual release to the unset position may be provided.

Whether or not there are on-the-fly controls, some slip-clutch embodiments may provide a slip threshold setting that allows the axles to be solidly joined at extreme settings so the large wheels must rotate as one, and at other extreme slip threshold settings the axles are independent of each other so that each large wheel is free to rotate freely. In some of these embodiments, a given slip threshold setting (or some middling range of slip threshold settings) in-between these two extreme settings (or ranges of extreme settings) will insure or foster straight travel with joined axles on slanted surfaces while still (automatically) allowing slippage for turning without requiring the wheelchair operator to do anything.

In other words, the wheelchair operator may control an axle joining device by switching between set & unset, or, for example, a slip-clutch device may be adapted for the axle joining device to join the axles but (automatically) allow slippage so the wheelchair operator does not need to switch from set to unset for turning.

In some embodiments, an inclinometer sensor and associated circuitry could be implemented to automatically go to set position when a slope in the surface on which a wheelchair is traveling is detected. If so, the wheelchair operator may override the inclinometer and manually shift to (go to) set, or the operator may go from set to unset manually.

Various known means could be adapted to facilitate making one or more of the wheelchair embodiments described above collapsible so as to make the chair more readily transportable when unoccupied.

Arrangements utilizing various types of common, typical or atypical bevel gear arrangements, an adapted differential configured to accommodate input driving power coming from the two axles on which the two large wheelchair's wheels are fixed (as opposed to, for example, input coming from a driveshaft, a chain drive or other drive means) (input driving power coming from the wheelchair passenger or her/his pusher person), myriad clutch assemblies modified, adapted or configured to join axles, or other gearing, including differential gears configured to join axles, pulley, leverage etc., assemblies and the like could be employed to join (couple) the axles so they rotate as one. For example if the axles, e.g., axles 21 and 23, were on different axes (more than one axis) from each other, they could be joined by pulleys, belts, gears etc., configured appropriately. Arrangements using these means or utilizing some other axle joining means to join axles while they may be stationary, rotating at different speeds or in different directions (e.g., if a wheelchair is rotated in place so that it spins around) fall within the scope of the invention.

While characteristics and features of some embodiments have been shown and described, it should be understood that various substitutions, modifications, and variations may be made by those skilled in the art without departing from the spirit, or scope of the various embodiments shown and described. For one example, other kinds of friction brakes can be used, such as drum or shoe breaks or the like; or other brakes can be used. Consequently, all such adaptations, configurations, modifications and variations are included within the scope of the invention as defined by the claims.

In sum, sidewalks are slanted to allow water run-off. Slanted surfaces make propelling a wheelchair awkward and cumbersome, especially for a self-propelling passenger. However, if the two large wheels were connected together via an axle(s) so that they must rotate as one with each other, the wheelchair can only go straight even if the surface is slanted.

City sidewalks, which are sloped for rain, are horrible for wheelchair users because of the constant veering off threat. Anybody who tries to self-propel a wheelchair on a sidewalk for the first time is in for a rude awakening—the user must use one hand to steer by retarding one wheel, and that makes propelling inefficient, difficult and frustrating, to say nothing of the dangerous veering off the curb threat. Applicant's solution, that has been undiscovered for hundreds of years, is to provide joining means to couple and uncouple the drive wheels. The joining means, when coupled, causes the two drive wheels to rotate in unison preventing the wheelchair from veering off so that it travels straight when traversing a sloped surface, and when uncoupled allowing the two drive wheels to rotate at different speeds to allow turning. Joining means may comprise a slip-clutch or a gear configuration comprised of crown gears or spline gears. Joining means may be automatic or controlled by the wheelchair user.

Disclosed means allow the large wheels to be joined and unjoined ("set" and "unset") or joined and partially unjoined ("set" and partially "unset"). When joined in the set position, the large wheels rotate as one so the wheelchair moves in a straight direction, and when unjoined (unset) or partially unjoined (partially "unset"), the wheels may rotate independently, at different speeds, to make turns.

The wheelchair operator may control a joining device by switching between set & unset, or a slip-clutch device may be adapted to serve as the joining device to automatically keep the large wheels joined for straight travel on any surface, but allow slippage in order to turn with an extra push or tug from the operator on one wheel or handle.

If each large wheel is fastened to its own separate axle, the joining device may join those two axles. Or, if one large wheel is fixed mounted to one end of a single wheel-to-wheel axle, a slip clutch or crown gears or the like may be adapted to be associated with the hub of the other large wheel on the other end of the axle. In this single axle embodiment, as in other embodiments, quick disconnect couplers may allow the center axle portion to be removed to collapse the wheelchair.

As described above, some embodiments may not fully join (set) and unjoin (unset) the large wheels' axles in order to facilitate travel on sloped surfaces. Such embodiments may utilize the slipping feature of a variety of slip clutch designs such as those disclosed herein and those that are commercially available.

Slip clutch assemblies are available from various suppliers of mechanical components. One such supplier is Rino Mechanical Components Inc., 216 North Main Street, Freeport, N.Y. 11520, 888-260-7466, 516-867-5665, Fax: 516-867-5656. Rino's website (and other websites that can be found by googling) offers a variety of slip clutch assemblies as well as a wealth of knowledge comprised of mechanical component terminology and tutorials explaining in detail how their slip clutches operate as well as describing various mounting options such as shaft to shaft and shaft to pulley. Edifying excerpts from select websites are reprinted verbatim below. Please refer to information sources other than this application for further description and colorful illustrations.

SDP/SI's web site shows the variety of clutches available.

"SDP/SI ON-LINE eStore offers: Brakes, Clutches, Hysteresis Brakes, Magnetic Particle Brakes, Permanent Magnetic Brakes, Power-Off Brakes, Power-On Brakes, Electromagnetic Clutch Couplings, Roller Clutches, Electromagnetic Slip Clutches, Mechanical Clutches and Mechanical Inline Slip Clutches."

Polyclutch's web site shows mounting options available for clutches.

"All Polyclutch slip clutches perform the basic function of controlling the torque between two elements. They can be supplied as a shaft-to-shaft coupling or a shaft to pully, gear, or sprocket model. Polyclutch custom slip clutches can be provided with nonstandard bore sizes, keyways, low backlash or higher torque, minus housings and with pulley, gear or sprocket. Imagination and ingenuity have developed and created additional variations not shown here. Outlines in Green are Custom Additions or Customer Supplied."
Construction:

The following is a quote from rinomechanical's web site:

"The construction of slip clutches/friction clutches is simple and robust. Friction Clutch is comprised of a series of steel plates engaging a hub and a series of friction rings engaging a housing. Pressure is put on the plates and friction rings by an adjuster acting through a spring and pressure plate."

The following is a quote from Polyclutch's web site:

"The clutch consists of two assemblies: a cartridge and a housing (see above). The cartridge is set screwed or keyed to the input shaft. The housing is either set screwed or keyed to the output shaft or, (as shown), attached to the output gear or pulley, with a bronze bearing to allow relative motion between the input shaft and the output gear/pulley.

"Torque is transmitted from the flats on the hub to the mating flats on the inner plates, through the friction pads to the outer plates, through the torque pins to the housing and the output gear/pulley. The torque level is controlled by compressing the springs with the adjusting nut. For a fixed torque clutch, a collar is attached to the hub in a fixed position, instead of the adjusting nut. In operation, either the input shaft or the housing can be the input member, with the other member being driven.

"All Polyclutch slip clutch torques are calibrated to +/−20% but can be held to closer tolerances. Backlash of 6o is standard for both slipper and series 16 slipper and 2o for the Slip-Ease line. Slipper models can be held to 2° if required."
"Installation "Shaft to Pulley versions—Insert input shaft into cartridge and tighten set screws. Insert housing around input shaft, with torque pins engaging holes in outer plates.

Input shaft will keep the cartridge and housing aligned.

"Shaft to Shaft Versions—Insert input shaft into cartridge and tighten set screws. Insert output shaft into housing and tighten set screws. Input and output shafts must be properly journaled with centerlines within +/−0.010 T.I.R.

"Do not lubricate the clutch. Friction materials are designed to run without additional lubrication. Lubrication will cause a change in torque and erratic behavior. The inherent axial loaded design will keep dirt and dust out of the friction surfaces."

The excerpts from the following two links' websites discuss possible apparatus and pneumatic and electric means to allow the wheelchair operator to vary the torque slippage level. Hydraulic or other means could also be employed.

The following is a quote from Polyclutch's web site:

"The Polyclutch Slip-Aire is an air pressure actuated version of the Mechanical Polyclutch Slip Clutch. It has the same long life friction members, assuring constant torque or tension. With air actuation it can be used to engage/disengage, to vary the torque during operation, or to adjust the torque remotely at any time. "Ideal for servo mechanisms, they transmit higher torque levels than comparably sized mechanical slip clutches. Slip-Aire Clutches are less expensive to purchase and operate than electrically actuated versions. Sealed ball bearings are available on selected models."

The following is a quote from Polyclutch's web site:

"Polyclutch Jaw Type Clutches permit extremely simple, reliable phase adjustment, and/or engage-release between a shaft and gear, pulley, roller, etc. The D Series is knob operated, the J Series is lever operated. Clutch teeth are precision machined from solid steel blanks, 3° tooth spacing (120 teeth) is standard. Alternate spacings available. All Polyclutch jaw clutches are stronger than the shaft driving it."

The following is a quote from Reell Precision Manufacturing's web site:

"As electric current is passed through the stationary coil, lines of magnetic flux are generated and used to attract the control ring to the shoulder. This control ring is attached to the spring which wraps down onto a hub as the input is turned. Torque is transferred from the input, through the spring, to the output. After electric current is removed, the magnetic attraction is lost, causing the clutch to disengage as the spring unwraps."

The next quote from Wikipedia's web site describes Wingquist's and SKF's self-aligning ball bearing.

"Self-aligning ball bearings are constructed with the inner ring and ball assembly contained within an outer ring that has a spherical raceway. This construction allows the bearing to tolerate a small angular misalignment resulting from deflection or improper mounting."

Some wheelchairs use two ball bearings to support each large wheel on its respective axle. Referring to FIGS. 14 and 14A above, for example, two (separate) ball bearings may be fitted on axle portion 525b instead of single bearing 503.

FIGS. 15 and 15A illustrate an embodiment utilizing a shaft-to-shaft Rino slip clutch component adapted to (partially) join and unjoin axles 531 and 533 of two large wheels of a wheelchair.

Slip clutch 535 is comprised of housing 539 and cartridge 537. Left axle 531 is fastened to slip clutch housing 539 shown in FIG. 15. Right axle 533 is fastened to slip clutch cartridge 537 shown in FIG. 15.

Cartridge 537 is comprised of housing clutch plates (not shown) which are keyed to housing 539 so as to rotate as one with the housing, and cartridge clutch plates (not shown) which are keyed to the cartridge so as to rotate as one with the cartridge. The clutch plates themselves, which are not depicted in FIG. 15, are located within the plate portion 545 of slip clutch 535.

The housing clutch plates and the cartridge clutch plates (Not shown) are interleaved with each other (i.e., housing plate, cartridge plate, housing plate, cartridge plate etc.). Pressure is applied to press these clutch plates together by a pressure spring (not shown) which is compressed between torque adjusting nut 541 and the endmost pressure plate in plate portion 545 of slip clutch 535. Pressure from the pressure spring is felt on the interleaved pressure plates. The amount of pressure on the plates can be increased or decreased by torque adjusting nut 541 to set the torque differential level between housing 539 and cartridge 537.

At a given torque level setting (via the torque adjusting nut 541), the axles rotate as one when the torque differential (between the housing clutch plates keyed to housing 539 and the cartridge plates keyed to cartridge 537) is below that torque setting.

The axles may rotate at different speeds when the torque level, set by torque adjusting nut 541, increases above the given torque setting, i.e., when the torque differential between axles 531 and 533 exceeds the given torque setting, the interleaved clutch plates will allow slippage so the axles may rotate at different speeds. If the torque differential (between axle 531's housing 539's housing plates, and axle 533's cartridge 537's cartridge plates) drops below the given torque setting, slip clutch 535 and axles 531 and 533 will rotate at the same rotational speed thus facilitating straight travel on sloped surfaces.

As described above, provision could also be made to adjust the torque setting on the fly. For example, adjusting nut 541 may be adapted to be engaged by an electric motor or other means configured to allow a wheelchair operator to increase or decrease the torque setting during operation (as discussed above in the Internet website excerpts).

FIG. 15A illustrates a rear view of the wheelchair with slip clutch 535 mounted axle to axle and structural support beam 547 connecting the left frame to the right frame. Each illustrated large wheel is fixed to its respective axle so as to rotate as one with its axle. Beam 547 may be required if the wheelchair frame is not otherwise sufficiently rigid to avoid, for example, the frame flexing which may cause axles 531 in 533 to become insufficiently aligned—axial alignment must be maintained in accordance with slip clutch requirements.

Brakes (not shown in FIG. 15A) may be incorporated as described above.

Beam 547 is shown with double lines to illustrate the possible use of a hollow tube but a solid shaft or other shaped structure may serve. Free-standing pin 63 (not shown here) first described in association with FIG. 5 above may be utilized to maintain axial alignment between axles 531 and 533.

Support strut 549 illustrates another example of how to maintain axial alignment between axles 531 and 533. Strut 549 may be added between axle 531 and beam 547 and between axle 533 and beam 547. For additional support and strength, such strut members may be connected to each other as illustrated with a horizontal member. Axle bearings (for example, ball, roller, bronze) may be used as required in the vertical members of support strut 549 to accommodate axles 531 and 533.

FIGS. 16 and 16A use one axle and therefore avoid the cost and alignment concerns associated with joining two axles. An axle may be defined by two points, similar to a line. Two points defining an axle (or a line) are inherently straight, whereas four points, two points defining each of two axles, are not.

In the embodiments illustrated in FIGS. 16, 16A, 17 and 17A and described below, as well as the embodiments associated with FIGS. 14 and 14A described above, a single axle is all that is required. The hub of one large wheel is concentrically engaged with a slip clutch which is concentrically engaged with one single axle, and the other large wheel is fixed mounted to the other end of that single axle, thus enjoying the benefits and efficiencies inherent with precise concentric axial alignment without incurring the need for additional support structure.

In addition (not shown), a washer(s), an axle bolt, a flange (e.g., housing 555 may be configured with a flange), and or a hub cap may be adapted to be secured to the hub area of large wheel 561.

FIG. 16 depicts a slip clutch 551 adapted to "slip clutch couple" an axle to a wheel. Cartridge 553 is comprised of a fastener which fastens it to axle 557, and a torque adjuster. Axle 557 may be pressed or otherwise fastened into the inner race 559c of wheel to clutch housing 555's bearing, bearing 559a, 559b and 559c as shown. Clutch housing 555 may be pressed or otherwise fastened around the outer race of wheel to clutch bearing 559a, 559b and 559c. Clutch housing 555 may be pressed and or otherwise fastened into the hub area of large wheel 561 as shown.

Slip clutch 551 operates as described above to foster straight travel on slanted surfaces and still allow the wheels to rotate at different speeds for turning.

FIG. 16A illustrates a rear view of the wheelchair embodiment with a slip clutch 551 mounted axle to the hub area of the large wheel 561 as shown. Exemplary means of temporarily removing axle 557 and support beam 547 so the chair can be collapsed when not occupied are shown. Couplers 563 and couplers 565 may be used to allow axle 557 and support beam 547 to be removed.

Axle 557 is comprised of three pieces, namely, a short left axle portion (not separately numbered) coupled by coupler 563 to the long center axle portion of axle 557 which is coupled through the other coupler 563 to short right axle portion (not separately numbered). These short axle portions can be joined to the long axle portion, for example, by tongue and groove with a pin through the groove and tongue and held together with, for example, a sliding collar coupler that is held in place with a spring urging one or more retainers that engage a detent or circumferential channel in one or more portions of axle 557.

The pin through the groove and tongue would prevent longitudinal (lengthwise) separation of the connected portions of axle 557. The tongue and groove and its pin, held in place by the sliding collar, would maintain axial alignment of the connected portions of axle 557. Support beam 547 and its couplers 565 may also work as just described.

Other quick-disconnect couplings, collar couplings that slide and lock with a twist, for example, bayonet couplings configured to join two axle portions, etc., may also be used in the embodiments depicted in FIGS. 16A and 17A.

In addition, various other couplers may be adapted to allow axle 557 and support beam 565 to be suitably removable and re-installable; an assortment of couplers may be found on rinomechanical's website (and others).

Seat 571, shown with dashed lines in FIG. 16A, is not directly attached to the illustrated structure. Seat 571 will automatically fold when the wheelchair is collapsed.

FIGS. 17 and 17A illustrate a rigid wheelchair and a collapsible wheelchair embodiment respectively; they both utilize a slip clutch 551 adapted to slip clutch couple axle 557 into the hub area of large wheel 561 as shown.

FIG. 17 illustrates a rigid wheelchair not designed to be readily collapsible. Seat 43 and its rigid member 43A and support rod 567 rigidly connect the left and right frame structure to each other. Axle 557 is supported by frame bearings 569 and 569A. In these Figures, as in others, additional support structure may be utilized forward of the rear structure illustrated and discussed.

FIG. 17A depicts a rear view of the collapsible wheelchair embodiment utilizing Wingquist's self-aligning ball bearings which are described above. The illustrated wheelchair utilizes couplers 563 configured to allow axle 557 to be readily removable and re-installable. Seat 571 will automatically fold when the wheelchair is collapsed.

As mentioned, utilization of Wingquist's self-aligning ball bearings 573 and 573a tolerate some angular misalignments that may result from a less-ridged wheelchair structure. In the embodiment depicted in FIG. 17A, even with coupling devices 563 as described, there is the benefit and strength of a single straight solid axle 557, from wheel-to-wheel, which supports the two frame halfs.

A Bellows coupling, Oldham coupling, Double Loop Coupling etc., for example, may be placed in the center section of axle 557 in FIG. 17A to tolerate misalignments. However, the weight of the chair and its occupant would tend to put constant strain on a coupling device in the center section of axle 557 and tend to cause the large wheels to tilt toward the frame.

FIGS. 16B and 9B, and FIGS. 16C and 14E, illustrate two more wheelchair embodiments which combine two embodiments described above. These embodiments allow slip clutch operation to travel straight on sloped surfaces or completely normal operation in which the two wheels rotate independently. For example, normal operation may be suitable for use in hospitals or other buildings where the floors generally do not slope.

FIGS. 16B and 9B combine the slip clutch of FIG. 16 (FIG. 16 depicts a slip clutch 551 adapted to "slip clutch couple" an axle to a wheel) and a splined axle joining assembly described in FIGS. 9 and 9A. FIGS. 9 and 9A illustrate an axle joiner housing 65 which is not used in FIG. 9B. The apparatus shown in FIGS. 16B and 9B are deployed on one side of wheelchair frame 66 shown in FIG. 9B. Frame bearing 68 is also illustrated in FIG. 9B. A covering of some sort (e.g., a rubber or synthetic "boot"; not shown) may be useful to protect the spline gear components from getting dirty.

FIGS. 16C and 14E combine the slip clutch of FIG. 16 deployed on one wheel and a crown gear configuration illustrated and described in association with in FIGS. 14B and 14C deployed on the other wheel. FIG. 14E is horizontally flipped from FIG. 14B described above.

FIG. 18 was copied from the Internet with the named parts depicted on FIG. 18 printed below, along the associated explanation of FUNCTION and CONSTRUCTION also copied from the Internet. Applicant concurs.
Slip Clutch with a Pulley 701;
Output pulley 703;
Thrust plate 705;
Friction pads 707;
Inner Plates (Driving) 709;
Outer Plates (Driven) 711;
Springs 713;
Hub 715;
Torque Pins 717;
Inner Plates Mate with Flats on Hub 719.
Input Shaft 721;
Housing 731;
Detend Plate 723;
Torque Adjusting Nut 725; and
Cartridge 733.

FIG. 18's function and construction were described on the Internet as follows:

FUNCTION: Multiplate slip clutches control torque for intermittent, continuous or overload slip. It will drive in both directions, slip when the torque setting is reached, and resume driving as the load is reduced. These clutches are excellent as continuous or intermittent drag brakes, protection against overload for "soft starts," slip at the end of a stroke, as friction hinges, for screwing on container caps, etc.

CONSTRUCTION: The clutch consists of two assemblies: a cartridge and a housing (see cutaway above). The cartridge is set-screwed or keyed to the input shaft. The housing is either set-screwed or keyed to the output shaft or, as shown, is attached to the output gear or pulley with a bronze bearing to allow relative motion between the input shaft and the output gear/pulley. Torque is transmitted from the flats on the hub to the mating flats on the inner plates, through the friction pads to the outer plates, through the torque pins to the housing and the output gear/pulley. The torque level is controlled by compressing the springs with the adjusting nut. For a fixed torque clutch, a collar is attached to the hub in a fixed position instead of the adjusting nut. In operation, either the input shaft or the housing can be the input member, with the other member being driven.

Brakes:

Braking a fast moving manual wheelchair is a dicey business—caution is required. For example, if a brake were applied to the one axle in the embodiments illustrated in FIGS. 16 to 17A, the chair may pivot toward the wheel fixed to the axle because the other wheel is able to continue rotating via its slip clutched connection to the axle.

The Bicycle Helmet Safety Institute website offers wheelchair helmet advice titled, Wheelchair Athletes. This is an excerpt from the BHSI web site: "If you go fast in a wheelchair you probably should be using a helmet. Considering how much your clear thinking helps you to overcome the other obstacles you face, preserving brain function is critical to you. Wheelchair users have a unique set of requirements. The distance to the ground in a fall is less than a bicycle, so the initial impact will probably be less severe, but can still be life-threatening. You generate less cooling air for a given amount of exertion than a bicycle rider. And your speed can be considerable but on average is likely to be less than a bicycle, lessening the risk of snagging your head in a fall on angular helmet features. For those reasons you should probably ignore our often-repeated advice about rounder, smoother helmets and just go for the helmet with the biggest vents. Pay attention to the vents on top. Those are not particularly important for bicycle riders, but when you are moving at lower speeds you want the hot air to be able to rise off your head. If you have a head support in back you will need a rounder helmet, and perhaps a thick pad behind your back to give you room for the helmet. Helmets with oversized vents are not cheap, since more sophisticated manufacturing techniques are required, but the difference may be worth it for you."

Helmets:

Helmets are not currently available from leading medical equipment vendors. Applicant believes wheelchair vendors should at least offer all wheelchair occupants helmets designed specifically for wheelchair occupants, and in some cases, wheelchair occupants should be required to wear helmets. Wheelchair helmets offered by wheelchair suppliers not only serve safety considerations and can help avoid potential accident liability, but also can add to bottom-line profits.

Stroller Safety: Runaway Strollers

Entering these words, "stroller safety statistics" in a search on google brought up an article titled "Stroller safety for children; baby stroller safety—Keepyourchildsafe.org".

The following are excerpts that were copied from the first page of the website from that article:

"Child Stroller Safety

" . . . These precautions will help assure your child is never one of those statistics.

"Common stroller accidents and injuries:

" . . . *A runaway stroller is either hit by a car or otherwise injures a child

"Stroller safety: Runaway strollers

"It sounds like a scene from a cartoon, yet it actually does happen. A parent parks a stroller on a bit of an incline, and then for one reason or another it starts rolling away, baby inside. In the best of cases a frantic parent looks silly chasing it down the sidewalk. In worst cases, it rolls into the street and is struck by a passing car or tips over and injures the child inside. There are several main causes for runaway strollers:

"1. Parents think the brakes on the stroller are engaged when they are not.

"2. Due to a defect, breakage or wear and tear, the brakes slip out of position or fail to properly engage.

"3. The child (or another child) manages to disengage the brakes.

"4. The parent never sets the brakes, thinking the stroller is positioned in an area where it won't roll.

"Stroller safety: Preventing runaway strollers"

There are many similarities between most wheelchairs and strollers. Both have a frame, an accommodation for an occupant (e.g., a seat or flat surface) and a handle for someone to push on surfaces such as sidewalks. And, both have two rear wheels, each on its own axle but on the same axis, rotatably connected to the frame, and these two rear wheels are free to rotate independently of each other. Sometimes the two rear wheels on the same axis are adapted to be mounted on a single axle but, even so, the wheels may rotate independently of each other; some, however, may allow the wheels to be locked together, for example, for braking or for improved operation while traversing rough terrain or going fast.

Strollers and wheelchairs are uncomfortable to push on sidewalks because sidewalks are sloped for rain runoff. And there's a serious safety concern for both strollers and wheelchairs because of the veering off threat for the occupants. However, the concern is more serious for a stroller; one reason is that the stroller occupant does not have control of movement.

When a person pushing a stroller stops for whatever reason, s/he should always apply the brake. If s/he doesn't apply the brake when they stop, for example on a sidewalk, and s/he releases the stroller's handle, there is the risk the stroller may veer off towards the curb owing to gravity, the wind, the baby's movements, vibrations from vehicular traffic, subways, etc. While parents may remember to apply the brake when stopped, other caregivers may not be so vigilant.

Not applying the brake when a stroller is stopped is a common mistake. Attempts have been made to invent improved stroller braking systems. However, even so called "automatic" stroller braking systems require some form of human involvement that diminishes the value of the system.

What is needed is a safety feature that operates without human intervention even if the stroller brakes are not applied and the handle is released on a sloped surface such as a sidewalk.

Stroller Embodiment

FIG. 19 illustrates a side view of a four wheeled baby carriage, also called a pram stroller, all referred to herein as a stroller 801. All four wheels rotate independently of each other on stroller 801. The illustrated stroller represented in FIG. 19 has swiveling caster angled front wheels of which one caster wheel 809 is visible; not all similar strollers have such wheels. In prior art strollers, rear wheel 813 illustrated in FIG. 19 rotates independently of the other rear wheel (not visible in FIG. 19's side view). Referring to FIG. 19, the stroller 801 comprises a frame 803, a handle 805 for pushing, an accommodation 807 for a baby or child, two rear wheels of which rear wheel 813 is visible in FIG. 19 and the other rear wheel is not visible, and a left axle and a right axle (neither axle is visible in FIG. 19) which are described in association with FIG. 19A.

FIG. 19A depicts a rear view of the rear wheels of the stroller in FIG. 19 illustrated schematically. The two rear wheels 811 and 813 are on the same axis and are rotatably connected to frame 803 shown in FIG. 19 via left axle 531a and right axle 533a shown in FIG. 19A. Also as shown in FIG. 19A, rear wheel 811 is fixed to left axle 531a and rear wheel 813 is fixed to right axle 533a.

Also shown in FIG. 19A is an anti-veering off improvement, slip clutch 535a, illustrated schematically. Slip clutch 535a operates by automatically joining and unjoining the left axle 531a and right axle 533a, similar to the slip clutch 535 and left axle 531 and right axle 533 which are shown and described in association with FIGS. 15 and 15A. Also shown and described for FIG. 15A, are a structural support beam 547 connecting the left frame to the right frame and structural support strut 549 for axles 531 and 533. A structural support beam and structural support strut, which are not shown in FIG. 19A, may also be used for the stroller in FIGS. 19 and 19A. A slip clutch can also be adapted to a wheel hub, for example, as described in association to FIGS. 16 and 16A.

FIG. 20 illustrates a perspective view of a stroller 821. In prior art strollers, the rear wheels illustrated in FIG. 20 rotate independently of each other. Referring to FIG. 20, the stroller 821 comprises a frame 823, a handle 825 for pushing, an accommodation 827 for a baby or child, two rear wheels 829 (shown in part) and 831, and a full length axle 833 (shown in part) associated with the two rear wheels 829 and 831. The two rear wheels 829 and 831 are on the same axis and are rotatably connected to frame 823 via axle 833.

Also shown in FIG. 20 is an anti-veering off improvement, slip clutch 551a, illustrated schematically in black in the hub of wheel 831, similar to the slip clutch 551 which is shown and described in association with FIGS. 16, 16A, 17 and 17A.

An improvement on a stroller that automatically inhibits the stroller from veering off on a sloped surface in the event the person pushing the stroller stops pushing and does not apply the brakes before releasing the stroller's handle is a valuable safety feature. A slip clutch 551a, for example mounted in the hub of one wheel 831 as shown in stroller 821 of FIG. 20, can help prevent the stroller from veering off on a sloped surface if the brake is not applied.

Like anti-lock brakes in a car, which can prevent some but not all accidents, a slip clutch in a stroller can prevent some but not all runaway stroller accidents. An anti-veering off slip clutch improvement in a stroller can also be compared to an airbag in a car: if it isn't ever needed to prevent injuries in an accident, perfect!, and if it works once, it may well be worth a King's Ransom.

Although embodiments described above address manual wheelchairs, some embodiments may also be beneficially adapted to strollers in order to help prevent and inhibit veering off accidents if the brake is not applied when a stroller is stopped and the handle released. Pushing strollers on sloped sidewalks would also be facilitated since the person pushing the stroller would feel less tendency for the stroller to veer off.

As in a wheelchair, the slip clutch may be adapted in a wheel's hub (FIG. 20) or adapted to couple and uncouple the wheels' respective axles (FIG. 19A). For example, the slip clutch embodiments described in association with FIGS. 14, 14A, 15, 15A, 16, 16A, 17 and 17A and elsewhere (a slip clutch may also be called a friction clutch) can handily be adapted to a stroller's two wheels 829 and 831 as illustrated by way of example in stroller 821 of FIG. 20.

Referring to FIG. 20 by way of example, when stroller 821 is stopped, slip-clutch 551a couples rear wheels 829 and 831 together as follows: Slip clutch 551a is mounted in the hub of wheel 831; the end of axle 833 is journalled in slip clutch 551a; and wheel 829 is fixed to the other end of axle 833.

When the stroller's two wheels 829 and 831 are coupled by slip clutch 551a illustrated in the hub of wheel 831, the stroller cannot as freely turn toward the curb when the stroller is stopped and the brake is not applied when compared to a stroller without a slip clutch. As described above, this is because when two wheels are coupled by a slip clutch, those wheels can move forward or backward—they cannot turn. Therefore, when a stroller's two wheels 829 and 831 are coupled by slip clutch 551a as shown in FIG. 20, or when a stroller's two wheels 811 and 813 are coupled by slip clutch 535a via left axle 531a and right axle 533a as shown in FIG. 19A, the stroller is inhibited from turning and veering off toward the curb when the stroller is stopped and the brake is not applied thus avoiding a potential veering off accident.

In some embodiments, there are some dissimilarities between a slip clutch application in a stroller and in a wheelchair. The slip clutch in a stroller needs to couple the stroller's two wheels when the stroller is stopped to avoid potential veering off accidents. In a wheelchair embodiment, the slip clutch must couple the rear drive wheels while the wheelchair is in motion being self propelled. Also, a typical stroller with occupant weighs less than a wheelchair with occupant. For these reasons, a stroller's slip clutch's torque differential level (as discussed above) may be set at a lower level (than in a wheelchair) to minimize any difficulty turning and making other course adjustments.

Also, many more strollers are in use on sidewalks than wheelchairs—most babies have strollers while a small percentage of older people require wheelchairs.

An anti-veering off improvement in a stroller which comprises a frame, a handle for pushing, an accommodation for an occupant, at least two wheels on the same axis rotatably connected to the frame, and at least one axle associated with the at least two wheels, comprising a joining means adapted to the at least one axle configured to automatically couple and uncouple the at least two wheels. The joining means, when coupled, causing the at least two wheels to rotate in unison so that when the stroller is stopped on a sloped surface with no brake applied the stroller is inhibited from veering off, and the joining means, when uncoupled, allowing the at least two wheels to rotate at different speeds to allow turning. The joining means may comprise a slip clutch that automatically controls the coupling and uncoupling of the at least two wheels. The slip clutch joining means may be adjustable and/or engageable/disengageable via manual control.

Embellishments (as mentioned above) shown in one embodiment may be configured to embellish other embodiments. And, not all of the embellishments disclosed in any one embodiment need to be used in that embodiment.

Observations Arising from U.S. Pat. No. 8,616,573

The following text and FIGS. 20A, 20B, 21, 22 and 23 have been added to CIP application Ser. No. 14/255,558 which was filed on Apr. 17, 2014 and which was allowed on Apr. 16, 2015. Also, page 1 herein has been updated, Table 1 has been added after the update, and FIGS. 20A, 20B, 21, 22 and 23 have been added above to the BRIEF DESCRIPTION OF THE DRAWINGS. Otherwise, the disclosure above is from CIP application '558 verbatim. Italicized text below is from grandparent U.S. Pat. No. 8,616,573.

(Helpful MS Word hint Applicant stumbled on: To type the apostrophe—'—punctuation mark, hold down the "Ctrl" key and type the—'—key twice.)

OBJECTS AND SUMMARY

The first Utility application which this present application is derived from and is incorporated herein by reference, application No. 13/507,986 filed Aug. 10, 2012 now U.S. Pat. No. 8,616,573 issued Dec. 31, 2013, begins with this:

*The fields of use comprise manually operated conveyances such as wheelchairs and baby carriages & strollers. Embodiments of the invention are described using a wheelchair by example.*

*Joining means for wheels on stroller and wheelchair conveyances inhibit veering off toward the curb, and, as described above, joining means may use, inter alia, a slip clutch, various gears, an inclinometer sensor, manual controls etc. As also described above, such joining means also facilitates pushing stroller and wheelchair conveyances straight, and when pushing is facilitated, it makes pushing more comfortable for the attendant pushing and for the conveyances' occupant(s) (some strollers accommodate two or more occupants).*

*Because sidewalks are sloped for rain, the reason one arm may tire before the other when pushing a stroller or wheelchair is because it requires more force from one hand to offset gravity in order to go straight. A slip clutch to couple/uncouple the rear wheels acts like AUTOPILOT STEERING, and that makes pushing more efficient, easier/less strain, on any surface. The slip clutch automatically couples/uncouples the wheels depending on the force difference applied by the hands pushing. When the force difference is moderate, the combined force will 100% efficiently propel straight! Without a slip clutch, even a moderate difference in force will cause some zigzagging which is less efficient and takes more energy than going straight. To turn, the force difference is intentionally greater to automatically uncouple the two wheels to allow turning. Turning requires more energy—that's the tradeoff. However, conveyances are pushed straight most of the time.*

*When pushing a stroller or wheelchair on sidewalks, one arm won't be constantly stressed by applying more force to fight gravity just to stay a straight course when the conveyance is equipped with an improvement comprising wheel joining means acting like an autopilot steering which facilitates pushing the conveyance straight.*

*It is an object of the present application to claim improvements to facilitate pushing a stroller or manual wheelchair conveyance straight. Conveyances may be pushed on surfaces that are inclined uphill or downhill; surfaces may also be sloped to one side or the other (for example, sidewalks sloped toward the curb).*

*Aspects of the inventions involve improvements to baby stroller and wheelchair conveyances. One aspect of the* invention involves baby stroller and wheelchair conveyances comprising a frame, a handle connected to the frame for pushing the conveyance from behind by a non-occupant, an accommodation for an occupant, at least two wheels on the same axis rotatably connected to the frame, at least one axle associated with the at least two wheels, wherein the conveyances are constructed to be propelled by a non-occupant pushing on the handle of the conveyance while an occupant is in the accommodation.

An improvement facilitates pushing the conveyance straight via a slip clutch coupled directly to the hub of one of the at least two wheels. The slip clutch is adapted to automatically couple, uncouple or partially transmit torque between the at least two wheels. When the slip clutch is coupled it causes the at least two wheels to rotate in unison so that when the conveyance is pushed on the handle from behind by a non-occupant to go straight, pushing is facilitated. When a non-occupant pushes on the handle to turn the conveyance the slip clutch uncouples allowing the at least two wheels to rotate at different speeds.

Another improvement facilitates pushing the conveyance straight via gear joining means adapted to the at least one axle configured to couple and uncouple the at least two wheels. This improvement involves manual control means which are configured to couple and uncouple the at least two wheels via the joining means. When the joining means is coupled it causes the at least two wheels to rotate in unison so that when the conveyance is pushed on the handle from behind by a non-occupant to go straight, pushing is facilitated. When the gear joining means is uncoupled and a non-occupant pushes on the handle to turn the conveyance, the at least two wheels are allowed to rotate at different speeds.

Another improvement facilitates pushing the conveyance straight via a joining means which is adapted to the at least one axle to automatically couple and uncouple the at least two wheels. When the joining means is coupled it causes the at least two wheels to rotate in unison so that when the conveyance is pushed on the handle from behind by a non-occupant to go straight, pushing is facilitated. When a non-occupant pushes on the handle to turn the conveyance the joining means uncouples allowing the at least two wheels to rotate at different speeds. When an improvement involves a slip clutch, it may be adjustable and/or engageable and disengageable via manual control.

In some embodiments, an inclinometer sensor and associated circuitry could be implemented to automatically go to set position when a slope in the surface on which a wheelchair is traveling is detected. If so, the wheelchair operator may override the inclinometer and manually shift to (go to) set, or the operator may go from set to unset manually.

Wheelchair conveyances according to aspects of the invention as claimed, of course, may also have handrims (also referred to as "handrails" or "hand rails") for self propelling by the handicapped occupant user without the need for an attendant to push from behind. The advantages of a slip clutch equipped wheelchair for a patient self-propelling with handrims are described above; this present application comprises an improvement to facilitate pushing a conveyance in a straight direction from behind by an attendant.

Many, maybe most, manual wheelchair patients no longer have use of their lower extremities, and that is why they use wheelchairs for mobility via their upper extremities using handrims to self propel. Thus, anything in the relevant prior art that uses lower extremities for mobility or requires lower extremities for some control teaches away from manual wheelchairs, and also teaches away from strollers since babies cannot propel or control their stroller.

Autopilot Steering Facilitates Pushing Straight

Sloped Surfaces; Safety First: Many city sidewalks are not on a hill and thus they are not inclined uphill or downhill. On a sidewalk that is on a hill, the stroller and wheelchair conveyances' brake must be applied when stopped when an attendant pushing the conveyance releases the conveyance's handle or else the conveyance may likely start to roll.

As described above, although city sidewalks may appear to be flat, they are not—they are slightly slanted toward the curb to allow for rain run-off as described above. Because such sidewalks appear to be flat, they also appear to be safe. That's why parents and other caregivers may neglect (not forget) to apply the stroller's brake, and that is why a wheelchair occupant or attendant may neglect to apply the wheelchair's brake. But such seemingly flat sidewalks are not safe!

Unless the brake is applied when stopped, without joined wheels, owing to gravity and, for example, the occupants' movements or traffic vibrations, the conveyance may veer-off towards the curb and be involved in an accident.

As specifically mentioned above by way of example, on a sloped surface,

If a person is pushing the chair, uneven force must be applied to the two pushing handles.

Lopsided pushing: When pushing a stroller or wheelchair conveyance on a sloped sidewalk without joined wheels, one arm and wrist may get tired before the other. That's because pushing the conveyance on sidewalks constantly requires more torque applied from one hand than the other to maintain a straight course in order to offset the constant pull of gravity toward the curb.

Surfaces that are Not Sloped: Whether or not a sidewalk or other surface is slanted, maintaining a straight course is facilitated by use of various joining devices as described above. For example, slip clutch joining means may be compared to autopilot steering.

Without a slip clutch, when a person pushing a conveyance wants to push straight, say for example on a flat level sidewalk or parking lot, random unintentional uneven torque applied to the handle by an attendant's left and right hands will cause the conveyance to stray in a direction unintended by the person pushing, and this will result in a zigzag path of travel (described and illustrated below).

Besides being randomly applied, the unintended uneven applied torque also results from the fact that most people are not naturally ambidextrous—most people prefer to use one arm more than the other, and most are stronger in one arm than the other, making pushing with uneven torque the natural way to push. Thus, it is natural to push harder with one hand and steer off course—the zig—then over steer way other—the zag—and so it goes. The caster front wheels respond as they were designed to—they instantaneously react to any difference in torque by simultaneously changing the direction of the conveyance. Wikipedia describes related phenomena as: "Hunting oscillation is a self-oscillation, usually unwanted, about an equilibrium."

As was discovered millennia ago, the shortest distance between two points is a straight line. Traveling the shortest distance means the least amount of effort will be expended to get from point A to B. In other words, it, of course, takes less energy to get from point A to B if one travels in a straight line as opposed to zigzagging.

When a slip clutch, for example, in this flat level sidewalk/parking lot example, is engaged to join two wheels of the conveyance, even if the person pushing the conveyance unintentionally applies uneven torque to the handle pushing means, the conveyance will go straight anyway, as long as the differential in torque is moderate as described above. When the uneven force difference is moderate, no energy is wasted in zigzagging—all of the combined pushing force, even all uneven pushing force, will propel the conveyance 100% straight—no pushing energy is wasted!

Because these conveyances are pushed straight most of the time, being easier to push straight on any surface with less effort is a significant improvement. Less effort is required because straying in an unintended direction takes extra pushing effort, and that unintended effort is wasted because it adds to the effort to get, for example, from point A to B in a straight line.

If an attendant is pushing with one hand, for example somewhere in the middle of handle 825 shown in FIGS. 20, 21 and 22, depending on terrain, the pushing effort saved by not wasting unintended effort may be even more appreciable. Thus, as can be seen, pushing a conveyance with a slip clutch, for example, facilitates pushing straight on any surface, especially, as described above, if the surface is sloped like a sidewalk. Joining means, comprising a slip clutch or a gear configuration, acts like autopilot steering which facilitates pushing straight thus providing increased mobility efficiency.

However, there is a tradeoff for the benefits realized from the use of, for example, a slip clutch to travel straight, that tradeoff being that additional effort is required to turn a conveyance with a slip clutch. When turning, the additional effort manifests as requiring a greater difference in torque applied by one's hands to overcome the friction holding the slip clutch plates together. Depending on the particular slip clutch embodiment, the benefits vs tradeoff when using a slip clutch can be adjusted to suit an attendant's preferences by adjusting the slip-threshold level, or the slip clutch can be disengaged altogether, as discussed above. For example, if ease of turning is an attendant's primary concern, a low slip-threshold level may be selected so that turning is facilitated while traveling straight is less enhanced by the action of the slip clutch, or the slip clutch can be disengaged.

From an academic view, when the wheels of a conveyance are joined as described above, the conveyance will move forward at the combined speed imparted by the energy of the two pushing hands despite any disparity between the torque forces applied to the handle of the conveyance. Not only will two wheels joined together go straight on any surface, but they will be easier to propel than a conveyance whose wheels rotate independently from each other, such as wheels being journalled on two separate axles. (Of course, as discussed above, there is no slippage between the wheels and the surface on which they roll in the examples discussed herein.)

Detailed Description for FIGS. 20A, 20B, 21, 22 and 23

To illustrate a value proposition example, FIGS. 20A and 20B depict the two rear wheels of a stroller or wheelchair conveyance on a flat, level sidewalk 820, the value being explained is the benefit of a slip clutch acting like autopilot steering on any pavement or sidewalk whether or not they are slanted. The drawings in FIGS. 20A and 20B are not to scale.

FIGS. 20A and 20B illustrate a flat level sidewalk 820 on which are illustrated two wheel assembly 815 and 816, respectively. The wheel assemblies illustrate the rear wheels of a stroller or wheelchair conveyance.

FIG. 20A's wheel assembly 815 is comprised of an axle with two wheels joined together via a joining means (described above; joining means not shown in FIG. 20A) so that the two wheels must rotate as one. Thus, the two wheels will go from point A to B in a straight line 817 when the conveyance is, for example, pushed with the advantage of a slip clutch autopilot steering improvement to facilitate pushing straight.

FIG. 20B's wheel assembly 816 is comprised of two wheels, each wheel on its own axle as shown so the wheels are free to rotate independently of each other. When unintended uneven torque is unavoidably applied by an attendant pushing the conveyance to go straight from point A to B, the conveyance may likely take, for example, a zigzag path 819 from point A to point B.

At about five horizontal Manhattan blocks to the mile, one sidewalk on such a block is about 1000 feet in length, and it is this length of sidewalk 820 that is illustrated in FIGS. 20A and 20B. In FIG. 20B it is self-evident that the eight triangular textured areas illustrated between straight line 817 and zigzag path 819 represent wasted pushing energy. To put distances between illustrated zigzags in perspective, the average length of the base of each triangular area depicted in FIG. 20B is 125 feet in these examples (⅛ of 1000 feet).

Counting down from point B in FIG. 20B, the second textured triangular area 818 is also shown in two cutouts. In one cutout, area 818 illustrates its two sides, a and b, as straight lines as they are also shown as straight lines in the sidewalk 820 view in FIG. 20B. Base c of triangular area 818 represents, on average, ⅛ of the straight distance from A to B, 125 feet. The apex x of triangular area 818 is shown in both cutouts. Triangular area 818 represents a portion of long zigzag path 819. Long zigzagging means deviating from a straight path by a small angle but for a long distance (125 feet). Given the geometry & trigonometry involved, small angular deviations from the straight line path 817 means only small increases in the distance traveled. As mentioned, the drawings in FIGS. 20A and 20B are not drawn to scale and are therefore misleading to the eye. If drawn to scale, triangular area 818 shown in the cutout with sides a and b, for example, would appear as a much more obtuse (flat) triangle to illustrate realistic zigzagging.

But the "long zigzagging" illustrated is not the primary source of wasted zigzag pushing energy. While traversing sides a and b of long zigzag triangular area 818 the pusher will inevitably zigzag short distances, maybe every few feet or so; this is illustrated in the cutout with zigzag sides aa and bb of triangular area 818. As one can appreciate, this additional short zigzagging more significantly adds to the actual length the pusher must push to get from point A to B. Zigzag line 819 in FIG. 20B's sidewalk 820 illustrates long zigzag distances while zigzag sides aa and bb of triangular area 818 in the cutout illustrate short zigzags; long and short wasteful zigzagging results in traveling a significantly greater distance than 1000 feet to travel the 1000 feet from point A to B.

To visualize things in perspective, the following comprises concrete guesstimate examples. According to the inventor's subjective opinion, an energy saving in the neighborhood of 13% can be realized (for example, by a healthy average mother 5'9" tall weighing 150 lbs. pushing a stroller loaded with half her weight comprised of a 25 lb. stroller with a 35 lb. child and 15 lbs. of groceries aboard) traveling a straight line 817 with joined wheels compared to zigzag path 819 with unjoined wheels when traversing a flat level sidewalk 820 illustrated in FIG. 20B.

Besides the wasted energy, there are serious zigzag health and comfort implications. When pushing straight is facilitated with joining means, it would make pushing a conveyance more comfortable for the attendant pushing and for the occupant. As a manual wheelchair (without joining means) user, the inventor hereof sometimes gets dizzy and disorientated, an uncomfortable, sometimes queasy feeling, as an attendant pushing me zigzags. That dizzying experience is from the constant short zigzags illustrated by sides aa and bb of cutoff triangular area 818 in FIG. 20B. Perhaps to different degrees for different child occupants, the uncomfortable feeling must also affect young'uns being pushed in strollers, and it would be difficult at best to ascertain just how uncomfortable. Research to quantify this zigzag effect on stroller occupants is warranted. Indeed, the inventor believes parents would be neglectful if they could afford to but didn't buy a stroller for their child that is safer, easier and more comfortable to push, and especially because it also avoids their child feeling discomfort while being pushed, discomfort which they cannot articulate and which their parents cannot quantify.

In similar vein to the 13% savings on flat surfaces, the wasted pushing energy increases appreciably when pushing on a typical sidewalk sloped 2 degrees if the wheels are not joined—because extra energy, intended uneven torque, is constantly required to fight the 2 degrees of gravity in an effort to try to go straight from point A to B. It is logical to guesstimate that pushing on an otherwise level 1000 foot sidewalk sloped 2 degrees for runoff makes the energy required equivalent to pushing up a 1000 foot 2 degree hill to get from point A to B even though the sidewalk is level from point A to B. In this hypothetical example, that's the equivalent of wasting enough energy to lift 75 lbs. to a height of 35 feet. ((sin 2°)(1000')=35'). And that extra strain is all on one arm. When pushing a stroller on sidewalks without joining means for the wheels, strain and other biomechanical injuries, and runaway stroller accidents, are more likely than on flat surfaces.

If the sidewalks 820 in FIGS. 20A and 20B were inclined downhill, it would require holding back force as opposed to pushing force to go from point A to B. Without joining means the path would zigzag some causing wasted holding back force but of course going downhill is facilitated by gravity. However, "pushing" a conveyance downhill can be problematic, especially on a steep hill Novel handles 849 discussed below and illustrated in FIG. 22 can minimize the risks.

FIG. 21 illustrates a perspective view of stroller 821 from FIG. 20 but with added safety and convenience accessories which are not shown or described for FIG. 20. The same numbered drawing elements depicted in FIG. 20 are also depicted in FIG. 21 and they are numbered the same in both FIGS. 20 and 21.

In addition to the anti-veering off safety feature, slip clutch 551a described above, FIG. 21 has additional stroller safety and convenience accessories. Control module 871 for the accessories is shown on the stroller on the frame mounted below the stroller's handle 825.

Control module 871 is also shown enlarged in the module 871 cutout. A running light 879 is depicted atop the front caster wheels as shown. Running light 879 may provide illumination via LED(s). Control module 871 contains on/off button 875 for the running light, and a battery indicator light 873, and a USB port 877 to conveniently power or charge USB devices such as a cell phone, small fan, rear safety light, etc.

Control module 871 may contain suitable batteries, such as AAA or AA batteries, to power the running light 879 and USB port 877. Provision could also be made to use rechargeable batteries, or a battery pack, and to provide wiring to plug-in the conveyance to recharge. Battery indicator light 873 may be capable of lighting up in more than one color. For example, when nothing is connected to USB port 877 and the running light 879 is off, indicator light 873 is off. When something is connected to USB port 877 or the running light 879 is on, indicator light 873 may light up green when the batteries are okay, e.g., when they have more than approximately half power left in them, and when the batteries have less power, indictor light 873 may light yellow then red as power diminishes.

FIG. 21 also depicts speaker 835 to play music, a child's tutorial, a story, etc. for the stroller's occupant. More than one speaker may be used, for example, for stereo. The speaker(s) may be connected via wire, radio waves rf (e.g., Bluetooth), USB port, etc., to a sound source (not shown).

FIG. 22 depicts perspective views of two popular handle types for pushing wheelchair and stroller conveyances, and also two views of improved handles for pushing. Any of the handles for pushing depicted in FIG. 22 may be adapted to push either a stroller or wheelchair.

FIG. 22 illustrates a popular wheelchair handle 841 for pushing from behind with two hands. Handle 841 is comprised of two handle grips 843. Handle grips 843, for example, are adapted to fit on the upper portions of wheelchair frame members 33. Seat back 845 is partially depicted between frame members 33.

FIG. 22 also illustrates a popular stroller handle, handlebar 847. Handlebar gripping means 825, for example, is depicted as a covering for the upper portion of the stroller frame 823, and it is designed to be griped with one hand on the left and the other on the right of handlebar 825 by the attendant when pushing the stroller. This handlebar 825 handle type may also conveniently be pushed with one hand.

FIG. 22 also shows by way of example a perspective view of improved handles 849 shown configured to be connected to the wheelchair's original handles which are formed by bending the upper portions of a wheelchair's frame members 33. Seat back 845 is partially depicted between frame members 33. Handles 849 are, for example, comprised of left and right angulated handle extension pipes 859. The two pipes 859 are referred to as handles 849 or handle 849 (which is comprised of two pipes 859 as shown in FIG. 22).

Pipes 859 may be steel, stainless steel, brass, copper plumbing pipes, composite material, etc. bent to a suitable acute angle and adapted to be slid onto a wheelchair's original handles. Original wheelchair handles are commonly formed by bending the upper portions of frame members 33. Wheelchair hand grips 843, which the wheelchair comes equipped with, must be removed (for example, the wheelchair hand grips may be cut off). Once the original wheelchair hand grips are removed, pipes 859 may be slid onto the exposed wheelchair's bare handles. The fasteners 857, depicted at the low end of pipes 859, may be used to secure extension pipes 859 to the original handles. Or pipes 859 may be a tight enough fit on the original handles without fasteners. Or, once slid in place, a hole could be drilled through pipe 859 through the original frame handle so that a bolt or the like could be pushed through and fitted with an acorn nut or the like on the other side.

Improved wheelchair handles 849 comprise two or more (three are shown) sets of handle grips for pushing the wheelchair from behind. As shown, the improved wheelchair handle 849 has handle grips in three pushing positions, high hand grips 851,851a, medium hand grips 853,853a and low hand grips 855,855a, to comfortably suit wheelchair attendants of different physiques, and also to provide improved means for pushing whether going uphill or level, or holding back when going downhill.

The Applicant/inventor herein has added a set of handles 849 to his own wheelchair. Attendants pushing his chair have found that using different sets of handle grips are more comfortable than others depending on whether they are pushing uphill, on a level surface, or downhill. Going downhill can be especially problematic. For example, going downhill can put added strain on the attendant's lower back, and it can be dangerous if the attendant trips and accidently lets go of the handles. Using upper hand grips 851,851*a* when going downhill, for example, may reduce such problematic risks. Also, occasionally pushing on different handle grips when out and about helps to avoid fatiguing one's upper extremities.

One of the handles 849 shown in perspective view is also shown in side view 861 with the addition of pivot mechanism 863 with locking wing nut 865, and a control module 871 as shown and described for stroller FIG. 21, and a safety light 867 which is powered by and turned on and off by control module 871. Safety light 867 may comprise an extension standoff 869 adapted to be mounted on the top of pipe 859. Standoff 869 may be removable via a connector depicted at its lower end. Standoff 869 serves to increase the prominence of safety light 867 atop pipe 859. Two safety lights 867 may be used, one atop each handle pipe 859 (only one is shown in side view 861).

When wing nut 865 is loosened, pipe 859 may be pivoted about pivot mechanism 863 so as to be repositioned by the attendant forward (away from the attendant) or rearward (toward the attendant) to a suitable and comfortable pushing position and then locked in position by tightening wing nut 865.

Depending on factors including terrain, different attendants pushing conveyances may find that some acute angles for pipe 859, which may be selected via pivot mechanism 863, will give them improved control of the conveyance, and that selecting particular handle grips, high, medium or low, will give them further improved control of the conveyance. Improved control gives rise to improved safety and efficiency. A tradeoff using handles 849, for example, is the handles' added weight at the rear of the conveyance, which shifts the center of gravity towards the rear and increases the risk of tipping over backward.

Bag with Clip Handles for Carrying, Backpacking & Handily Hanging

Bags have been around for a long time. Not rocket science, and one might think that the field of bag art would be relatively complete by now.

FIG. 23 illustrates some sample components of and the operation of a new multi-purpose tote bag, shopping bag or the like invented as an accessory for a stroller and wheelchair and herein called the "Everything & Everywhere Bag™" or "E&EB™". FIG. 23 also illustrates some implementations described below.

As the name E&EB implies, it can conveniently hold many different things, all kinds of stuff, and can be taken anywhere. A multi-function bag according to this aspect of the invention is a flexible or semi-flexible container for things with an opening at the top and two handles, associated with the top of the bag, for carrying or hanging. Various shapes of the bag's container, such as rectangular shapes, and bag's handles are possible. Each handle has the same type of compatible male and matching female clips so either male clip can couple with (connect, clip) either female clip. The bag and handles may be made of suitable materials such as various cloths, leathers, plastics such as polypropylene, papers, cardboards, bullet proof material, etc.

A bullet proof bag could be worn, for example, as a front-pack (vs a backpack) when a protective vest is unavailable. As America's soldiers and policemen are required to carry more and more warrior equipment to protect our Nation and fight crime, a bullet proof backpack, front-pack and hand or shoulder carry-able bag many be a lifesaver or protect them from wounds that could resign them to a wheelchair.

It is an object of this aspect of the invention to provide for baby stroller and manual wheelchair conveyances comprising a frame, a handle connected to the frame for pushing the conveyance from behind by a non-occupant, an accommodation for an occupant, at least two wheels on the same axis rotatably connected to the frame, at least one axle associated with the at least two wheels, wherein the conveyances are constructed to be propelled by a non-occupant pushing on the handle of the conveyance while an occupant is in the accommodation, a multi-function accessory bag, clip-configurable to deter theft and facilitate carrying, by hand or on a shoulder, or clip-configurable to a deter theft and facilitate wearing as a backpack or to hang on the handle of a conveyance, comprising a container to hold things in when configured for carrying or configured to be worn or hung and two loose bag handles associated with the top of the container, each loose bag handle fixed on one end to the top of the bag, each fixed end positioned diagonally across from the other handle's fixed end, each bag handle fitted with a male clip at its loose end, and two short pieces fixed on one end to the top of the bag and positioned diagonally across from the other short piece, each short piece having a female clip on its unfixed end, the male clips configured to clip into either female clip so that carrying the bag will be facilitated when one male clip is clip-configured on the front side of the bag into the female clip on the front side of the bag and the other male clip is clip-configured on the back side of the bag into the female clip on the back side of the bag, and wearing the bag as a backpack or hanging on the handle of a conveyance will be facilitated when one male clip is clip-configured on the front side of the bag into the female clip on the back side of the bag and the other one male clip is clip-configured on the back side of the bag into the female clip on the front side of the bag, and so that when the bag is carried with the handles clip-configured to facilitate carrying, and when the bag is worn or hung with the handles clip-configured to facilitate wearing or hanging, these respective clip-configurations would tend to close the top of the bag deterring theft and decreasing the chance for things to fall out.

Of course, it would also work fine if the male clips were female clips and the female clips were male, or if the clips were gender neutral.

FIG. 23 shows a rear view of an E&EB hanging from a common type of stroller 921 handlebar in the lower left and a rear view of an E&EB hanging from a common type of wheelchair 923 handle in the lower right; by way of example, these two E&EBs are illustrated with apropos advertising, as is tote bag backpack 933 being worn by lady 931 as shown in the upper right of FIG. 23.

As described below, FIG. 23's clip enclosure 891 shows one type of clips for E&EB handles, and FIG. 23's enclosure 901 illustrates four views of the same tote bag 909, 913, 915 and 917 shown with the bag's handles in four positions, and FIG. 23's depicts rear views of an E&EB printed with America's Patent & Trademark Office logo handily hanging on stroller and wheelchair conveyances' handles and being worn as a backpack by lady 931. Bag handles 903 and 905 and their clips 897 and 899, when shown clipped 898, are the same for each bag view shown in enclosure 901's drawings but handles and clips are not numbered in all four views of bag 909, 913, 915 and 917 to avoid clutter and facilitate disclosure.

If an ordinary tote bag with handles such as depicted in FIG. 23's bag 909 view is hung on handles, the top of bag 909's front to back dimension would be increased and the side to side dimension would be decreased. And if a bag designed for hanging with handles such as shown in FIG. 23's bag 917 view is carried by hand, the top of bag 917's front to back dimension would be increased and the side to side dimension would be decreased.

For example, if bag handles 903 and 905 on the bag 917 view in FIG. 23 are hung with the left bag handle 905 to the left handle of wheelchair 923 and the right bag handle 903 to the right handle of wheelchair 923, this configuration would tend to close the top of bag 917, and this is good because it reduces the chance for things to fall out of the bag and a closed top also deters theft. However, if bag handles 903 and 905 shown on bag 909 view in FIG. 23 are hung with bag handle 905 to the left handle of wheelchair 923 and bag handle 903 to the right handle of wheelchair 923, this configuration would tend to open the top of bag 909 and that would more readily allow stuff to fall out of the bag or be stolen by a thief.

Clip enclosure 891 of FIG. 23 illustrates plastic snap buckles fasteners (by way of example) such as sold by Amazon, and referred to herein as "clip" or "clips." The realistic depiction of male clip 893 is shown unclipped from female clip 895. Male clip 893 is illustrated as male clip 897 unclipped from its illustrated female clip 899. Male clip 897 is illustrated clipped into its female clip 899 in the illustrated clipped clip 898. For purposes of this bag embodiment, male and female clip roles may be reversed, i.e., male clip 897 and female clip 899 could switch places, or clips without gender could be used as long as they hook up for purposes described.

The four views of the bag illustrated in enclosure 901 demonstrates how to change front bag handle 903 and rear bag handle 905 from the carrying orientation shown in the bag 909 view to the hanging orientation shown in the bag 917 view. Bag 909 view shows front bag handle 903 clipped to the front of bag 909 and rear bag handle 905 clipped to the rear.

As seen in the bag 909 view, bag handle 905 has two folds partitioning the handle 905 illustration into three parts as the 3 lead lines going from number 905 to the 3 parts of handle 905 show; however, handle 905 is one loose long piece as are all loose long handles 903 and 905.

As seen in the bag 915 view, for example, each handle 903 and 905 is associated with the top of the bag, and each handle 903 and 905 is fixed to the top of the bag at one end. Handles may be fixed inside or outside the bag. After being fastened at the top, the handle materials may extend lower than the top area, and may even go around the container to meet up with the short stationary pieces described below.

Each handle 903 and 905 has a male clip 897 on the other loose end as shown in FIG. 23's bag 915 view. Each handle 903 and 905 is a loose reversible long (long meaning any suitable bag handle length) handle piece with a male clip 897 at its unfixed end. The fixed ends of handles 903 and 905 are fixed diagonally positioned relative to each other on the top of the bag as shown.

Still referring to bag 915 view by way of example, the bag top also has two short stationary pieces, each with a female clip 899, fixed on the top of the bag and also diagonally positioned relative to each other as shown. Each male clip end 897 can clip into either female clip 899.

This diagonal configuration as described and illustrated avoids handles crossed over the top of the bag when the long ends are clipped from one side to the other side (which would happen if the loose long male ends were directly across from each other, and fixed short pieces with female clips 899 were directly across from each other); if handles were configured across the top of the bag, it would be silly and look awkward and access to the contents in the bag would be compromised.

The clipped clips 898, shown on front bag handle 903 and rear bag handle 905 of the bag 909 view, are shown in the views of bags 913 and 915 with male clip 897 and female clip 899 unclipped. In the bag 913 view, front bag handle 903 is shown unclipped and orientated from bag front to bag front, and bag handle 905 is shown unclipped and orientated from bag rear to bag rear. In the bag 915 view, front bag handle 903 is shown unclipped and orientated from bag front to bag rear, and rear bag handle 905 is shown unclipped and orientated from bag rear to bag front.

Bag 917 view illustrates the hanging orientation with the bag handles' clips 898 clipped front to rear directly across the top of the bag and rear to front directly across the top of the bag, the reverse configuration of the bag 909 view which illustrates its bag handles' clips 898 clipped front to front and rear to rear.

Without drawings, words might explain Applicant's multi-function stroller and wheelchair accessory bag E&EB with reversible handles like so: An improved tote bag and the like, for carrying by hand or on one's shoulder, or wearing as a backpack, or for hanging on wheelchair handles or a stroller handlebar or the like, comprises two bag handles, each handle, configured with a clip, clasp or the like, adapted to facilitate carrying by hand when one bag handle is clip-configured on the front side of the bag and the other bag handle is clip-configured on the back side of the bag, or adapted to facilitate wearing as a backpack, front-pack or handily hanging when each bag handle is clip-configured directly across the front side to the back side of the bag.

As illustrated in FIG. 23's stroller 921's handlebar in the lower left and wheelchair 923's handle in the lower right, by wrapping the bag handles 903 and 905 once or more around the conveyances' handlebar or handles, the bag may be positioned at a desired height. To adapt to different lengths that may be required for different uses, the backpack 933 illustrated on lady 931 is equipped with extension handle pieces 935, one of which is shown clipped into one handle as illustrated; the other extension 935 in on the front of lady 931 (not in view). Each extension handle piece 935 has a male clip 897 at one end and a female clip 899 at the other end.

And so, even the apparently mundane field of bag art marches on while being carried, worn or hung on stroller and wheelchair conveyances.

I claim:

1. In a baby stroller comprising a frame, a handle connected to the frame for pushing the stroller from behind by a non-occupant, an accommodation for an occupant, at least two wheels on the same axis rotatably connected to the frame, at least one axle associated with the at least two wheels, wherein the stroller is constructed to be propelled by a non-occupant pushing on the handle of the stroller while an occupant is in the accommodation, an improvement to facilitate pushing the stroller straight comprising:

a joining means adapted to the at least one axle to couple and uncouple the at least two wheels, the joining means when coupled causing the at least two wheel to rotate in unison so that when the stroller is pushed on the handle from behind by a non-occupant to go straight, pushing is facilitated, and when a non-occupant pushes on the handle to turn the stroller the joining means uncouples allowing the at least two wheels to rotate at different speeds.

2. The stroller of claim 1, wherein the joining means may be automatically controlled.

3. The stroller of claim 1, wherein the joining means may be manually controlled.

4. The stroller of claim 1, wherein the joining means comprises a slip clutch.

5. The stroller of claim 1, wherein the joining means comprises gears.

* * * * *